US006233348B1

(12) United States Patent
Fujii et al.

(10) Patent No.: US 6,233,348 B1
(45) Date of Patent: *May 15, 2001

(54) FINGERPRINT REGISTERING APPARATUS, FINGERPRINT IDENTIFYING APPARATUS, AND FINGERPRINT IDENTIFYING METHOD

(75) Inventors: Yusaku Fujii; Takashi Shinzaki; Ken Yokoyama, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,698

(22) Filed: Mar. 23, 1998

(30) Foreign Application Priority Data

Oct. 20, 1997 (JP) ...................................................... 9-285919

(51) Int. Cl.⁷ ........................................................ G06K 9/00
(52) U.S. Cl. ............................................................. 382/125
(58) Field of Search .................................... 382/124–127, 382/115, 125, 209, 190

(56) References Cited

U.S. PATENT DOCUMENTS

| | | | | |
|---|---|---|---|---|
| 5,497,429 | * | 3/1996 | Shibuya | 382/125 |
| 5,524,161 | * | 6/1996 | Omori et al. | 382/125 |
| 5,799,098 | * | 8/1998 | Ort et al. | 382/125 |
| 5,901,239 | * | 5/1999 | Kamei | 382/125 |
| 5,937,082 | * | 8/1999 | Funada | 382/125 |
| 5,960,101 | * | 9/1999 | Lo et al. | 382/125 |
| 6,049,621 | * | 4/2000 | Jain et al. | 382/125 |
| 6,072,895 | * | 6/2000 | Bolle et al. | 382/125 |

* cited by examiner

*Primary Examiner*—Bhavesh Mehta
(74) *Attorney, Agent, or Firm*—Armstrong, Westerman, Hattori, McLeland & Naughton, LLP

(57) ABSTRACT

A feature point information calculating unit calculates the connection of a feature point extracted by a feature point extracting unit through a ridge. An identifying unit identifies the connection state of the feature point calculated by the feature point information calculating unit.

51 Claims, 33 Drawing Sheets

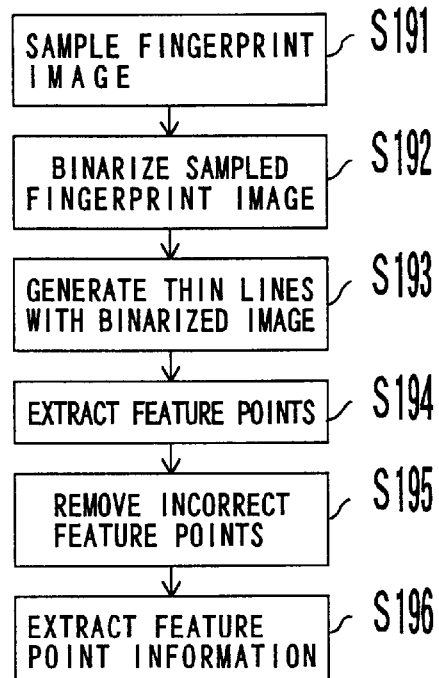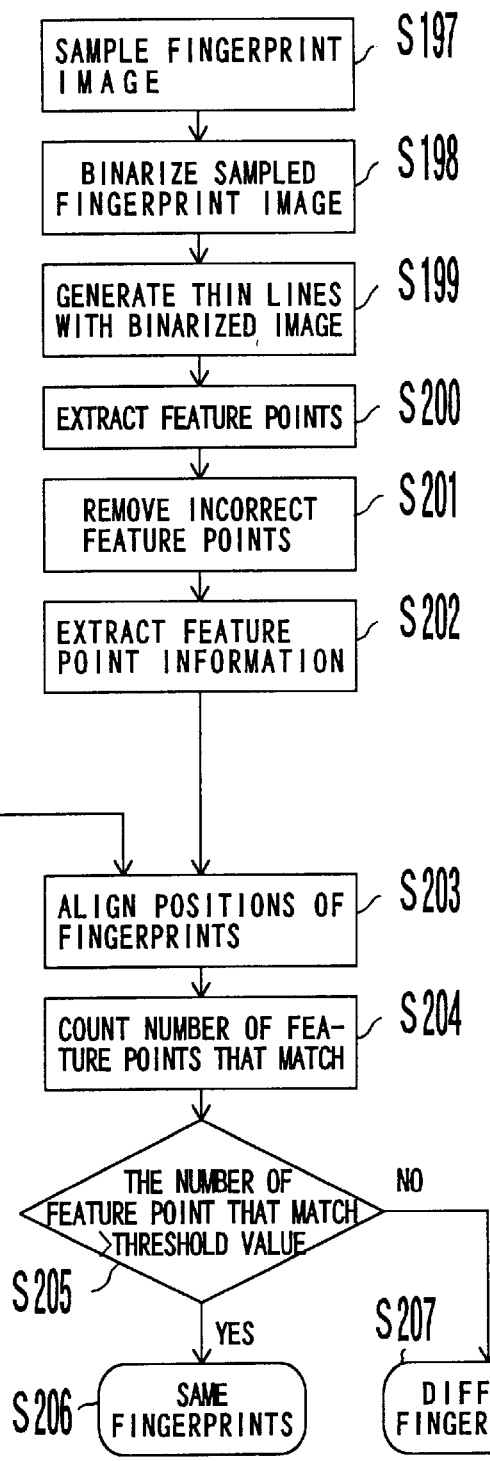
F I G. 1 (PRIOR ART)

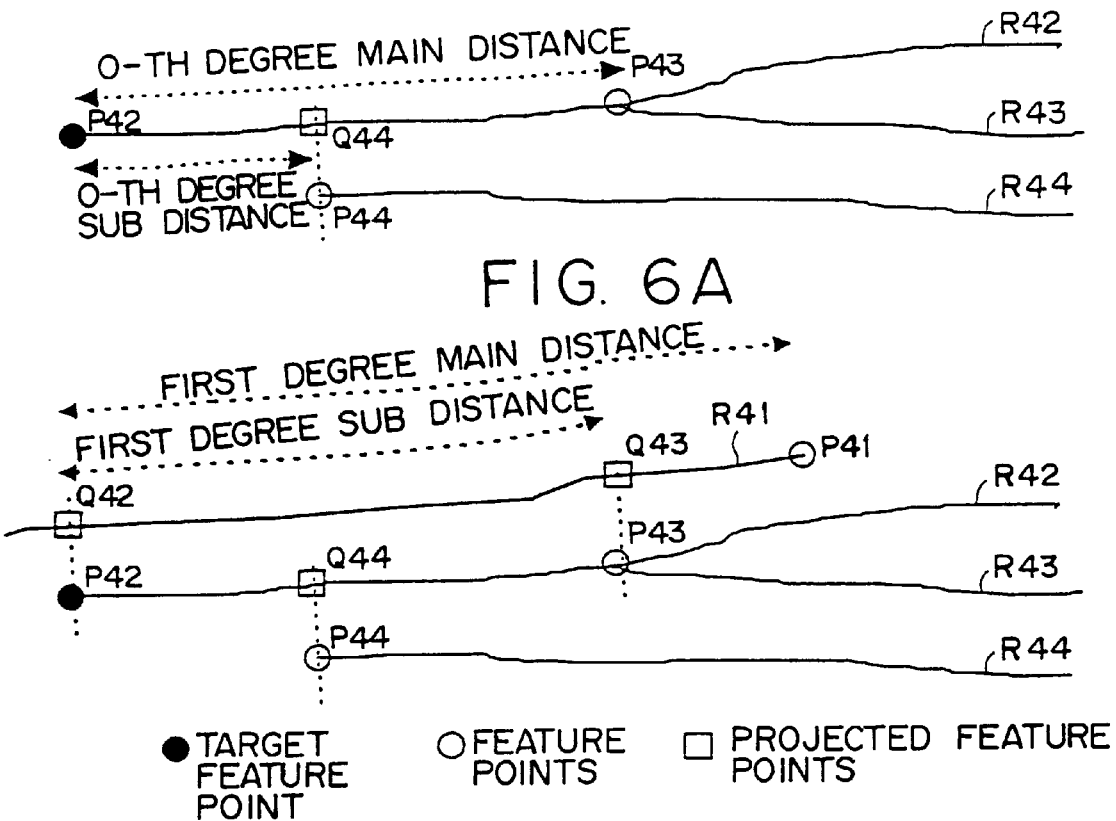
FIG. 6A
FIG. 6B
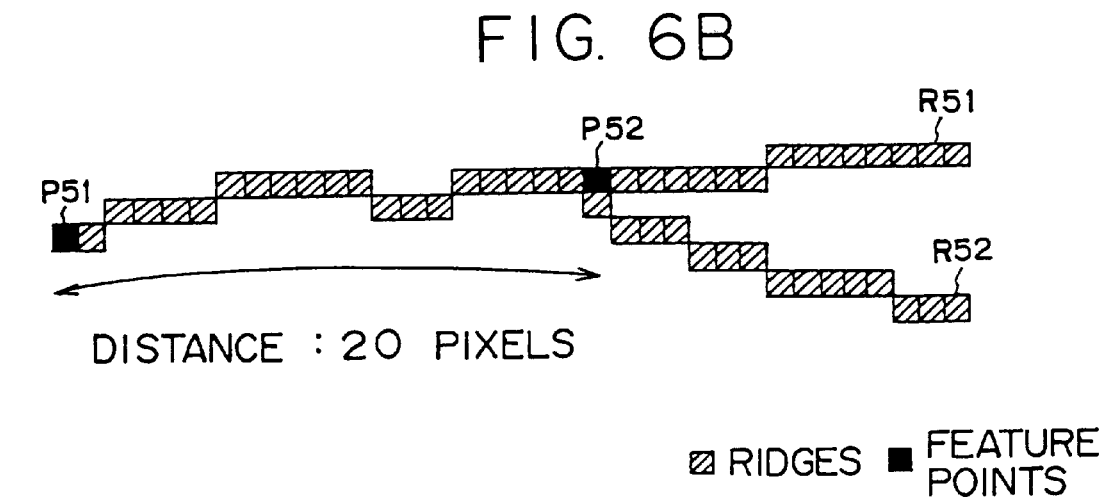
FIG. 6C

↓ DISTORTION OF FINGERPRINT

● TARGET FEATURE POINT    ○ FEATURE POINTS    □ PROJECTED FEATURE POINTS

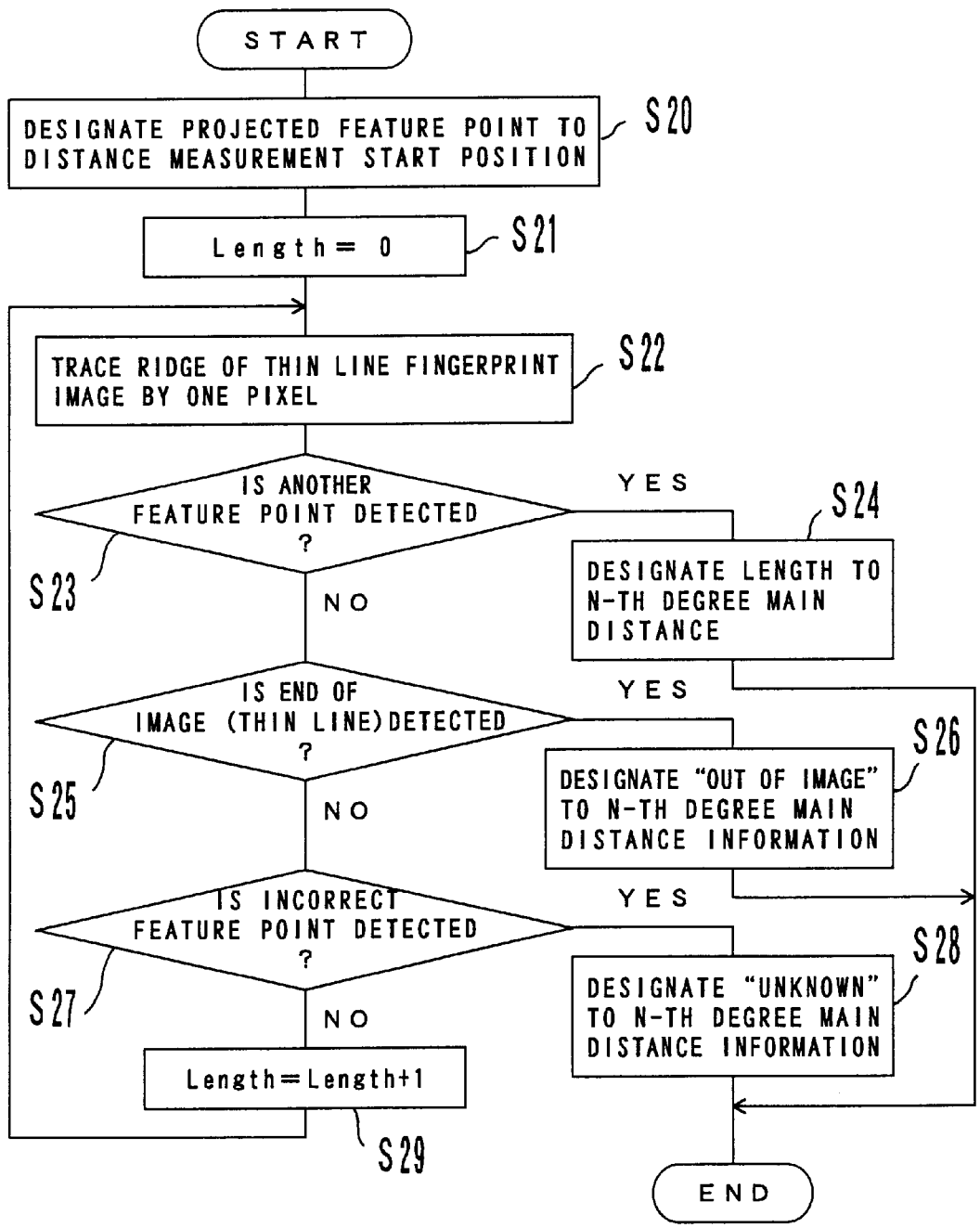
F I G. 1 4

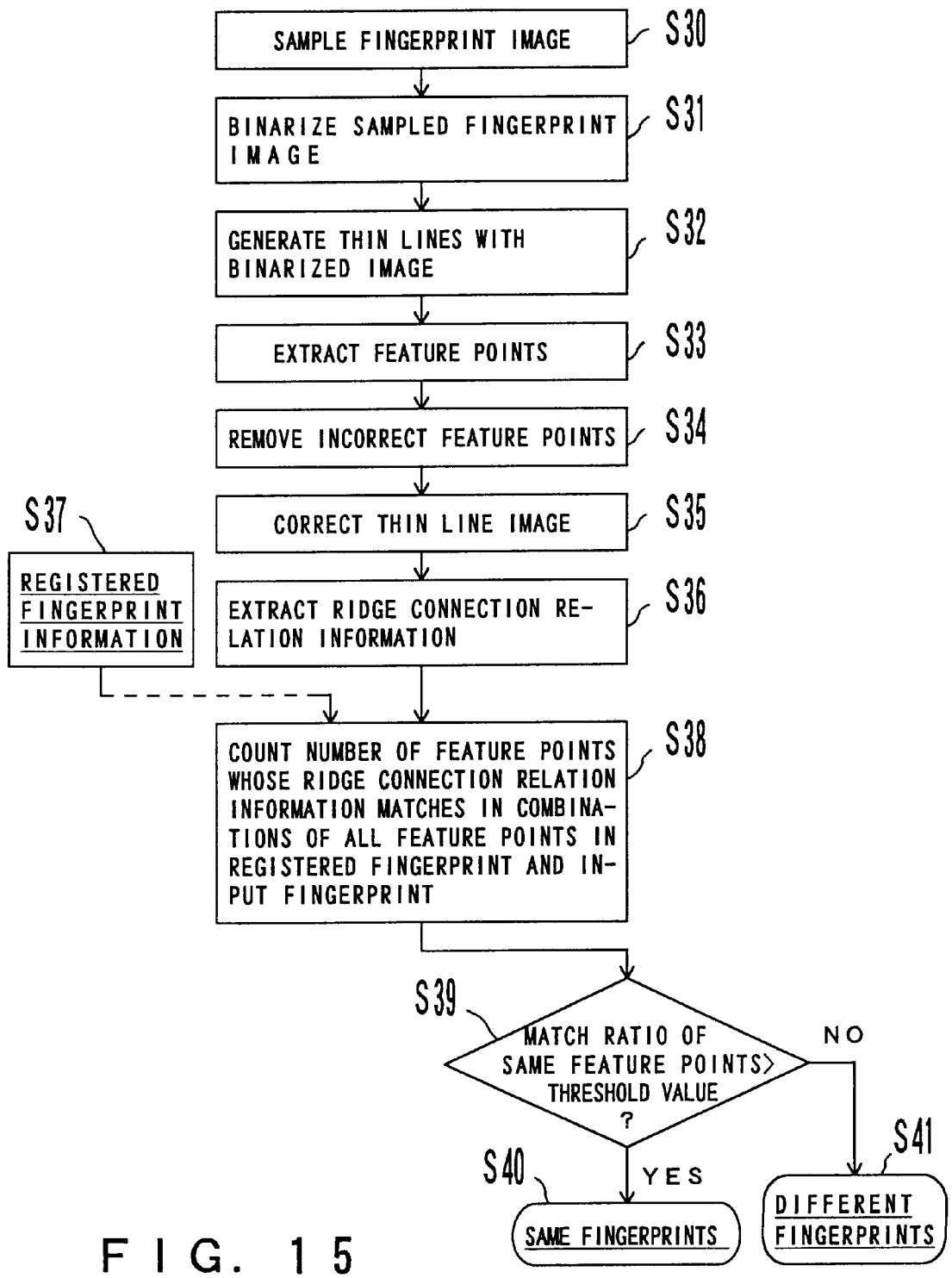
F I G. 1 5

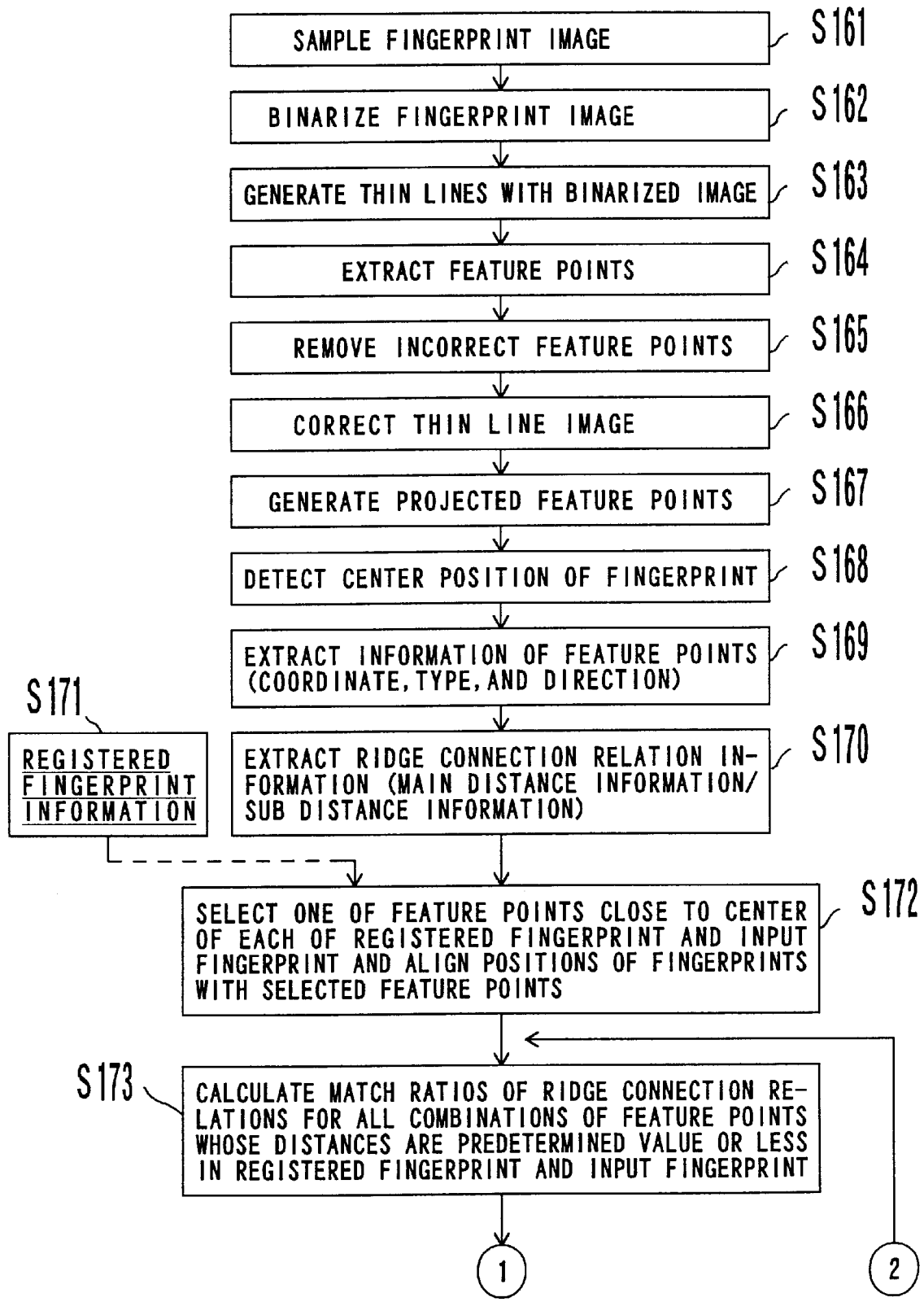
F I G. 3 2

FINGERPRINT REGISTERING APPARATUS, FINGERPRINT IDENTIFYING APPARATUS, AND FINGERPRINT IDENTIFYING METHOD

BACKGROUND OF THE INVENTION

1. Field of the Invention

The present invention relates to a fingerprint registering apparatus, a fingerprint identifying apparatus, and a fingerprint identifying method, in particular, to those suitable for identifying a person.

2. Description of the Related Art

As computers have been widely used in our society, system security has gained public attention. For example, as a means for identifying a person who accesses a computer room or who uses a terminal unit, an ID card or an unique password is used. However, such means have a problem from a viewpoint of security.

Instead of using an ID card or a password, a person identifying technology that uses information intrinsic to a living body is desired. When such information is used for identifying a person, since other people do not have the same information, the information of the living body assures the identity of the person.

As types of information of the living body used for identifying a person, there are fingerprint, voice-print, iris, distribution chart of retinal veins, signature, and so forth. These types of information of a living body are converted into electronic information such as an image by various sensors such as a CCD camera. Thereafter, information of a living body obtained by such a sensor is processed and then information that becomes a key for identifying a person is extracted. Therefore, information of a living body that has been registered is identified with key information of a living body that has been input so as to identify a person.

Next, as an example of information of a living body, a fingerprint will be described.

A fingerprint has two major features that are "no fingerprints are the same" and "no change in a life time". Thus, it is considered that a fingerprint is the most effective means for identifying a person. Consequently, many simple person-identifying systems using fingerprints have been intensively studied and developed.

A fingertip of a human being has fine concave portions and fine convex portions. A string of a convex portion is referred to as a ridge. Ridges form a pattern intrinsic to a person. When a ridge is traced, a ridge bifurcation and a ridge ending take place. At a ridge bifurcation, the ridge bifurcates out into two ridges. At a ridge ending, the ridge breaks. Since the distribution of ridge bifurcations and ridge endings varies person by person, these points are referred to as feature points. The feature points are used as a prominent means for identifying a person. When fingerprints are identified, it is determined whether the positions, types, and directions of these feature points match.

FIG. 1 is a flowchart showing a conventional fingerprint registering process and a conventional fingerprint identifying process.

In the fingerprint registering process, a fingerprint image to be registered is sampled by a fingerprint sensor (at step S191). The sampled fingerprint image is binarized (at step S192).

Next, thin lines are generated with the binarized fingerprint image (at step S193). Thus, a thin line image of a fingerprint in which the width of each ridge is expressed by one pixel is obtained.

Thereafter, the positions of the feature points of the fingerprint are located and extracted on the thin line image of a fingerprint (at step S194). Since the extracted feature points generally contain incorrect feature points, these incorrect feature points are removed (at step S195). When these incorrect feature points are removed, if two ridge endings are opposite each other, separated by a short distance, these ridge endings are treated as one ridge that has broken in the image sampling process. In this case, the ridge between the two ridge endings is restored. Thus, the two ridge endings are removed. On the other hand, when two parallel ridges adhere in the middle and thereby a ridge bifurcation takes place, the ridge bifurcations are treated as two parallel ridges that have adhered in the image sampling process. In this case, the ridges that have adhered are separated and thereby the ridge bifurcation is removed.

Next, fingerprint information of each feature point extracted from the fingerprint image is collected (at step S196). The fingerprint information is stored as registered fingerprint data in a fingerprint data registering unit 110.

In the fingerprint identifying process, a fingerprint image to be identified is sampled by a fingerprint sensor (at step S197). The sampled fingerprint image is binarized (at step S198).

Next, thin lines are generated with the binarized fingerprint image (at step S199). Thus, a thin line image of a fingerprint, of which the width of each ridge is expressed by one pixel is obtained.

Next, the positions of features points of the fingerprint are located and extracted on the thin line image of a fingerprint (at step S200). Since the extracted feature points generally contain incorrect feature points, the incorrect feature points are removed (at step 5201).

Next, fingerprint information of each feature point extracted from the fingerprint image is collected (at step S202). The registered fingerprint data is read from a fingerprint data registering unit 110 so as to align the positions of the input fingerprint image and the registered fingerprint image (at step S203).

Next, the fingerprint information of the input fingerprint image and the fingerprint registered data that has been read from the fingerprint data registering unit 110 are compared so as to identify the input fingerprint image and the registered fingerprint image. In other words, the number of feature points that match in the input fingerprint image and the registered fingerprint image is counted (at step S204). When the number of feature points that match in the input fingerprint image and the registered fingerprint image exceeds a predetermined value (at step S205), it is determined that the fingerprint of the registered fingerprint image is the same as the fingerprint of the input fingerprint image (at step S206). On the other hand, when the number of feature points that match in the input fingerprint image and the registered fingerprint image is smaller than the predetermined value (at step S205), it is determined that the fingerprint of the registered fingerprint image is different from the fingerprint of the input fingerprint image (at step S207).

As feature point information of feature points, the positions (coordinates), types, and directions of individual feature points are generally used. By determining whether the positions, types, and directions of feature points match in the input fingerprint image and the registered fingerprint image, the fingerprints are identified.

However, when the positions, types, and direction of feature points of the input fingerprint image and the registered fingerprint image are compared, a high identification ratio cannot be obtained. Since the skin of a finger partially expands, shrinks, or rotates, whenever a fingerprint image is sampled, the fingerprint distorts. Thus, the positions and directions of feature points delicately vary. In addition, due to an improper pressure of a finger to the fingerprint sensor, dirty thereof, chaps of a finger, and so forth, whenever a fingerprint image is sampled, a ridge ending and/or a ridge bifurcation is unstably detected. Thus, the identification ratio deteriorates.

SUMMARY OF THE INVENTION

Therefore, an object of the present invention is to provide a fingerprint identifying apparatus and a fingerprint identifying method that allow a fingerprint to be accurately and stably identified.

To solve the above-described problem, according to the present invention, a feature point on a ridge is extracted from fingerprint data. Corresponding to the placement state of the feature point to the ridge, a fingerprint is identified.

Thus, even if a fingerprint distorts due to a partial expansion, shrinkage, rotation, and so forth of the skin of a finger, the placement state of feature point on the ridge does not vary. Thus, a fingerprint can be accurately and stably identified.

In addition, according to an aspect of the present invention, a virtual feature point is designated on a ridge extracted from fingerprint data. Corresponding to the fingerprint information of the virtual feature point, a fingerprint is identified.

Thus, information that is a key necessary for identifying a fingerprint can be increased without need to vary a ridge structure of the fingerprint that has been sampled. Consequently, a fingerprint can be accurately and stably identified.

In addition, according to an aspect of the present invention, by projecting a feature point on a ridge to another ridge, a virtual feature point is generated on a ridge.

Thus, a two-dimensional ridge structure can be affected to a particular ridge. When a feature point is one-dimensionally searched on a ridge, a fingerprint can be identified. Consequently, a fingerprint can be accurately identified at high speed.

In addition, according to an aspect of the present invention, a fingerprint is identified corresponding to the distance on a ridge between feature points or virtual feature points.

Thus, corresponding to the length of a ridge sectioned at the position of a feature point or a virtual feature point, a fingerprint can be identified. Since the length of a ridge sectioned at the position of a feature point or a virtual feature point does not almost vary against a distortion of a fingerprint, the fingerprint can be accurately and stably identified.

In addition, according to an aspect of the present invention, corresponding to the distance between feature points or virtual feature points, a fingerprint is identified.

Thus, the measurement of the distance along a ridge becomes the measurement of a straight line. Consequently, calculations for generating fingerprint information can be simplified.

In addition, according to an aspect of the present invention, corresponding to the connection direction to a feature point or a virtual feature point on a ridge, a fingerprint is identified.

Thus, in consideration of the connection state to a plurality of directions corresponding to a feature point or a virtual feature point, a fingerprint can be identified. Thus, the fingerprint can be accurately identified.

In addition, according to an aspect of the present invention, corresponding to the number of feature points and virtual feature points on a ridge, a fingerprint is identified.

Thus, the number of feature points and virtual feature points on a ridge does not vary against a distortion of a fingerprint. Consequently, the fingerprint can be stably identified. Since the number of feature points and virtual feature points can be easily calculated, a fingerprint can be identified at high speed. In addition, according to an aspect of the present invention, corresponding to the type of a feature point on a ridge, a fingerprint is identified.

Thus, since the type of a feature point on a ridge does not almost vary against a distortion of a fingerprint, the fingerprint can be stably identified. Moreover, in comparison with the case of which a fingerprint is identified corresponding to the number of feature points and virtual feature points, the accuracy of the identification of the fingerprint can be improved. In addition, according to an aspect of the present invention, corresponding to type information of a source projected feature point corresponding to a destination projected feature point, a fingerprint is identified.

Thus, type information can be added to a virtual feature point. In consideration of type information of a virtual feature point, a fingerprint can be identified. Consequently, the fingerprint can be accurately identified. In addition, according to an aspect of the present invention, a fingerprint is identified corresponding to the order of a feature point and a virtual feature point on a ridge.

Thus, since the order of a feature points and a virtual feature point on a ridge does not vary against a distortion of a fingerprint, the fingerprint can be stably identified. Moreover, in comparison with the case that a fingerprint is identified corresponding to the number and types of feature points and virtual feature points on a ridge, the accuracy of the identification of the fingerprint can be further improved.

In addition, according to an aspect of the present invention, the type of a feature point on a ridge is virtually changed.

Thus, even if the type of a feature point is unstably detected, a fingerprint can be accurately identified.

In addition, according to an aspect of the present invention, since a ridge ending and a projected point thereof on a ridge are integrated, a virtual ridge bifurcation is generated on a ridge.

Thus, even if a ridge bifurcation is mistakenly detected as a ridge ending due to a crack of a ridge caused by an improper pressure of a finger to the fingerprint sensor, the original ridge structure can be restored. Consequently, a fingerprint can be stably identified.

In addition, according to an aspect of the present invention, by comparing the distance on a ridge from a particular feature point to another feature point and the distance on a ridge from the particular feature point to a virtual feature point, a fingerprint is identified.

Thus, even if a feature point on the same ridge is extracted as one on a different ridge or even if a feature point on a different ridge is extracted as one on the same ridge, the distances of these feature points on respective ridges can be compared. Consequently, a fingerprint can be stably identified.

In addition, according to an aspect of the present invention, by dividing a ridge at a ridge bifurcation, a virtual ridge ending and a projected point corresponding thereto are generated.

Thus, even if a ridge adheres due to an improper pressure of a finger to the fingerprint sensor and thereby a ridge ending is mistakenly detected as a ridge bifurcation, the original ridge structure can be restored and a fingerprint can be identified. Consequently, the fingerprint can be stably identified.

In addition, according to an aspect of the present invention, by comparing the distance on a ridge from a virtual feature point to another feature point and the distance on a ridge from the virtual feature point to another virtual feature point, a fingerprint is identified.

Thus, even if a feature point and a virtual feature point on the same ridge are extracted as those on different ridges or even if a feature point and a virtual feature point on a different ridge are extracted as those on the same ridge, by comparing the distance on a ridge between the feature points and the virtual feature points, a fingerprint can be stably identified.

In addition, according to an aspect of the present invention, fingerprint information of a feature point on a ridge and fingerprint information of a feature point on another ridge are compared.

Thus, even if the number of ridges increases/decreases due to a crack or adhesion of a ridge, the fingerprint information can be compared. Consequently, a fingerprint can be accurately identified.

In addition, according to an aspect of the present invention, corresponding to a feature point on a first ridge, the distance to another feature point on the first ridge or the distance to a virtual feature point on the first ridge is calculated.

Thus, by comparing the distances on ridges, it can be determined whether or not feature points match. Since the distance on a ridge does not almost vary against a distortion of a fingerprint, a feature point can be stably identified.

In addition, according to an aspect of the present invention, corresponding to a feature point on a first ridge, a virtual feature point is generated on a second ridge. Corresponding to the virtual feature point, the distance to a feature point on the second ridge or the distance to another virtual feature point on the second ridge is calculated.

Thus, fingerprint information on the second ridge can be added to fingerprint information of a feature point on the first ridge. Since one feature point can be identified in consideration of the structure of a ridge that has not been connected, a feature point can be accurately identified.

In addition, according to an aspect of the present invention, corresponding to fingerprint information of a feature point in association with another feature point to be identified or to fingerprint information of a source projected feature point, it is determined whether or not feature points match.

Thus, when one feature point is identified, a ridge structure can be considered in a wide range. Consequently, a feature point can be accurately identified.

In addition, according to an aspect of the present invention, a reason of which a ridge connection state of a feature point is not obtained is extracted. The reason is contained in the ridge connection state.

Thus, when a ridge connection state is obtained in a later identifying process, a feature point can be identified in consideration of the validity thereof.

In addition, according to an aspect of the present invention, each fingerprint information is weighted so as to switch between, or use both of, the following evaluation systems; an evaluation system of which the identification of the connection state of a feature point is emphasized and an evaluation system of which the identification of the position, type, or direction of a feature point is emphasized.

Thus, a plurality of evaluation criteria can be provided. Consequently, a first identification difficulty due to expansion, shrinkage, and rotation of the skin and a second identification difficulty due to a crack and adhesion of a ridge can be handled.

In addition, according to an aspect of the present invention, the bottom portion and the top portion of a ridge are inverted.

Thus, the positions of a ridge ending and a ridge bifurcation can be inverted. For example, only with an image processing function for a ridge ending, an image process for a ridge bifurcation can be performed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a flowchart showing a conventional fingerprint registering process and a conventional fingerprint identifying process;

FIG. 6A is a schematic diagram showing an example of a 0-th degree distance on a ridge;

FIG. 6B is a schematic diagram showing an example of a first degree distance on a ridge;

FIG. 6C is a schematic diagram for explaining a distance calculating method;

FIG. 14 is a flowchart showing a distance-on-ridge calculating process of the fingerprint identifying apparatus shown in FIG. 9 in the case that a projected feature point is designated to a measurement start point;

FIG. 15 is a flowchart showing a fingerprint identifying process of the fingerprint identifying apparatus shown in FIG. 9;

FIG. 32 is a first flowchart showing a fingerprint identifying process of the fingerprint identifying apparatus shown in FIG. 29.

DESCRIPTION OF PREFERRED EMBODIMENTS

Next, with reference to the accompanying drawings, embodiments of the present invention will be described.

Figure 2:
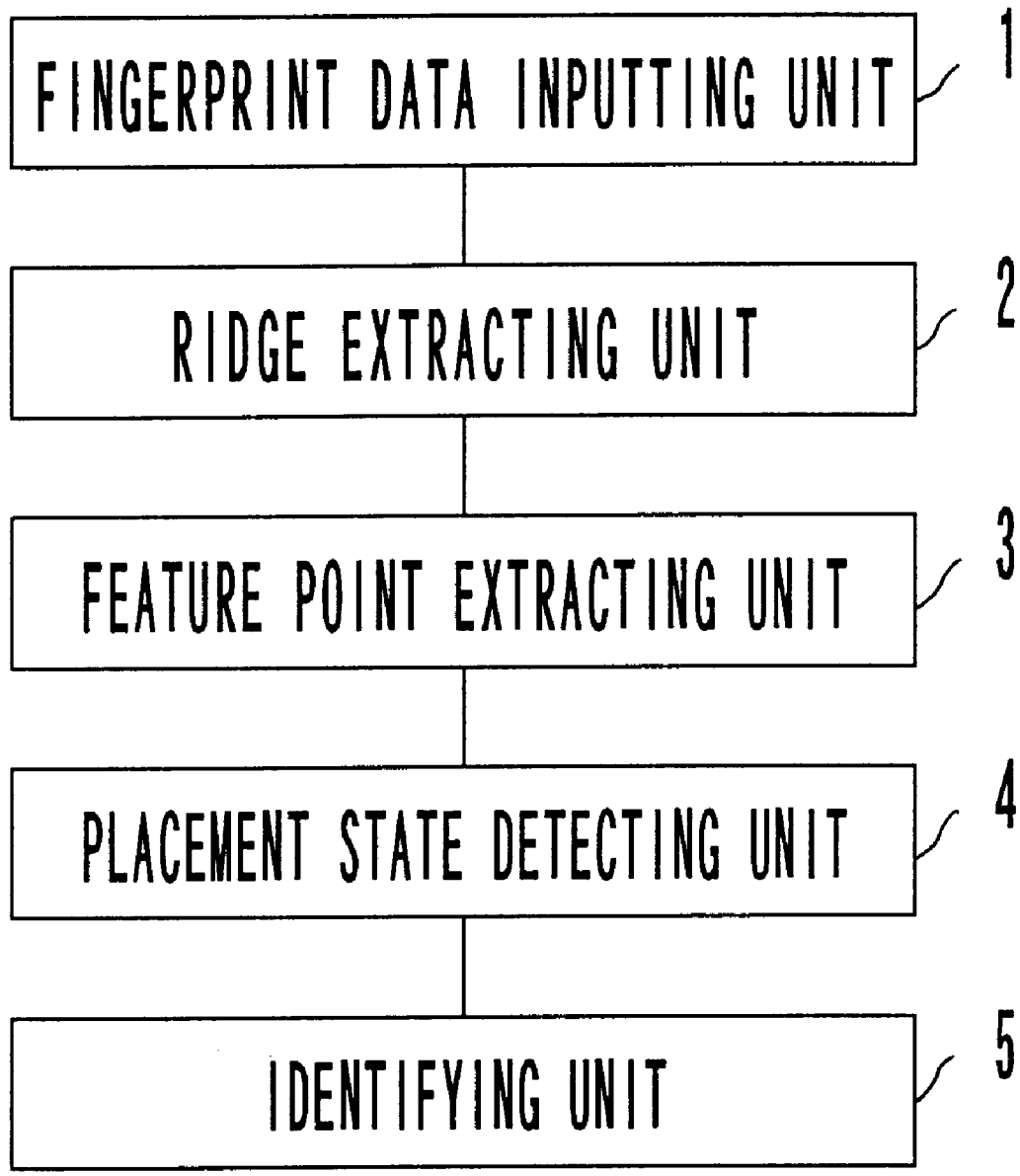
FIG. 2 is a block diagram showing the structure of a fingerprint identifying apparatus according to a first embodiment of the present invention.

FIG. 2 is a block diagram showing the structure of a fingerprint identifying apparatus according to a first embodiment of the present invention.

In FIG. 2, a fingerprint data inputting unit 1 inputs fingerprint data. The fingerprint data is for example fingerprint image data and compressed image data. Alternatively, the fingerprint data may be data that has been processed as binarized data or thin line data.

A ridge extracting unit 2 extracts a ridge of a fingerprint corresponding to fingerprint data that has been input from the fingerprint data inputting unit 1.

A feature point extracting unit 3 extracts a feature point of the ridge extracted by the ridge extracting unit 2 corresponding to the fingerprint data that has been input from the fingerprint data inputting unit 1.

A placement state detecting unit 4 detects the placement state of the feature point of the ridge extracted by the feature point extracting unit 3.

An identifying unit 5 identifies a fingerprint corresponding to the placement state of the feature point on the ridge detected by the placement state detecting unit 4.

When the placement state of the feature point on the ridge is detected, the connection of feature points through a ridge can be identified. Thus, when the type, position, and direction of a feature point of the registered fingerprint are varied from those of the input fingerprint, since the connection of the feature points on the ridge does not almost vary, the same fingerprints can be correctly identified. In other words, the connection of feature points on a ridge is detected and a geometric structure of a fingerprint is determined so as to identify the registered fingerprint and the input fingerprint.

In addition, fingerprint information that each feature point has may include information of other feature points connected thereto and information of other feature points on adjacent ridges (namely, ridge connection relation information) along with the position, type, and direction thereof.

Thus, with ridge connection relation of a feature point and a ridge as an identification object, the deterioration of the identification ratio due to movement of the feature point and variations of direction and type thereof can be suppressed. In other words, even if the skin partially expands, shrinks, or rotates, the connection relation of a feature point and a ridge does not vary.

Figure 3:
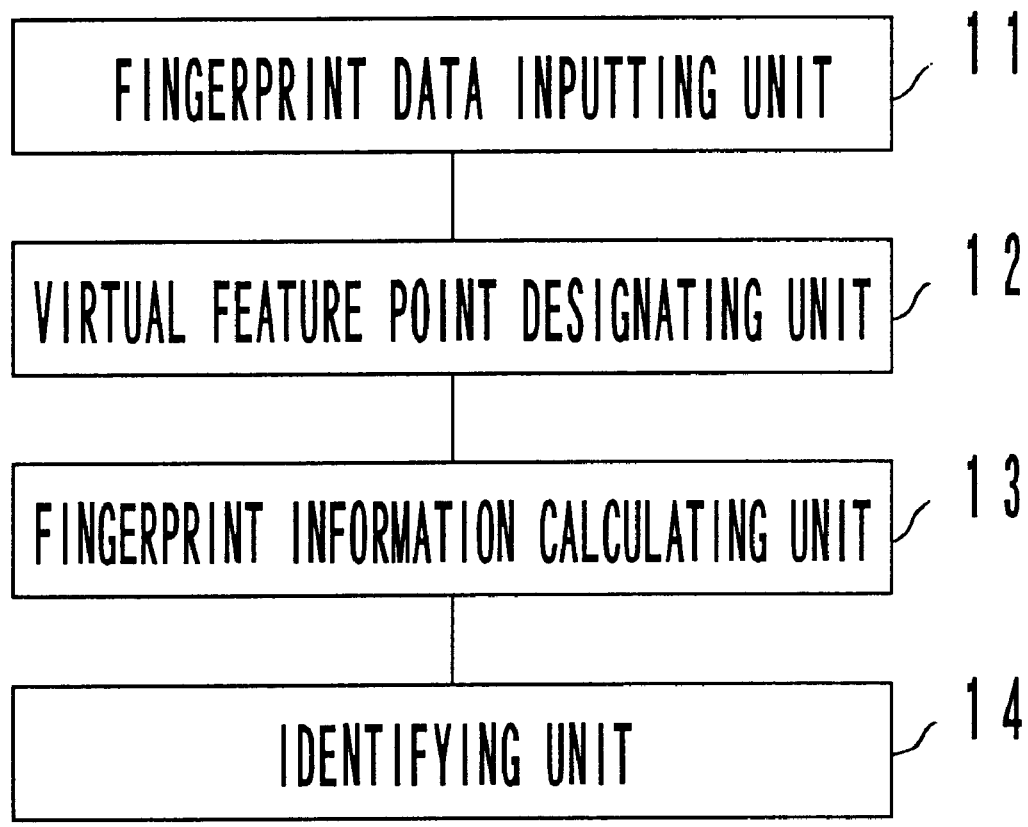
FIG. 3 is a block diagram showing the structure of a fingerprint identifying apparatus according to a second embodiment of the present invention.

FIG. 3 is a block diagram showing the structure of a fingerprint identifying apparatus according to a second embodiment of the present invention.

In FIG. 3, a fingerprint data inputting unit 11 inputs fingerprint data.

A virtual feature point designating unit 12 designates a virtual feature point to a ridge corresponding to the fingerprint data that has been input by the fingerprint data inputting unit 11.

A fingerprint information calculating unit 13 calculates fingerprint information of the virtual feature point designated by the virtual feature point designating unit 12.

An identifying unit 14 identifies a fingerprint corresponding to fingerprint information calculated by the fingerprint information calculating unit 13.

A virtual feature point is generated by projecting a feature point on a ridge to an adjacent ridge.

Figure 4:
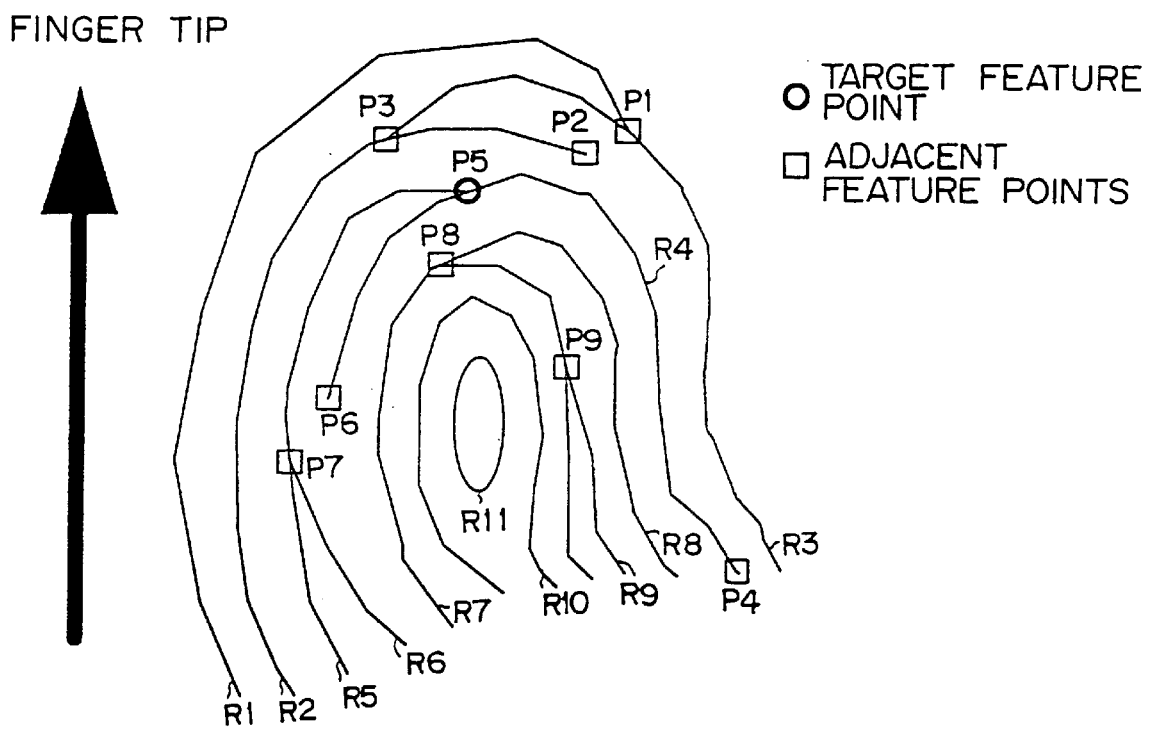
FIG. 4 is a schematic diagram showing a distribution of feature points of a fingerprint according to an embodiment of the present invention.

FIG. 4 is a schematic diagram showing feature points of a fingerprint.

In FIG. 4, ridges R1 to R11 are extracted from a thin line fingerprint image. The ridge R1 is connected to the ridge R3 at a ridge bifurcation P1. The ridge R2 is connected to the ridge R3 at a ridge bifurcation P3. The ridge R2 breaks at a ridge ending P2. The ridge R4 is connected to the ridge R5 at a ridge bifurcation P5. The ridge R4 breaks at ridge endings P4 and P6. The ridge R5 is connected to the ridge R6 at a ridge bifurcation P7. The ridge R7 is connected to the ridge R8 at a ridge bifurcation P8.

In addition, the ridge R7 is connected to the ridge R9 at a ridge bifurcation P9. The ridge bifurcations P1, P3, P5, P7, P8, and P9 and the ridge endings P2, P4, and P6 are feature points of a fingerprint.

Now, a ridge connection relation (geometric structure) from the ridge bifurcation P5 to adjacent feature points is considered. Other feature points connected to the ridge bifurcation P5 through ridges are the ridge ending P6, the ridge bifurcation P7, and the ridge ending P4 at an end of the image. The distances from the ridge bifurcation P5 to these feature points have the relation of ridge ending P6 <ridge bifurcation P7 <ridge ending P4.

Next, consider ridges adjacent to the ridge bifurcation P5. The ridge R2 on the finger tip side has the ridge bifurcation P3 and the ridge ending P2. The ridge R8 on the finger base side has the ridge bifurcation P8. The ridge connection relation with respect to the ridge bifurcation P5 represents positions of feature points that are present on ridges adjacent to the ridge of the ridge bifurcation P5. Hereinafter, the feature points P1 to P4 and P5 to P9 are referred to as adjacent feature points with respect to the feature point P5.

Each of the feature points P1 to P9 of the fingerprint has the above-described ridge connection relation information. In addition, the ridge connection relation information may contain projected feature point information. Projected feature points are projected points of which the feature points P1 to P9 are projected to the adjacent ridges R1 to R11.

Figure 5A:
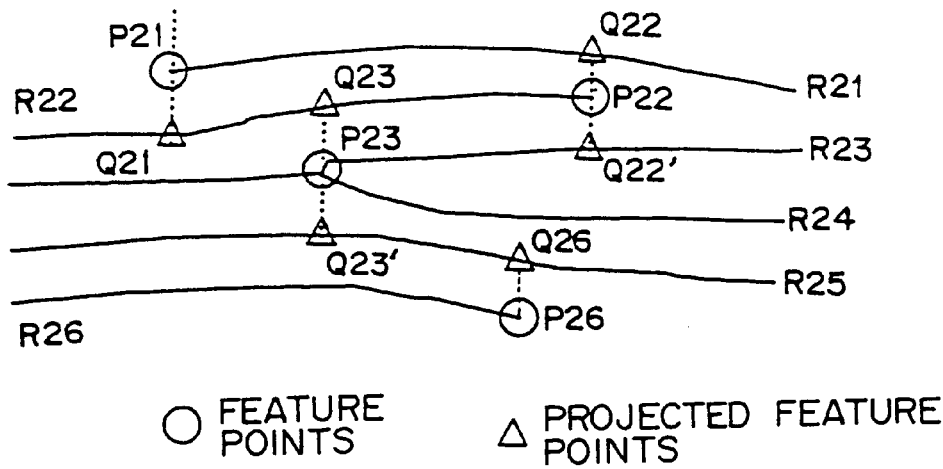
FIG. 5A is a schematic diagram for explaining a generating method of projected feature points according to an embodiment of the present invention.

FIG. 5A is a schematic diagram showing a projecting method for feature points.

In FIG. 5A, ridges R21 to R26 are extracted from a fingerprint image. A ridge ending P21 is present on the ridge R21. A ridge ending P22 is present on the ridge R22. A ridge bifurcation P23 is present on the ridges R23 and R24. A ridge ending P26 is present on the ridge R26. The ridge bifurcation P23 and the ridge endings P21, P22, and P26 are feature points of a fingerprint.

When the ridge ending P21 is projected, a projected feature point Q21 is generated on the ridge R22. When the ridge ending P22 is projected, a projected feature point Q22 is generated on the ridge R21. In addition, a projected feature point Q22' is generated on the ridge R23. When the ridge bifurcation P23 is projected, a projected feature point Q23 is generated on the ridge R22. In addition, a projected feature point Q23' is generated on the ridge R25. When the ridge ending P26 is projected, a projected feature point Q26 is generated on the ridge R25.

Figure 5B:
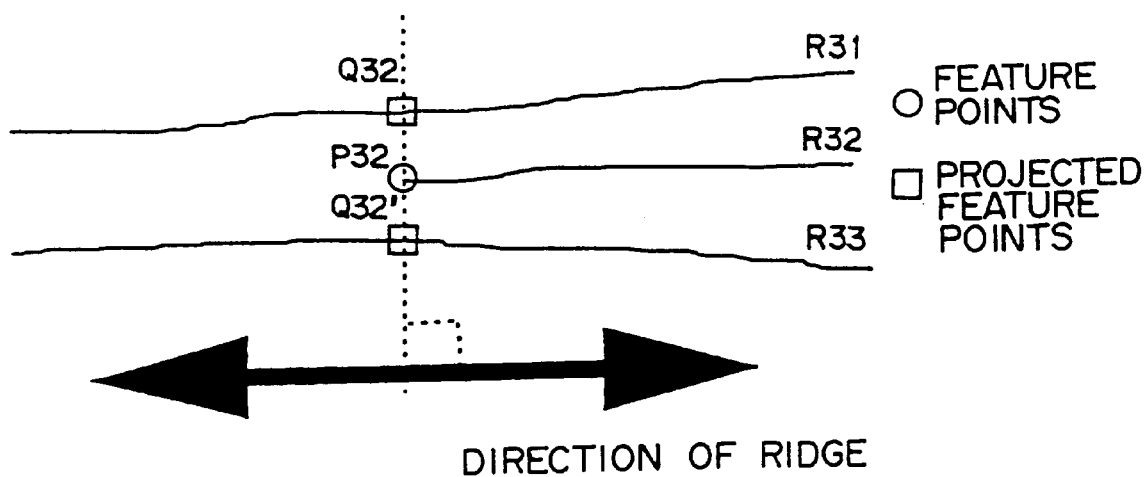
FIG. 5B is a schematic diagram showing a direction in which projected feature points generate.

FIG. 5B is a schematic diagram showing an example of a projection direction.

In FIG. 5B, when a ridge ending P32 on a ridge R32 is projected to ridges R31 and R33, a perpendicular is drawn at the ridge ending P32 from the ridge R32. Points of intersection of the perpendicular and the ridges R31 and R33 are projected feature points Q32 and Q32'. The projection direction is preferably the direction perpendicular to the direction of the ridge R32 at the ridge ending P32. It should be noted that the projection direction is not limited to such a direction.

Next, the ridge connection relation information will be practically described.

The connection relation of a point A and a point B is represented by for example the distance on a ridge. The distance on a ridge is the length of a region AB measured along a ridge that connects the points A and B. With the length for which the points A and B are straightly connected (namely, the shortest distance of the points A and B), the connection relation of the points A and B can be represented.

FIGS. 6A, 6B, and 6C are schematic diagrams showing examples of distances on ridges and a distance-on-ridge calculating method.

In FIGS. 6A and 6B, ridges R41 to R44 are extracted from a fingerprint image. A ridge ending P41 is present on the ridge R41. A ridge ending P42 is present on the ridge R42. A ridge bifurcation P43 is present on the ridges R42 and R43. A ridge ending P44 is present on the ridge R44. The ridge endings P41, P42, and P44 and the ridge bifurcation P43 are feature points of a fingerprint.

When the ridge ending P42 is projected, a projected feature point Q42 is generated on the ridge R41. When the ridge bifurcation P43 is projected, a projected feature point Q43 is generated on the ridge R41. When the ridge ending P44 is projected, a projected feature point Q44 is generated on the ridge R42.

Now, as distances on ridges with respect to the ridge ending P42, a distance on a ridge from the ridge ending P42 to the ridge bifurcation P43 through the ridge R42 (0-th degree main distance), a distance on a ridge from the ridge ending P42 to the projected feature point Q44 through the ridge R42 (0-th degree sub distance), a distance on a ridge from the projected feature point Q42 to the ridge ending P41 through the ridge R41 (first degree main distance), and a distance on a ridge from the projected feature point Q42 to the projected feature point Q43 through the ridge R41 (first degree sub distance) are calculated.

Thus, when the ridge ending P42 is projected to the ridge R41, the distance information relating to the feature point and the projected feature point on the ridge R41 separated from the ridge R42 can be included to distance information with respect to the ridge ending P42.

A distance on a ridge can be calculated on a thin line image of a fingerprint image. In the thin line image of the fingerprint image, each ridge is represented by a line whose width is one pixel. Thus, the value of a distance on a ridge can be represented by the number of pixels of a thin line between two points. For example, in FIG. 6C, when ridges R51 and R52 are present in a thin line image, the distance on a ridge between a ridge ending P51 on the ridge R51 and a ridge bifurcation P52 on the ridge R51 is 20 pixels.

When picture elements are diagonally linked, the route can be obtained more exactly as $\sqrt{2}$ (square root of 2) picture elements because, since each picture element is square, and the length of the diagonal line is obtained by multiplying the length of the side by $\sqrt{2}$. For example, in FIG. 6C, the ridge line from P51 to P52 equals $16+4\sqrt{2}$ picture elements. The lengths of the ridge line can be compared between fingerprint images having different scales if they are represented by physical lengths on actual fingerprints. In this method, the length of the ridge line is expressed as 5 mm, etc.

The distances on ridges can be categorized as the following four types:

1) a distance on a ridge from a target feature point to another feature point through a ridge (namely, a distance on a ridge between two feature points). Hereinafter, this distance on a ridge is referred to as a 0-th degree main distance. Direction information from a target feature point to another feature point may be included in ridge connection relation information.

2) a distance on a ridge from a target feature point to a projected feature point through a ridge (namely, a distance on a ridge from a feature point to a projected feature point). Hereinafter, this distance on a ridge is referred to as a 0-th degree sub distance. Direction information from a target feature point to a projected feature point may be included in ridge connection relation information.

3) a distance on a ridge from a measurement start point to another feature point in the case that a point of which a target feature point is projected to a ridge adjacent to the target feature point spaced apart therefrom by n ridges is the measurement start point (namely, a distance on a ridge from a projected feature point to a feature point). Hereinafter, this distance on a ridge is referred to as an n-th degree main distance (n is an integer other than 0). Direction information from a measurement start point to another feature point may be included in ridge connection relation information.

4) a distance on a ridge from a measurement start point to a projected feature point in the case that a point of which a target feature point is projected to a ridge adjacent to the target feature point spaced apart therefrom by n ridges is the measurement start point (namely, a distance on a ridge from a projected feature point to another projected feature point). Hereinafter, this distance on a ridge is referred to as an n-th degree sub distance (n is an integer other than 0). Direction information from a measurement start point to a projected feature point may be included in ridge connection relation information.

The ridge connection relation may be represented by the number of feature points or the number of projected feature points on a ridge. In other words:

1) the number of projected feature points present in a distance on a ridge from a target feature point to another feature point on a ridge. Hereinafter, the number of these projected feature points is referred to as the number of 0-th degree projected feature points. Direction information from a target feature point to another feature point may be included in ridge connection relation information.

2) the number of projected feature points present in a distance on a ridge from a measurement start point to another feature point in the case that a point of which a target feature point is projected to a ridge spaced apart therefrom by n ridges. Hereinafter, the number of these projected feature points is referred to as the number of n-th degree projected feature points (n is an integer other than 0). Direction information from a measurement start point to a projected feature point may be included in ridge connection relation information.

Each feature point can have ridge connection relation information to at least two adjacent feature points. The ridge connection relation information of one feature point (target feature point) may be composed of the above-described information or a combination thereof.

When fingerprints are identified, it is determined whether or not ridge connection relation information thereof matches. At this point, in consideration of the case that the types of feature points of the registered fingerprint are different from those of the input fingerprint, these fingerprints are identified. When the types of feature points of the registered fingerprint are different from those of the input fingerprint, a ridge structure is deformed so that the types of the feature points become the same. When the identified result in the deformed ridge structure is good, it is determined that the feature points of the registered fingerprint are the same as those of the input fingerprint.

Fingerprints are identified by comparing each feature point. When the match ratio of feature points of the registered fingerprint and the input fingerprint is high, it is determined that the registered fingerprint is the same as the input fingerprint.

As an identifying method for each feature point, it is determined whether or not ridge connection relation information satisfies a predetermined criterion.

In this method, when ridge connection relation information of two feature points matches, it is determined that these feature points are the same. The match ratio of ridge connection relations is defined as an evaluation value. When the evaluation value is high, the match ratio of the ridge connection relation is high. When the match ratio of the ridge connection relation of two feature points exceeds a predetermined value, it is determined that these two feature points are the same.

The match ratio of the ridge connection relations is obtained by a point adding method. In other words, points are designated corresponding to the match ratio of n-th degree main distances/sub distances of feature points. The total point is the match ratio of ridge connection relations of two feature points. Depending on whether or not the types of two feature points to be identified are the same, the method for obtaining the match ratio of the ridge connection relations is changed. Thus, even if the types of feature points are unstably detected, they can be identified.

Figure 7A:
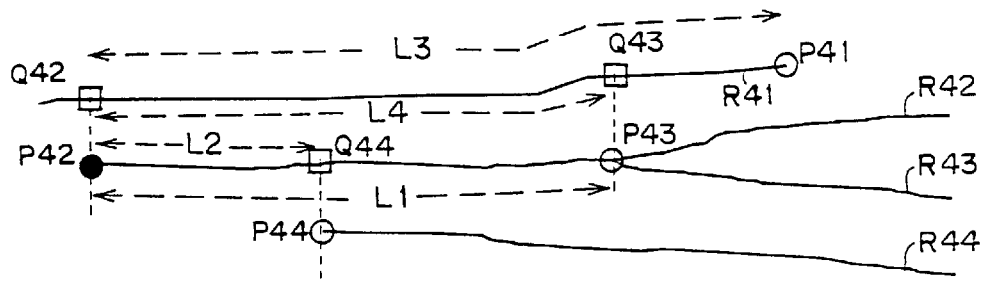
FIG. 7 is a schematic diagram for explaining how a distance on a ridge varies against a distortion of a fingerprint.
Figure 7B:
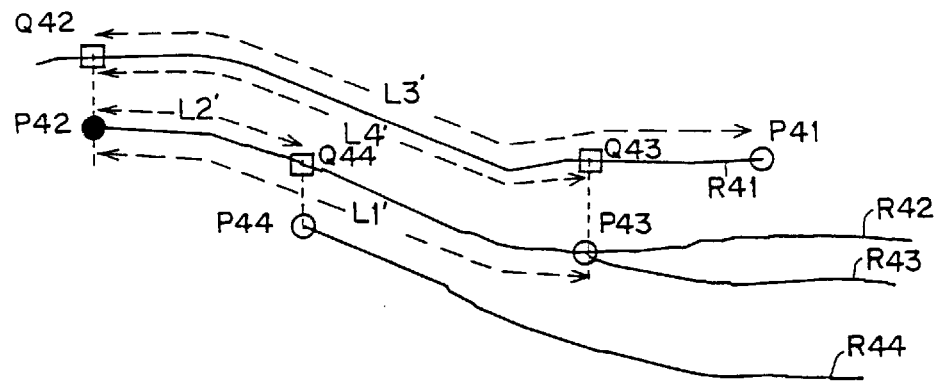

FIGS. 7A and 7B are schematic diagrams for explaining a variation of a distance on a ridge in the case that a fingerprint distorts.

In FIG. 7A, it is assumed that as distances on ridges with respect to a ridge ending P42 a distance on a ridge L1 from the ridge ending P42 to a ridge bifurcation P43, a distance L2 from the ridge ending P42 to a projected feature point Q44, a distance on a ridge L3 from a projected feature point Q42 to a ridge ending P41, and a distance on a ridge L4 from the projected feature point Q42 to a projected feature point Q43 have been registered.

As shown in FIG. 7B, it is assumed that when a fingerprint was identified, it distorted. Thus, as distances on ridges with respect to the ridge ending P42, a distance on a ridge L1' from the ridge ending P42 to the ridge bifurcation P43, a distance on a ridge L2' from the ridge ending P42 to the projected feature point Q44, a distance on a ridge L3' from the projected feature point Q42 to the ridge ending P41, and a distance on a ridge L4' from the projected feature point Q42 to the projected feature point Q43 have been obtained. In this case, even if the fingerprint distorts due to partial expansion, shrinkage, or rotation of the skin, since the lengths of ridges do not almost vary, the relations of L1=L1', L2=L2', L3=L3', and L4=L4' are obtained. Thus, the fingerprint can be identified without influence from the distortion thereof.

In other words, for example, a ridge is treated as a piece of string. A feature point is treated as a knot in the piece of string, or an end thereof. The case that a fingerprint distorts is treated as the case that the shape of the piece of string changes. Thus, it is clear that even if the shape of the piece of string changes and thereby the coordinates of the knots and the ends of the string vary, the length of the string does not vary. Consequently, the distance on a ridge between a knot and an end of the string does not vary. This relation can be applied to a ridge structure. When the fingerprint distorts, the distance on a ridge between feature points on a ridge effectively does not vary. Thus, with a distance on a ridge between feature points as a ridge connection relation, a fingerprint can be accurately identified.

With a ridge connection relation, a ridge structure can be identified in consideration of the relation of positions of feature points on a ridge spaced apart from a particular ridge by a predetermined number of ridges. Thus, the accuracy of the identification of the fingerprint can be improved. In addition, even if a feature point is unstably detected in such a manner that a ridge bifurcation that has been registered is varied to a ridge ending, the fingerprint can be accurately identified.

As another method for identifying each feature point, it may be determined whether the type, position, and direction of one feature point match those of another feature point.

In this method, the match ratio of the positions, types, and directions of feature points is determined so as to identify the feature points. When all the following conditions are satisfied between two feature points, they are treated as the same feature points.

1) The types of the feature points are the same.
2) The difference of the directions of the feature points is within a predetermined threshold value.
3) The distance between features is equal to or smaller than a predetermined threshold, or the difference between the coordinates of the feature points in the common coordinate system is equal to or smaller than a predetermined threshold.

As another method for identifying feature points, it may be determined whether or not the types, positions, and directions of feature points match and whether or not ridge connection relation information satisfies a predetermined criterion.

In this method, by determining the match ratio of positions, types, directions, and ridge connection relations of feature points, the feature points are identified. When all the following conditions are satisfied with two feature points, these feature points are treated as the same feature points.

1) The types of the feature points are the same.
2) The difference of the directions of the feature points is within a predetermined threshold value.
3) The distance between features is equal to or smaller than a predetermined threshold, or the difference between the coordinates of the feature points in the common coordinate system is equal to or smaller than a predetermined threshold.
4) The match ratio of ridge connection relations is a predetermined threshold value or more.

Figure 8:
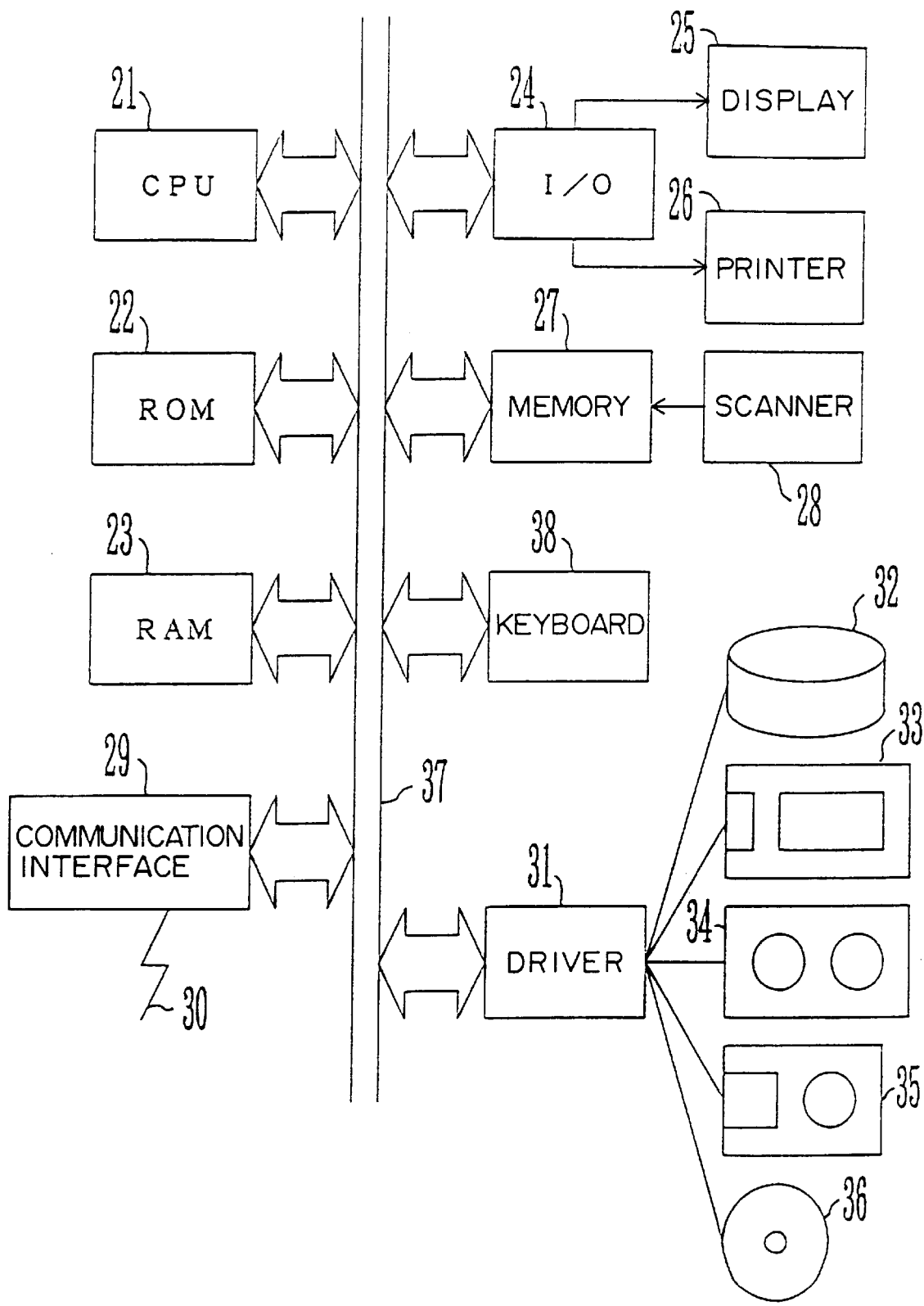
FIG. 8 is a block diagram showing a system structure of a fingerprint identifying apparatus according to an embodiment of the present invention.

FIG. 8 is a block diagram showing a system structure of a fingerprint identifying apparatus according to an embodiment of the present invention.

In FIG. 8, reference numeral 21 is a central processing unit (CPU) that performs overall processes of the system. Reference numeral 22 is a read-only memory (ROM). Reference numeral 23 is a random-access memory (RAM). Reference numeral 24 is an input/output interface. Reference numeral 25 is a display that displays a fingerprint image and an identified result. Reference numeral 26 is a printer that prints a fingerprint image and an identified result. Reference numeral 27 is a memory that temporarily stores data that is read by a scanner 28. Reference numeral 28 is a scanner that reads a fingerprint. Reference numeral 29 is a communication interface. Reference numeral 30 is a communication network. Reference numeral 31 is a driver that drives a storage medium. Reference numeral 32 is a hard disk. Reference numeral 33 is an IC memory card. Reference numeral 34 is a magnetic tape. Reference numeral 35 is a floppy disk. Reference numeral 36 is an optical disc such as CD-ROM or DVD-ROM. Reference numeral 37 is a bus. Reference numeral 38 is a keyboard.

A program that performs a fingerprint registering process, a program that performs a fingerprint identifying process, ridge connection relation information, and so forth are stored in a storage medium such as the hard disk 32, the IC memory card 33, the magnetic tape 34, the floppy disk 35, or the optical disc 36. The program that performs the fingerprint registering process is read from the storage medium to the RAM 23 so as to register a fingerprint. In addition, the program that performs the fingerprint identifying process, the ridge connection relation information, and so forth are read from the storage medium to the RAM 23 so as to identify a fingerprint. Alternatively, the program that performs the fingerprint registering process, the program that performs the fingerprint identifying process, the ridge connection relation information, and so forth may be stored in the ROM 22.

Alternatively, the program that performs the fingerprint registering process, the program that performs the fingerprint identifying process, the ridge connection relation information, and so forth can be downloaded from the communication network 30 through the communication interface 29. Examples of the communication network 30 connected to the communication interface 29 are LAN (Local Area Network), WAN (Wide Area Network), Internet, analog telephone network, digital telephone network (ISDN: Integrated Service Digital Network), PHS (Personal Handyphone System), and radio communication network (such as satellite communication).

When the program that performs the fingerprint registering process gets started, the CPU 21 receives fingerprint image data that has been read by the scanner 28. When the CPU 21 receives the fingerprint image data that has been read by the scanner 28, the CPU 21 extracts ridge connection relation information from the fingerprint image data and stores the extracted ridge connection relation information for each person.

When the program that performs the fingerprint identifying process gets started, the CPU 21 receives the fingerprint image data that has been read by the scanner 28. When the CPU 21 receives the fingerprint image data that has been read by the scanner 28, the CPU 21 extracts ridge connection relation information from the fingerprint image data. In addition, the CPU 21 obtains ridge connection relation information from the storage medium or the communication network 30. The CPU 21 identifies the obtained ridge connection relation information and the extracted ridge connection relation information and outputs the identified result to the display 25 or the printer 26.

Figure 9:
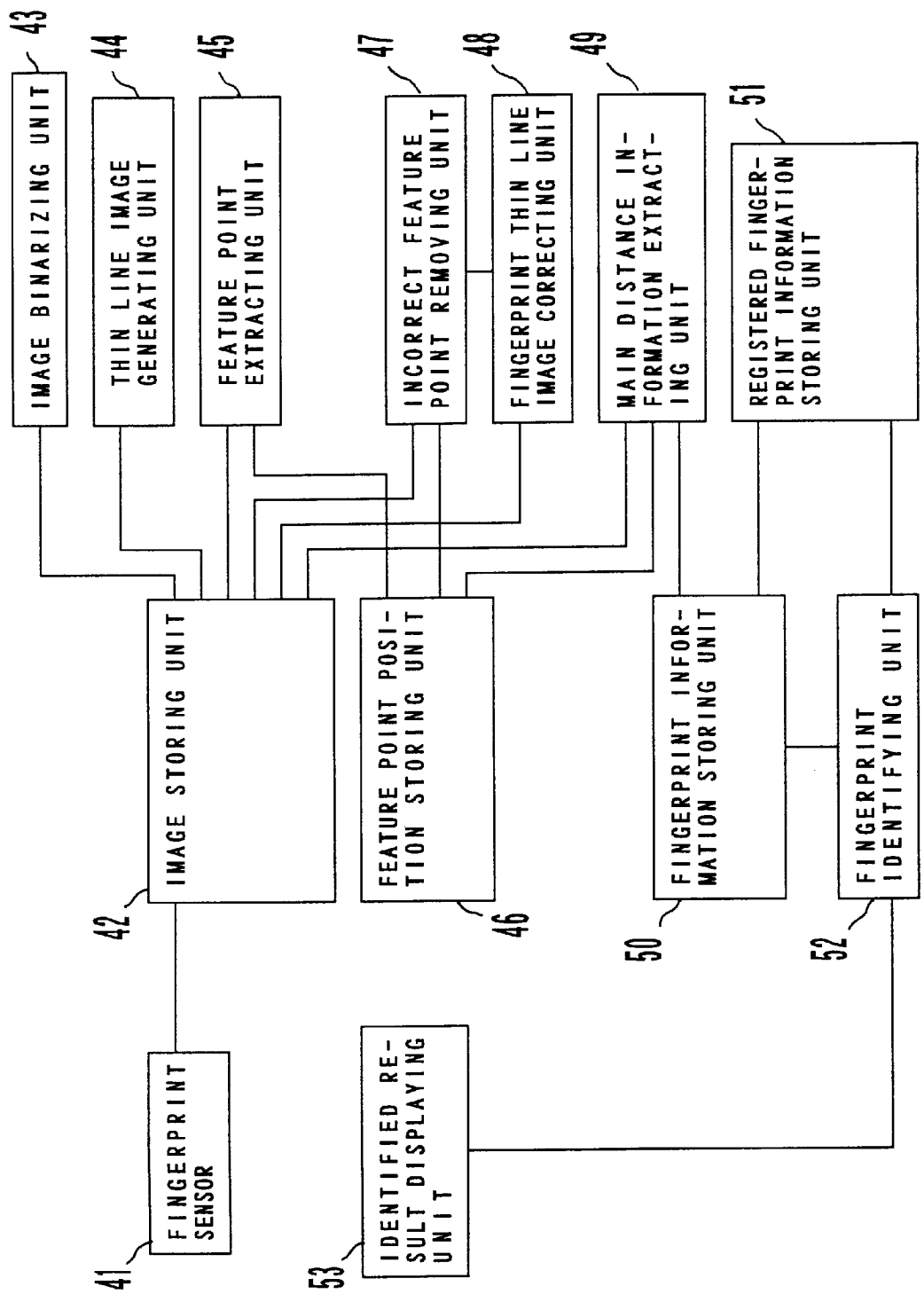
FIG. 9 is a block diagram showing the structure of a fingerprint identifying apparatus according to a third embodiment of the present invention.

FIG. 9 is a block diagram showing the structure of a fingerprint identifying apparatus according to a third embodiment of the present invention. In the third embodiment, when a fingerprint is registered, the n-th degree main distance (n=−m, . . . , −1, 0, 1, . . . , m) of each feature point is recorded. However, one main distance is recorded for each ridge sectioned by a feature point. By comparing the n-th degree main distance of each feature point, a fingerprint is identified.

In FIG. 9, a fingerprint sensor 41 samples fingerprint image data from a finger of a human being or an animal. An image storing unit 42 stores fingerprint image data sampled by the fingerprint sensor 41 or stores image data that has been processed. An image binarizing unit 43 converts a multi-value image stored in the image storing unit 42 into a binary image. A thin line image generating unit 44 generates thin lines with the binary image binarized by the image binarizing unit 43 and generates thin line image data. A feature point extracting unit 45 detects positions of feature points from the thin line image of a fingerprint and stores the detected result in a feature point position storing unit 46. The feature point position storing unit 46 store positions of feature points in the fingerprint image. An incorrect feature point removing unit 47 detects incorrect feature points from the extracted feature points of the thin line image of a fingerprint so as to remove the incorrect feature point information from the feature point position storing unit 46. In addition, the incorrect feature point removing unit 47 sends the incorrect feature point information to a fingerprint thin line image correcting unit 48. The fingerprint thin line image correcting unit 48 corrects the fingerprint thin line image corresponding to the incorrect feature point information received from the incorrect feature point removing unit 47. A main distance information extracting unit 49 extracts ridge connection relation information (fingerprint information) of each feature point from the thin line image of a fingerprint stored in the image storing unit 42 and from the feature point positions stored in the feature point position storing unit 46 and outputs the results to a fingerprint information storing unit 50. The fingerprint information storing unit 50 stores ridge connection relation information of each feature point extracted by the main distance information extracting unit 49. A registered fingerprint information storing unit 51 stores fingerprint information registered in the fingerprint identifying apparatus. A fingerprint identifying unit 52 identifies fingerprint information obtained from the input fingerprint with registered fingerprint information stored in the registered fingerprint information storing unit 51 and sends the identified result to an identified result displaying unit 53. The identified result displaying unit 53 sends the identified result to the user of the fingerprint identifying apparatus through a display and/or a speaker.

The main distance information extracting unit 49 calculates the n-th degree main distance (n=−m, −1, 0, 1, . . . , m) as ridge connection relation information.

Figure 10:
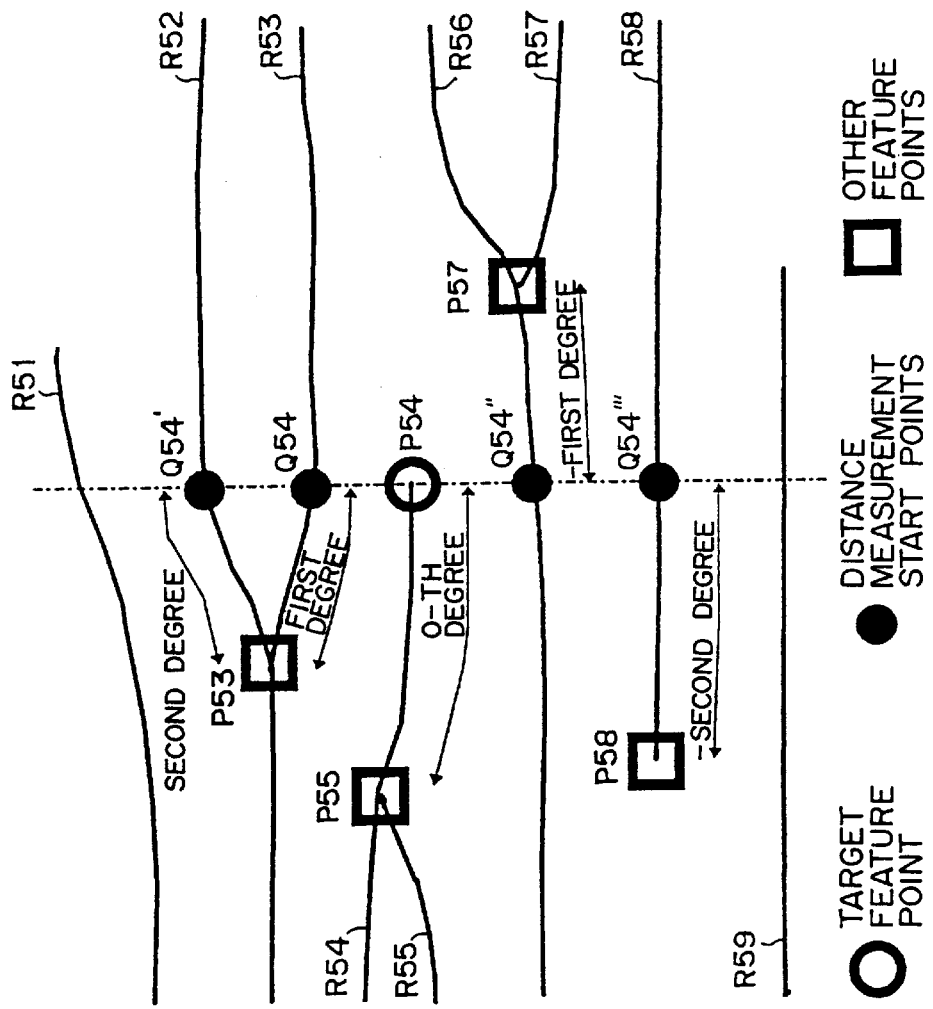
FIG. 10 is a schematic diagram for explaining a main distance calculating method corresponding to a ridge ending.

FIG. 10 is a schematic diagram for explaining a method for calculating the n-th degree main distance corresponding to a ridge ending.

In FIG. 10, ridges R51 to R59 are extracted from a fingerprint image. A ridge bifurcation P53 is present on the ridges R52 and R53. A ridge ending P54 is present on the ridge R54. A ridge bifurcation P55 is present on the ridges R54 and R55. A ridge bifurcation P57 is present on the ridges R56 and R57. A ridge ending P58 is present on the ridge R58. The ridge endings P54 and P58 and the ridge bifurcations P53, P55, and P57 are feature points of a fingerprint.

When the ridge ending P54 is projected, a projected feature point Q54 is generated on the ridge R53. A projected feature point Q54' is generated on the ridge R52. A projected feature point Q54" is generated on the ridge R56. A projected feature point Q54'" is generated on the ridge R58.

In this case, as distances on ridges with respect to the ridge ending P54, a distance on ridges from the ridge ending P54 to the ridge bifurcation P55 (0-th degree main distance), a distance on a ridge from the projected feature point Q54 to the ridge bifurcation P53 (first degree main distance), a distance on a ridge from the projected feature point Q54' to the ridge bifurcation P53 (second degree main distance), a distance on a ridge from the projected feature point Q54" to the ridge bifurcation P57 (−first degree main distance), and a distance on a ridge from the projected feature point Q54'" to the ridge ending P58 (−second degree main distance on a ridge) are calculated.

The 0-th degree main distance represents the distance on a ridge from a target feature point to another feature point. The n-th degree main distance (n is an integer other than 0) represents the distance on a ridge from a measurement start point to another feature point in the case that the target feature point is projected to the ridge of the feature point spaced apart therefrom by n ridges. The sign of the degree n is plus or minus depending on whether a ridge to which the target feature point is projected is present above or below the target feature point.

Figure 11:
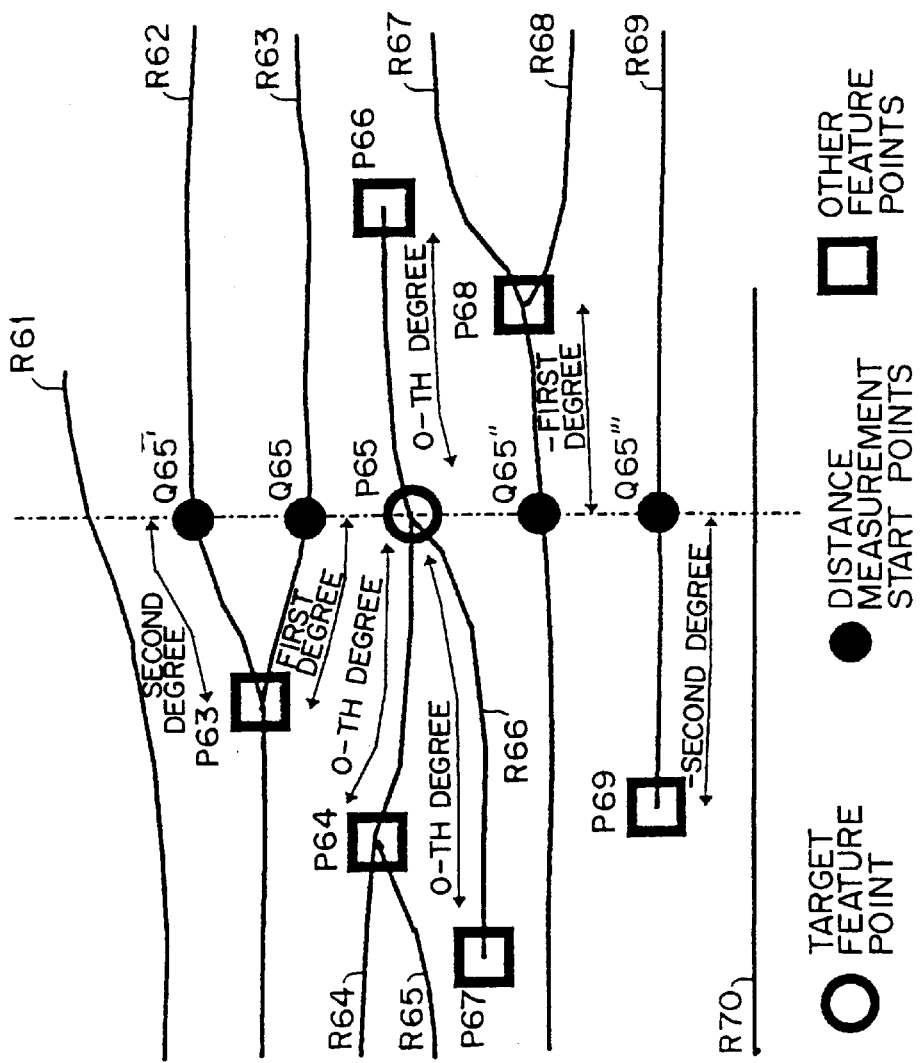
FIG. 11 is a schematic diagram for explaining a main distance calculating method corresponding to a ridge bifurcation.

FIG. 11 is a schematic diagram for explaining a method for calculating the n-th degree main distance corresponding to a ridge bifurcation.

In FIG. 11, ridges R61 to R70 are extracted from a fingerprint image. A ridge bifurcation P63 is present on the ridges R62 and R63. A ridge bifurcation P64 is present an the ridges R64 and R65. A ridge bifurcation P6 5 is present on the ridges R64 and R66. Ridge endings P66 and P67 are present on the ridge R66. A ridge bifurcation P6 8 is present on the ridges R67 and R68. A ridge ending P69 is present on the ridge R69. The ridge endings P66, P67, and P69 and the ridge bifurcations P63, P64, P65, and P68 are feature points of a fingerprint.

When the ridge bifurcation P65 is projected, a projected feature point Q65 is generated on the ridge R63. A projected feature point Q65' is generated on the ridge R62. A projected feature point Q65" are generated on the ridge R67. A projected feature point Q65'" is generated on the ridge R69.

As distances on ridges with respect to the ridge bifurcation P65, a distance on a ridge from the ridge bifurcation P65 to the ridge bifurcation P64 (0-th degree main distance), a distance on a ridge from the ridge bifurcation P65 to the ridge bifurcation P67 (0-th degree main distance), a distance on a ridge from the ridge bifurcation P65 to the ridge ending P66 (0-th degree main distance), a distance on a ridge from the projected feature point Q65 to the ridge bifurcation P63 (first degree main distance), a distance on a ridge from the projected feature point Q65' to the ridge bifurcation P63 (second degree main distance), a distance on a ridge from the projected feature point Q65" to the ridge bifurcation P68 (−first degree main distance), and a distance on a ridge from the projected feature point Q65'" to the ridge ending P69 (−second degree main distance) are calculated.

Thus, the ridge bifurcation P65 can have three 0-th degree main distances.

Figure 12:
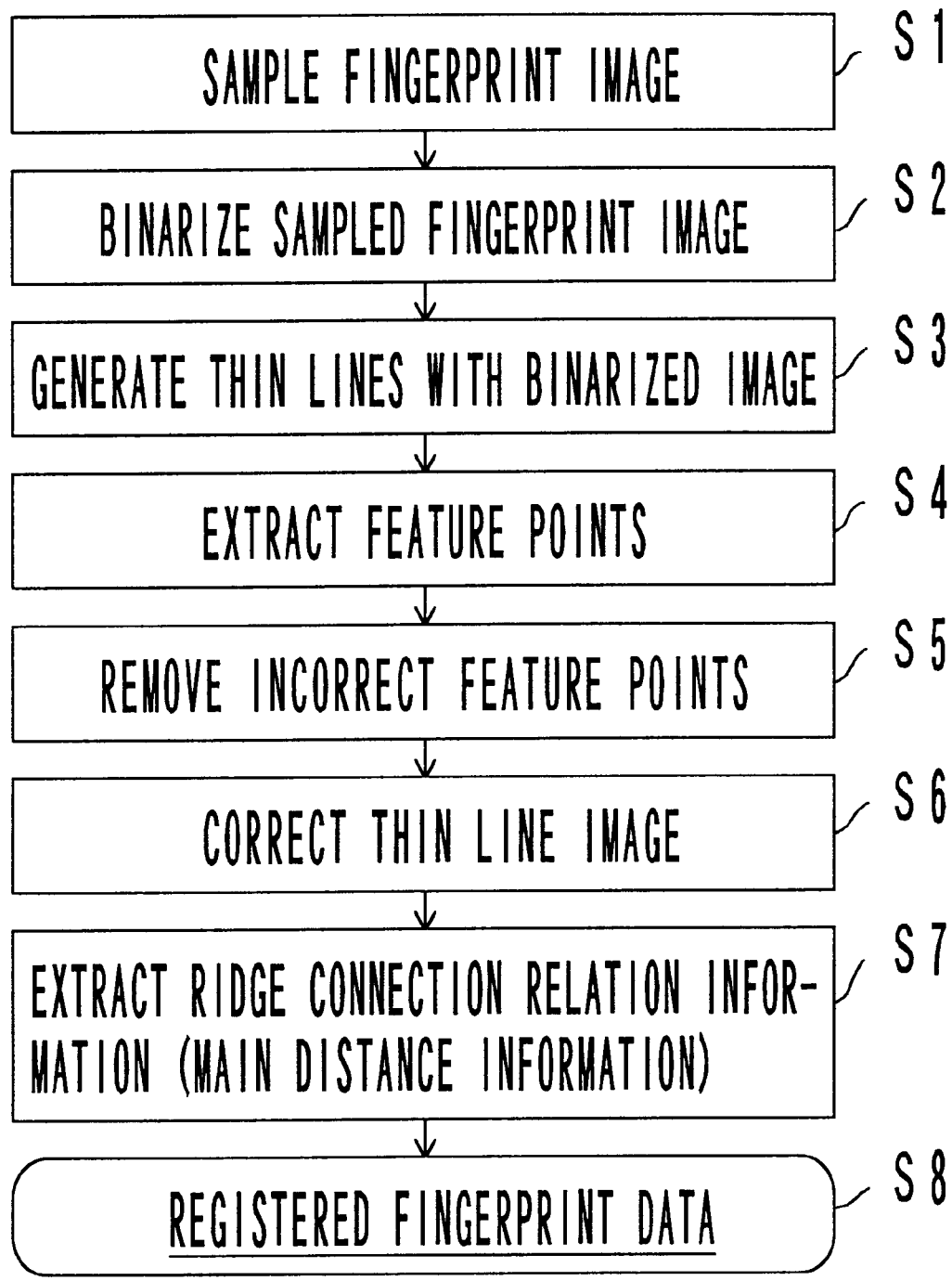
FIG. 12 is a flowchart showing a fingerprint registering process of the fingerprint identifying apparatus shown in FIG. 9.

FIG. 12 is a flowchart showing a fingerprint registering process of the fingerprint identifying apparatus shown in FIG. 9.

In FIG. 12, fingerprint image data is sampled by the fingerprint sensor 41 or the like (at step S1). Next, the image binarizing unit 43 binarizes the obtained fingerprint image and obtains a fingerprint binarized image (at step S2). The thin line image generating unit 44 generates thin lines with the fingerprint binarized image and obtains a thin line image of a fingerprint (at step S3). Next, the feature point extracting unit 45 extracts the positions of feature points of the fingerprint from the thin line image of a fingerprint (at step S4). The extracted fingerprint feature points generally contain incorrect feature points. Thus, the incorrect feature point removing unit 47 removes incorrect feature points from the obtained fingerprint feature points (at step S5). Since the incorrect feature points take place due to an error of the thin line image of a fingerprint (crack and adhesion of a ridge), the fingerprint thin line image correcting unit 48 corrects the thin line image of a fingerprint (at step S6). Next, the main distance information extracting unit 49 measures the n-th degree main distance (n=−m, . . . , −1, 0, 1, . . . , m) for each feature point (at step S7). In other words, each feature point has (2m+1) or (2m+3) main distances. The main distance information is stored as fingerprint information in the registered fingerprint information storing unit 51 (at step S8).

Figure 13:
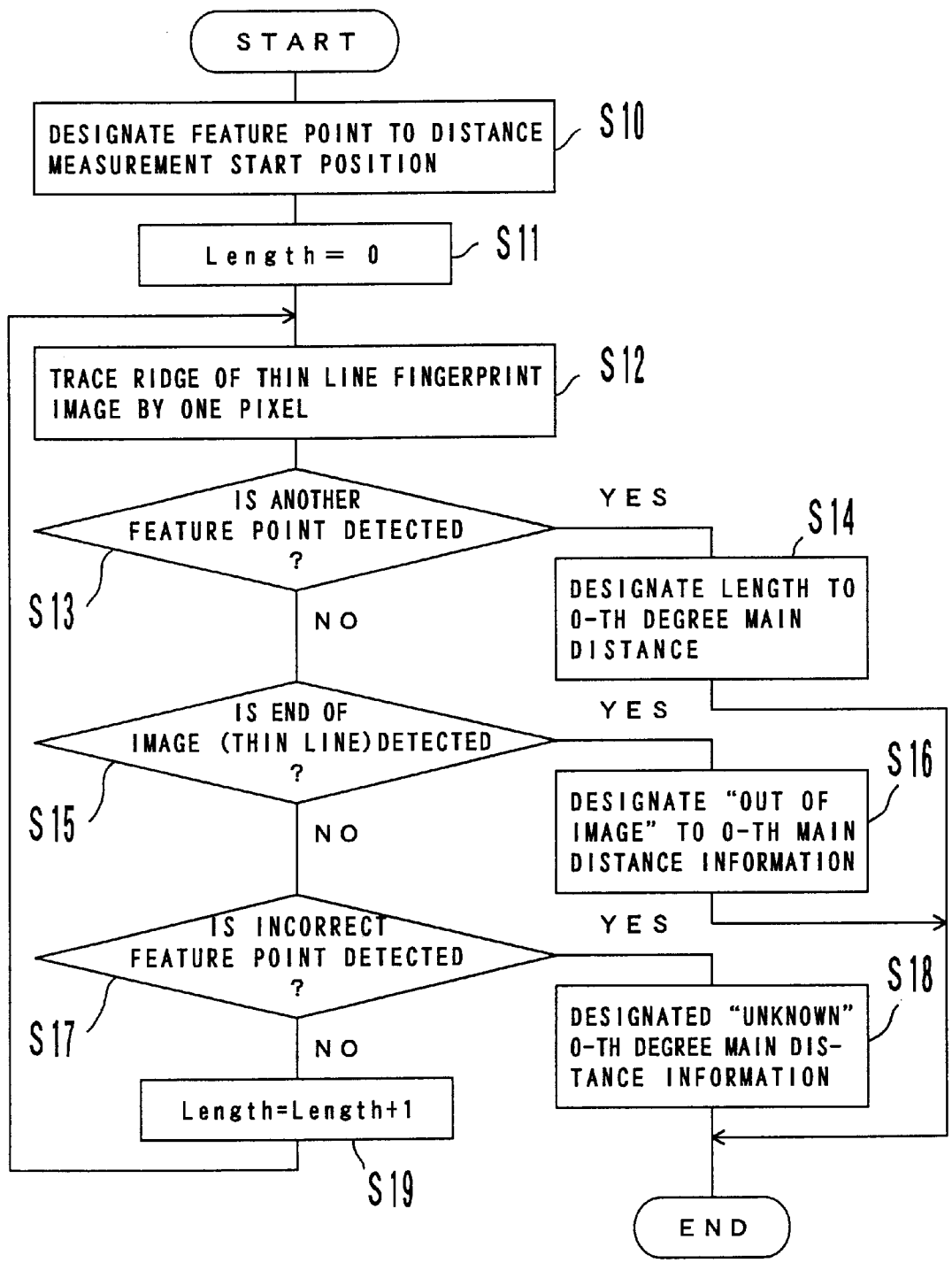
FIG. 13 is a flowchart showing a distance-on-ridge calculating process of the fingerprint identifying apparatus shown in FIG. 9 in the case that a feature point is designated to a measurement start point.

FIG. 13 is a flowchart showing a distance on a ridge calculating process of the fingerprint identifying apparatus shown in FIG. 9 in the case that a feature point is designated to a measurement start point.

In FIG. 13, a feature point is designated to a measurement start position (at step S10). A measured value Length is designated to "0" (at step S11).

Next, a ridge of the thin line fingerprint image is traced by one pixel (at step S12). When another feature point is detected (at step S13), the measured value Length is designated to the 0-th degree main distance (at step S14). When the ridge of the thin line fingerprint image is traced by one pixel, if an edge of the image is detected (at step S15), "out of image" is designated to the 0-th degree main distance information (at step S16). When the ridge of the thin line fingerprint image is traced by one pixel, if an incorrect feature point is detected (at step S17), "unknown" is designated to the 0-th degree main distance information (at step S18).

When the ridge of the thin line fingerprint image is traced by one pixel, if the above-described conditions are not satisfied, the measured value Length is incremented by 1 (at step S19). Thereafter, the flow returns to step S12. At step S12, the searching process is continued.

FIG. 14 is a flowchart showing a distance-on-ridge calculating process of the fingerprint identifying apparatus shown in FIG. 9 in the case that a projected feature point is designated to a measurement start point.

In FIG. 14, a projected feature point on a ridge spaced apart from a target feature point by n ridges is designated to a measurement start point (at step S20). A measured value Length is designated to 0 (at step S21).

Next, a ridge of the thin line fingerprint image is traced by one pixel (at step S22). When another feature point is detected (at step S23), the measured value Length is designated to the n-th degree main distance (at step S24). When the ridge of the thin line fingerprint image is traced by one pixel, if an end of the image is detected (at step S25), "out of image" is designated to the n-th degree main distance information (at step S26). When the ridge of the thin line fingerprint image is advanced by one pixel, if an incorrect feature point is detected (at step S27), "unknown" is designated to the n-th degree main distance information (at step S28).

On the other hand, when the ridge of the thin line fingerprint image is traced by one pixel, if the above-described conditions are not satisfied, the measured value Length is incremented by 1 (at step S29). Thereafter, the flow returns to step S22. At step S22, the searching process is continued.

FIG. 15 is a flowchart showing a fingerprint identifying process of the fingerprint identifying apparatus shown in FIG. 9.

In FIG. 15, fingerprint image data is sampled by the fingerprint sensor 41 or the like (at step S30). Next, the image binarizing unit 43 binarizes the obtained fingerprint image and obtains a fingerprint binarized image (at step S31). Thereafter, the thin line image generating unit 44 generates thin lines with the fingerprint binarized image and obtains a thin line image of a fingerprint (at step S32). Next, the feature point extracting unit 45 extracts the positions of feature points of the fingerprint from the thin line image of a fingerprint (at step S33). The extracted feature points generally contain incorrect feature points. Thus, the incorrect feature point removing unit 47 removes incorrect feature points from the obtained fingerprint feature points (at step S34). Since the incorrect feature point portion takes place due to an error of the thin line image of a fingerprint (crack and adhesion of a ridge), the fingerprint thin line image correcting unit 48 corrects the thin line image of a fingerprint (at step S35). Next, the main distance information extracting unit 49 measures the n-th degree main distance (n=−m, . . . , −1, 0, 1, . . . , m) for each feature point (at step S36).

Next, the main distance information is read from the registered fingerprint information storing unit 51 (at step S37). In combinations of all feature points of the registered fingerprint and the input fingerprint, the match ratio of the ridge connection relations thereof is calculated. The number of combinations of feature points whose match ratios exceed a predetermined value is counted (at step S38). According to the third embodiment, fingerprint information does not contain sub distance information. Thus, the match ratio of the ridge connection relations represents whether or not the main distances of the same degree match within a predetermined error.

Next, the number of all feature points in the registered fingerprint and the input fingerprint is counted. The number of the same feature points is normalized with the number of all feature points and thereby a fingerprint match ratio is calculated (at step S39). When the fingerprint match ratio exceeds a predetermined value, it is determined that these fingerprints are the same fingerprints (at step S40). On the other hand, when the fingerprint match ratio is equal to or smaller than the predetermined value, it is determined that these fingerprints are different fingerprints (at step S41).

Thus, in the case that feature points of the registered fingerprint and those of the input fingerprint are identified, when the connection relations of feature points and ridges of the registered fingerprint and those of the input fingerprint are identified instead of the positions, types, and directions of feature points thereof, the feature points can be correctly identified without an influence of expansion, shrinkage, and rotation of the skin.

When the ridge connection relation information is represented by the distance on a ridge between feature points, a ridge structure adjacent to one feature point can be simply represented. Ridge structures can be easily identified without need to use graph theory or the like.

In addition, the concept of a projected feature point is newly employed for representing the ridge connection relation information. When a ridge structure is represented by the distance on a ridge between a feature point and a projected feature point, a detailed ridge structure can be easily represented. Ridge structures can be easily identified.

By adding the center coordinates of the fingerprint and the coordinates, type, and direction of each feature point to fingerprint information, the fingerprint can be accurately identified at high speed. For example, with the center coordinates of the registered fingerprint and input fingerprint, these fingerprints are roughly aligned beforehand. When the ridge connection relation information of two feature points is identified, if the deviation of the coordinates of the feature points exceeds a predetermined error, regardless of the match ratio of the ridge connection relations, it is determined that these feature points are different feature points. Thus, the calculations of the match ratios of the ridge connection relations are omitted. Consequently, the identification time can be shortened. In addition, when two feature points are identified along with the types and directions thereof, they can be accurately identified.

Figure 16:
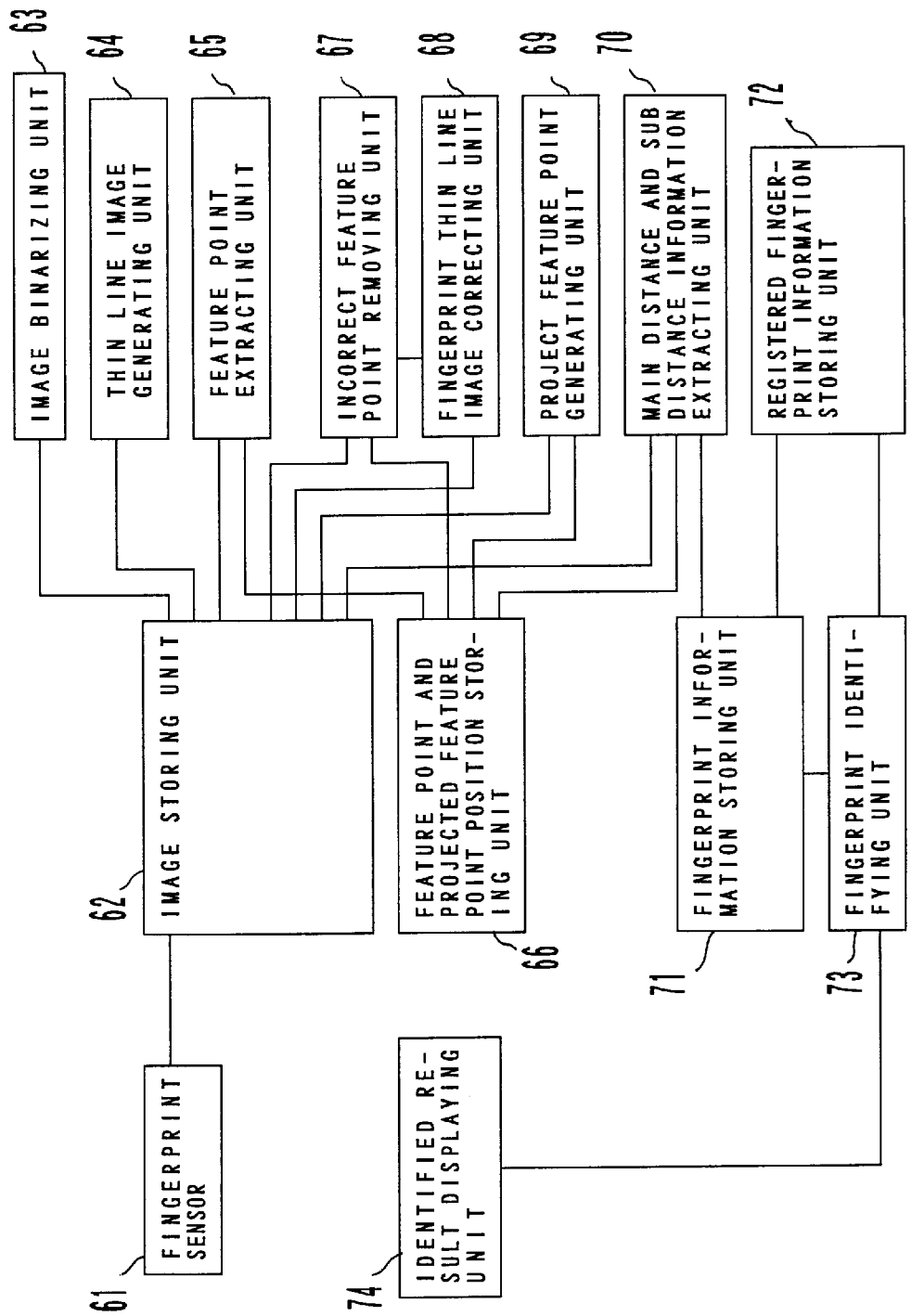
FIG. 16 is a block diagram showing the structure of a fingerprint identifying apparatus according to a fourth embodiment of the present invention.

FIG. 16 is a block diagram showing the structure of a fingerprint identifying apparatus according to a fourth embodiment of the present invention. In the fourth embodiment, when a fingerprint is registered, the following fingerprint information is recorded.

1) n-th degree main distance for each feature point (n=−m, ..., −1, 0, 1, ..., m) where one main distance is recorded for each ridge sectioned by a feature point.

2) n-th sub distance for each feature point (n=−m, ..., −1, 0, 1, ..., m)

where one sub distance is recorded for each ridge sectioned by a feature point.

By comparing the n-th degree main distance and the n-th degree sub distance of each feature point, fingerprints are identified.

In FIG. 16, a fingerprint sensor 61 samples fingerprint image data of a finger of a human being or an animal. An image storing unit 62 stores the fingerprint image data sampled by the fingerprint sensor 61. Alternatively, the image storing unit 62 stores image data that has been processed. An image binarizing unit 63 converts a multi-value image stored in the image storing unit 62 into a binary image. A thin line image generating unit 64 generates thin lines with the binary image binarized by the image binarizing unit 63 and generates thin line image data of the fingerprint. A feature point extracting unit 65 detects the positions of feature points from the thin line image of a fingerprint. The detected positions are stored in a feature point and projected feature point position storing unit 66. The feature point and projected feature point position storing unit 66 stores the positions of the feature points extracted by the feature point extracting unit 65. In addition, the feature point and projected feature point position storing unit 66 stores position information of projected feature points generated by a projected feature point generating unit 69. An incorrect feature point removing unit 67 detects incorrect feature points from the feature points of the thin line image of a fingerprint so as to remove the incorrect feature point information from the feature point and projected feature point position storing unit 66. In addition, the incorrect feature point removing unit 67 sends the incorrect feature point information to a fingerprint thin line image correcting unit 68. The fingerprint thin line image correcting unit 68 corrects the thin line image of a fingerprint corresponding to the incorrect feature point information received from the incorrect feature point removing unit 67.

A projected feature point generating unit 69 generates projected feature points corresponding to all feature points with the corrected thin line image of a fingerprint from which the incorrect feature points have been removed and the positions of the feature points. A main distance and sub distance information extracting unit 70 obtains ridge connection relation information of each feature point corresponding to the thin line image of a fingerprint stored in the image storing unit 62 and the positions of the feature points and projected feature points stored in the feature point and projected feature point position storing unit 66 and outputs the ridge connection relation information to a fingerprint information storing unit 71.

The fingerprint information storing unit 71 stores the ridge connection relation information of each feature point and each projected feature point extracted by the main distance and sub distance information extracting unit 70. A registered fingerprint information storing unit 72 stores fingerprint information registered in the fingerprint identifying apparatus. A fingerprint identifying unit 73 identifies fingerprint information obtained by the input fingerprint and the fingerprint information of the registered fingerprint stored in the registered fingerprint information storing unit 72 and sends the identified result to an identified result displaying unit 74. The identified result displaying unit 74 sends the identified result to the user of the fingerprint identifying apparatus with the display and/or speaker.

Figure 17:
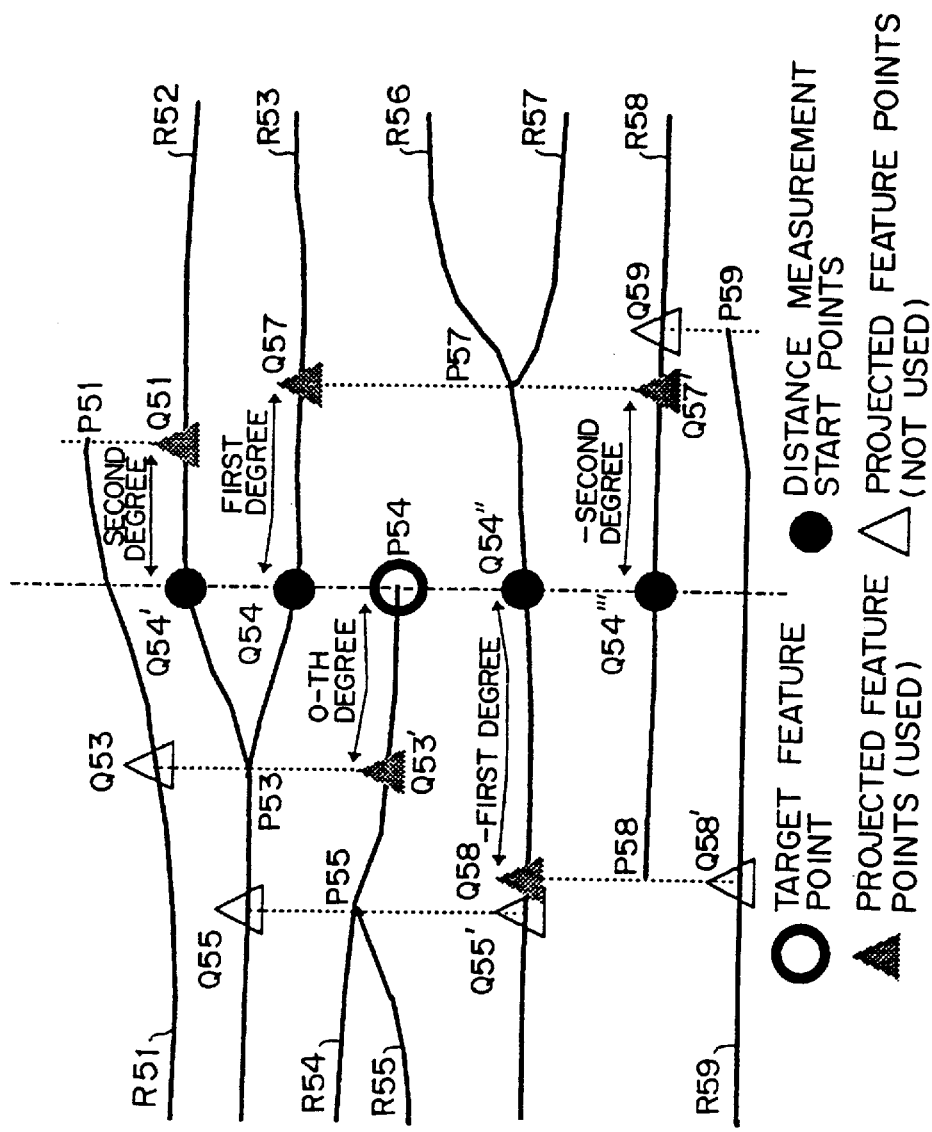
FIG. 17 is a schematic diagram for explaining a sub distance-on-ridge calculating method corresponding to a ridge ending.

FIG. 17 is a schematic diagram for explaining a sub distance calculating method corresponding to a ridge ending.

In FIG. 17, ridges R51 to R59 are extracted from a fingerprint image. A ridge ending P51 is present on the ridge R51. A ridge bifurcation P53 is present on the ridges R52 and R53. A ridge ending P54 is present on the ridge R54. A ridge bifurcation P55 is present on the ridges R54 and R55. A ridge bifurcation P57 is present on the ridges R56 and R57. A ridge ending P58 is present on the ridge R58. A ridge ending P59 is present on the ridge R59. The ridge endings P51, P54, P58, and P59, and the ridge bifurcations P53, P55, and P57 are feature points of a fingerprint.

When the ridge ending P54 is projected, a projected feature point Q54 is generated on the ridge R53. A projected feature point Q54' is generated on the ridge R52. A projected feature point Q54'' is generated on the ridge R56. A projected feature point Q54''' is generated on the ridge R58.

When the ridge ending P51 is projected, a projected feature point Q51 is generated on the ridge R52. When the ridge bifurcation P53 is projected, a projected feature point Q53 is generated on the ridge R51. In addition, a projected feature point Q53' is generated on the ridge R54. When the ridge bifurcation P55 is projected, a projected feature point Q55 is generated on the ridge R52. In addition, a projected feature point Q55' is generated on the ridge R56. When the ridge bifurcation P57 is projected, a projected feature point Q57 is generated on the ridge R53. In addition, a projected feature point Q57' is generated on the ridge R58. When the ridge ending P58 is projected, a projected feature point Q58 is generated on the ridge R56. A projected feature point Q58' is generated on the ridge R59. When the ridge ending P59 is projected, a projected feature point Q59 is generated on the ridge R58.

As distances on ridges with respect to the ridge ending P54, a distance on a ridge from the ridge ending P54 to the projected feature point Q53' (0-th degree sub distance), a distance on a ridge from the projected feature point Q54 to the projected feature point Q57 (first degree sub distance), a distance on a ridge from the projected feature point Q54' to the projected feature point Q51 (second degree sub distance), a distance on a ridge from the projected feature point Q54'' to the projected feature point Q58 (−first degree sub distance), and a distance on a ridge from the projected feature point Q54''' to the projected feature point Q57' (−second degree sub distance) are calculated.

The 0-th degree sub distance represents the distance on a ridge from a target feature point to a projected feature point through a ridge. The n-th degree sub distance (n≠0) represents the distance on a ridge from a distance measurement start point to another projected feature point in the case that the distance measurement start point is a projected feature point of which a target feature point is projected to a ridge spaced apart therefrom by n ridges as with the n-th degree main distance. The sign of the degree n is plus or minus.

Figure 18:
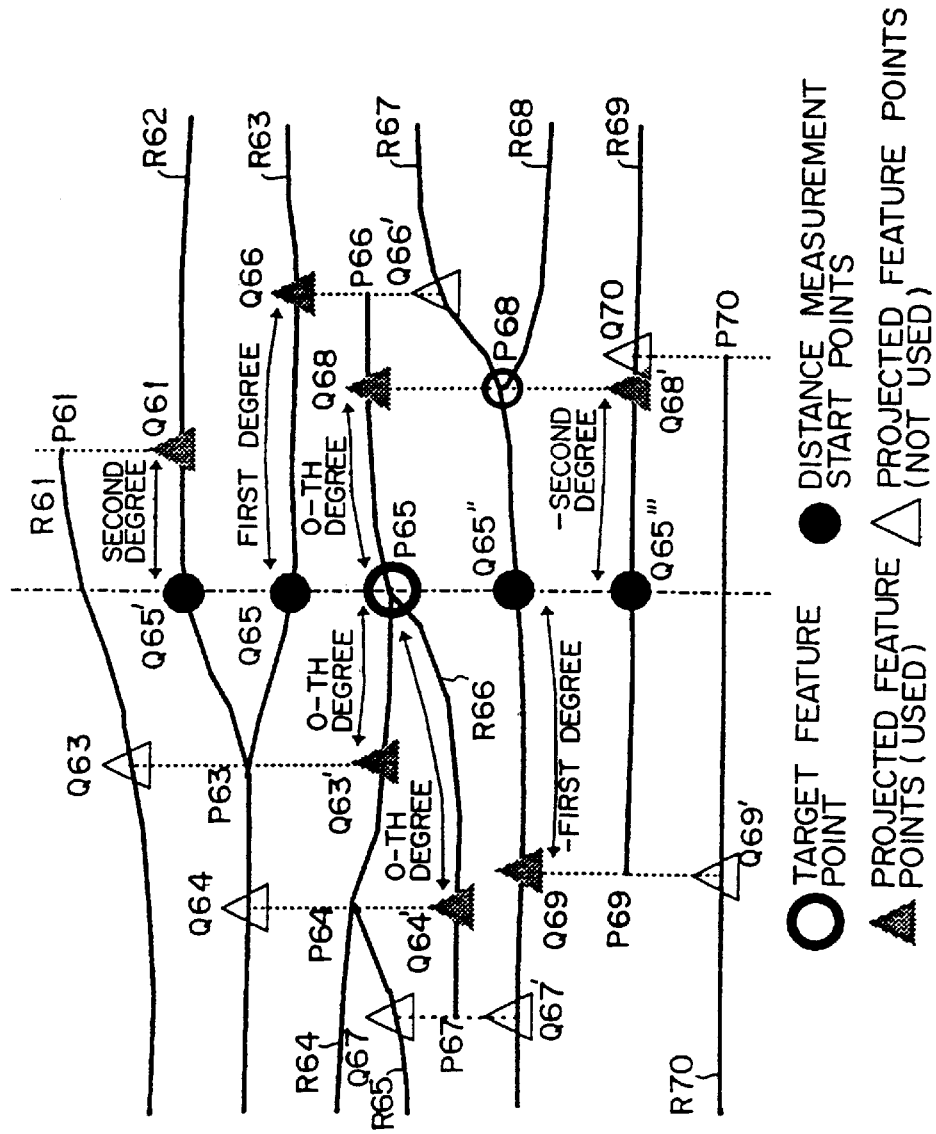
FIG. 18 is a schematic diagram for explaining a sub distance-on-ridge calculating method corresponding to a ridge bifurcation.

FIG. 18 is a schematic diagram for explaining a sub distance calculating method corresponding to a ridge bifurcation.

In FIG. 18, ridges R61 to R70 are extracted from a fingerprint image. A ridge ending P61 is present on the ridge R61. A ridge bifurcation P63 is present on the ridges R62 and R63. A ridge bifurcation P64 is present on the ridges R64 and R65. A ridge bifurcation P65 is present on the ridges R64 and R66. Ridge endings P66 and P67 are present on the ridge R66. A ridge bifurcation P68 is present on the ridges R67 and R68. A ridge ending P69 is present on the ridge R69. A ridge ending P70 is present on the ridge R70. The ridge endings P61, P66, P67, P69, and P70 and the ridge bifurcations P63, P64, P65, and P68 are feature points of a fingerprint.

When the ridge bifurcation P65 is projected, a projected feature point Q65 is generated on the ridge R63. In addition, a projected feature point Q65' is generated on the ridge R62. A projected feature point Q65" is generated on the ridge R67. A projected feature point Q65'" is generated on the ridge R69.

When the ridge ending P61 is projected, a projected feature point Q61 is generated on the ridge R62. When the ridge bifurcation P63 is projected, a projected feature point Q63 is generated on the ridge R61. In addition, a projected feature point Q63' is generated on the ridge R64. When the ridge bifurcation P64 is projected, a projected feature point Q64 is generated on the ridge R62. In addition, a projected feature point Q64' is generated on the ridge R66. When the ridge ending P66 is projected, a projected feature point Q66 is generated on the ridge R63. In addition, a projected feature point Q66' is generated on the ridge R67. When the ridge ending P67 is projected, a projected feature point Q67 is generated on the ridge R65. In addition, a projected feature point Q67' is generated on the ridge R67. When the ridge bifurcation P68 is projected, a projected feature point Q68 is generated on the ridge R66. In addition, a projected feature point Q68' is generated on the ridge R69. When the ridge ending P69 is projected, a projected feature point Q69 is generated on the ridge R67. In addition, a projected feature point Q69' is generated on the ridge R70. When the ridge ending P70 is projected, a projected feature point Q70 is generated on the ridge R69.

As distances on ridges with respect to the ridge bifurcation P65, a distance on a ridge from the ridge bifurcation P65 to the projected feature point Q63' (0-th degree sub distance), a distance on a ridge from the ridge bifurcation P65 to the projected feature point Q64' (0-th degree sub distance), a distance on a ridge from the ridge bifurcation P65 to the projected feature point Q68 (0-th sub distance), a distance on a ridge from the projected feature point Q65 to the projected feature point Q66 (first degree sub distance), a distance on a ridge from the projected feature point Q65' to the projected feature point Q61 (second degree sub distance), a distance on a ridge from the projected feature point Q65" to the projected feature point Q69 (–first degree sub distance), and a distance on a ridge from the projected feature point Q65'" to the projected feature point Q68' (–second degree sub distance) are calculated.

Figure 19:
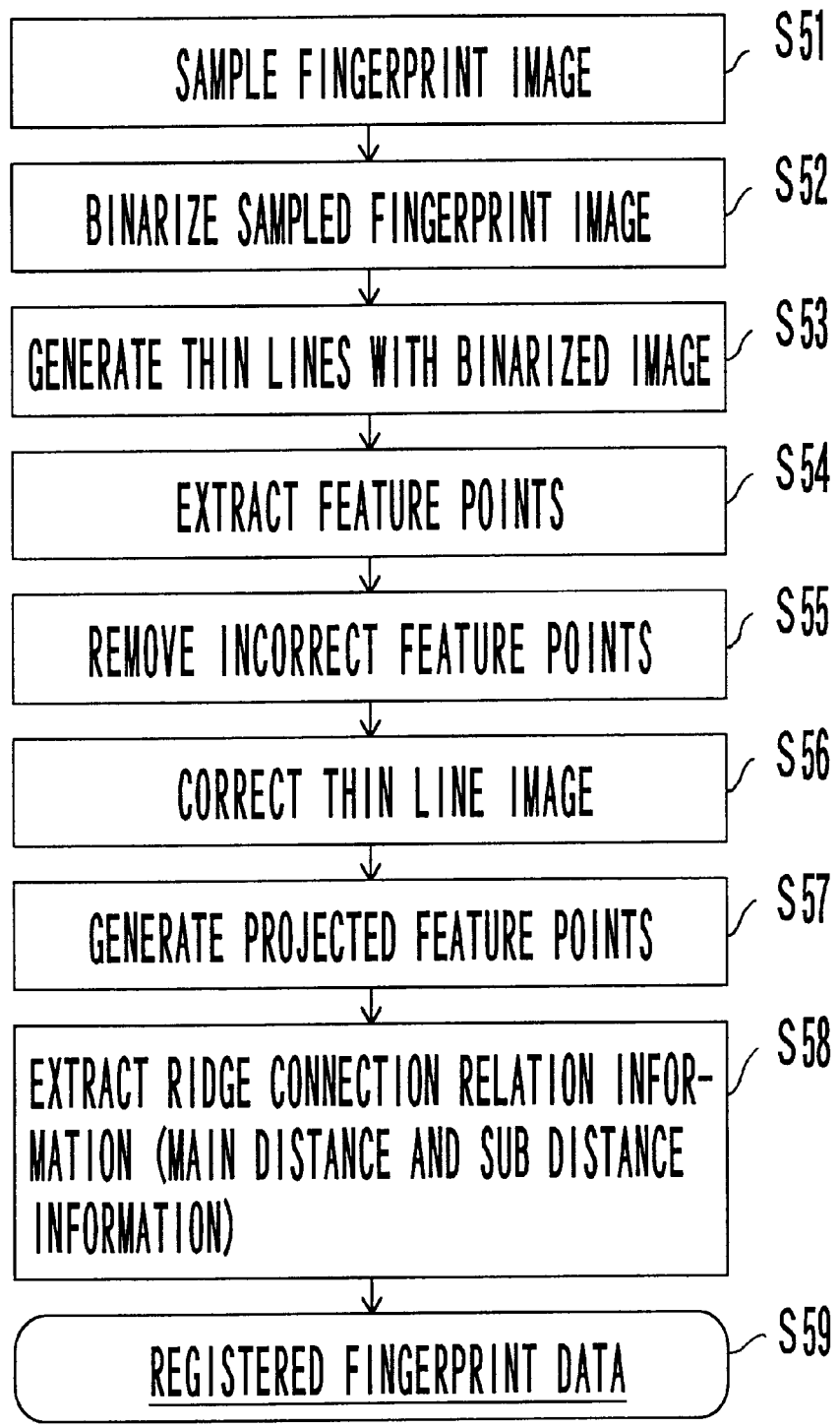
FIG. 19 is a flowchart showing a fingerprint registering process of the fingerprint identifying apparatus shown in FIG. 16.

FIG. 19 is a flowchart showing a fingerprint registering process of the fingerprint identifying apparatus shown in FIG. 16.

In FIG. 19, fingerprint image data is sampled by the fingerprint sensor 61 or the like (at step S51). Next, the image binarizing unit 63 binarizes the sampled fingerprint image and obtains a fingerprint binarized image (at step S52). Thereafter, the thin line image generating unit 64 generates thin lines with the fingerprint binarized image and obtains a thin line image of a fingerprint (at step S53). Next, the feature point extracting unit 65 extracts the positions of feature points of the fingerprint from the thin line image of a fingerprint (at step S54). The extracted fingerprint feature points generally contain incorrect feature points. Thus, the incorrect feature point removing unit 67 removes incorrect feature points from the obtained fingerprint feature points (at step S55). Since the incorrect feature point portion takes place due to an error of the thin line image of a fingerprint (crack and adhesion of a ridge), the fingerprint thin line image correcting unit 68 corrects the thin line image of a fingerprint (at step S56).

Next, the projected feature point generating unit 69 generates projected feature points corresponding to all the feature points extracted by the feature point extracting unit 65 (at step S57). Next, the main distance and sub distance information extracting unit 70 measures the n-th degree main distance and the n-th degree sub distance for each feature point (n=–m, . . . , –1, 0, 1, . . . , m) (at step S58). In other words, each feature point has (2m+1) or (2m+3) main distances and (2m+1) or (2m+3) sub distances. The main distance information and sub distance information are stored as fingerprint information in the registered fingerprint information storing unit 72 (at step S59).

Figure 20:
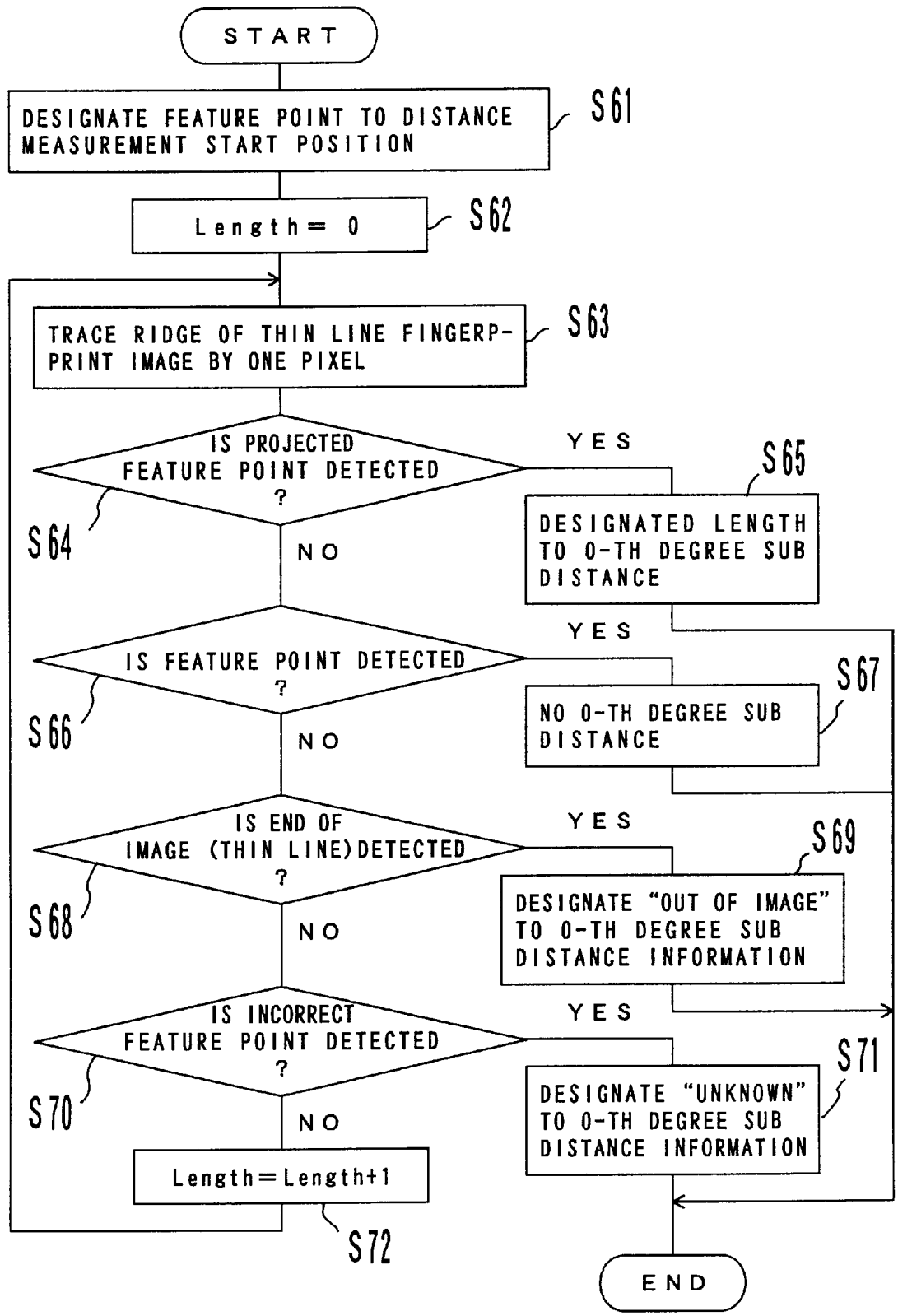
FIG. 20 is a flowchart showing a distance-on-ridge calculating process of the fingerprint identifying apparatus shown in FIG. 16 in the case that a feature point is designated to a measurement start point.

FIG. 20 is a flowchart showing a distance-on-ridge calculating process of the fingerprint identifying apparatus shown in FIG. 16 in the case that a feature point is designated to a measurement start point.

In FIG. 20, a feature point is designated to a distance-on-ridge measurement start position (at step S61). A measured value Length is designated to 0 (at step S62).

Next, a ridge of the thin line fingerprint image is traced by one pixel (at step S63). When another projected feature point is detected (at step S64), the measured value Length is designated to a 0-th degree sub distance (at step S65). When the ridge of the thin line fingerprint image is traced by one pixel, if another feature point is detected (at step S66), it is assumed that there is "no 0-th degree sub distance" (at step S67).

When the ridge of the thin line fingerprint image is traced by one pixel, if an end of the image is detected (at step S68), "out of image" is designated to the 0-th sub distance information (at step S69). When the ridge of the thin line fingerprint image is traced by one pixel, if an incorrect feature point is detected (at step S70), "unknown" is designated to the 0-th degree sub distance information (at step S71).

On the other hand, when the ridge of the thin line fingerprint image is traced by one pixel, if the above-described conditions are not satisfied, the measured value Length is incremented by 1 (at step S72). Thereafter, the flow returns to step S63. At step S63, the searching process is continued.

Figure 21:
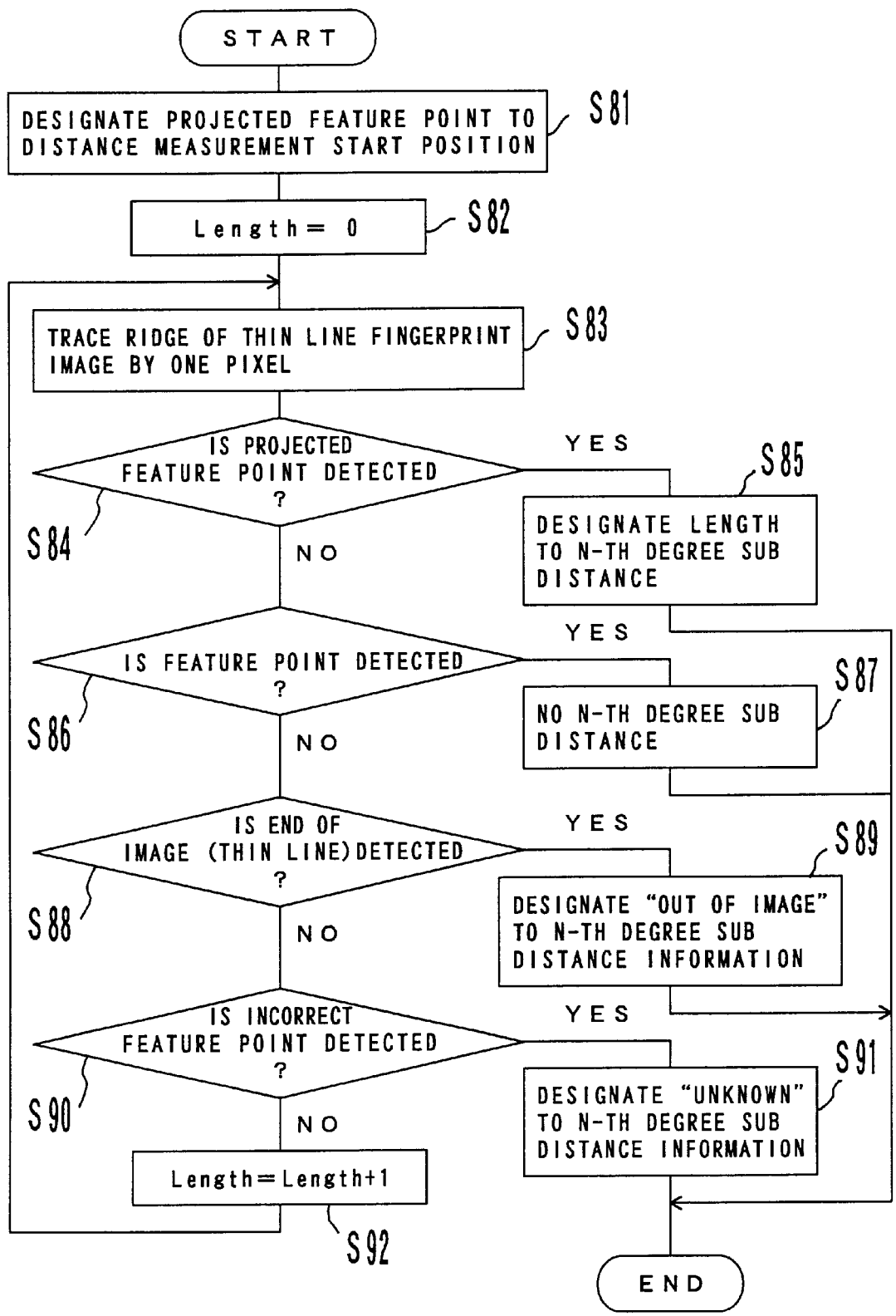
FIG. 21 is a flowchart showing a distance-on-ridge calculating process of the fingerprint identifying apparatus shown in FIG. 16 in the case that a projected feature point is designated to a measurement start point.

FIG. 21 is a flowchart showing a distance-on-ridge calculating process of the fingerprint identifying apparatus shown in FIG. 16 in the case that a projected feature point is designated to a measurement start point.

In FIG. 21, a projected feature point on a ridge spaced apart from a target feature point by n ridges is designated to a distance-on-ridge measurement start position (at step S81). A measured value Length is designated to 0 (at step S82).

Next, a ridge of the thin line fingerprint image is traced by one pixel (at step S83). When another projected feature point is detected (at step S84), the measured value Length is designated to an n-th degree sub distance (at step S85). When the ridge of the thin line fingerprint image is traced by one pixel, if another feature point is detected (at step S86), it is assumed that there is no n-th degree sub distance (at step S87).

When the ridge of the thin line fingerprint image is traced by one pixel, if an end of the image is detected (at step S88), "out of image" is designated to the n-th sub distance information (at step S89). When the ridge of the thin line fingerprint image is traced by one pixel, if an incorrect feature point is detected (at step S90), "unknown" is designated to the n-th degree sub distance information (at step S91).

On the other hand, when the ridge of the thin line fingerprint image is traced by one pixel, if the above-described conditions are not satisfied, the measured value Length is incremented by 1 (at step S92). Thereafter, the flow returns to step S83. At step S83, the searching process is repeated.

Figure 22:
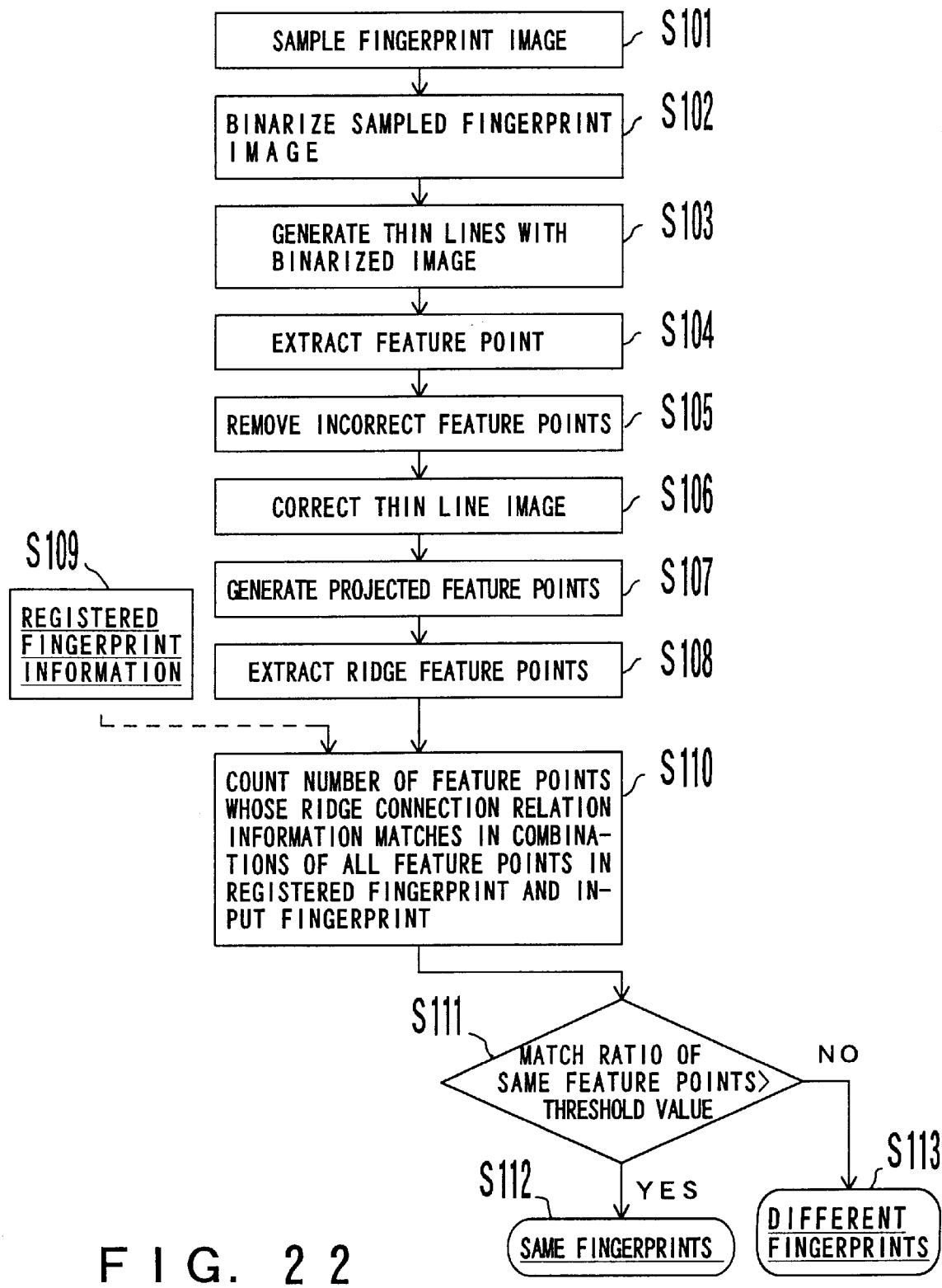
FIG. 22 is a flowchart showing a fingerprint identifying process of the fingerprint identifying apparatus shown in FIG. 16.

FIG. 22 is a flowchart showing a fingerprint identifying process of the fingerprint identifying apparatus shown in FIG. 16.

In FIG. 22, fingerprint image data is sampled by the fingerprint sensor 61 or the like (at step S101). Next, the image binarizing unit 63 binarizes the sampled fingerprint image and obtains a fingerprint binarized image (at step S102). Next, the thin line image generating unit 64 generates thin lines with the fingerprint binarized image and obtains a thin line image of a fingerprint (at step S103). Next, the feature point extracting unit 65 extracts the positions of feature points of the fingerprint from the thin line image of a fingerprint (at step S104). The extracted fingerprint feature points generally contain incorrect feature points. Thus, the incorrect feature point removing unit 67 removes the incorrect feature points from the obtained fingerprint feature points (at step S105). Since the incorrect feature point portion takes place due to an error of the thin line image of a fingerprint (crack and adhesion of a ridge), the fingerprint thin line image correcting unit 68 corrects the thin line image of a fingerprint (at step S106). Next, the projected feature point generating unit 69 generates projected feature points corresponding to all the feature points extracted by the feature point extracting unit 65 (at step S107). Next, the main distance and sub distance information extracting unit 70 measures the n-th degree main distance and n-th degree sub distance for each feature point (n=−m, . . . , −1, 0, 1, . . . , m) (at step S108).

Next, the main distance information and sub distance information are read from the registered fingerprint information storing unit 72 (at step S109). In combinations of all feature points in the registered fingerprint and the input fingerprint, the match ratios of the ridge connection relations are calculated and the number of combinations whose match ratios exceed a predetermined value is counted (at step S110). In the fourth embodiment, since the fingerprint information contains both main distance information and sub distance information, even if the type of each feature point (ridge ending or ridge bifurcation) is unstably detected, fingerprints can be identified for each feature point.

Next, the number of all feature points in the registered fingerprint and the input fingerprint is counted. The number of the same feature points is normalized with the number of all feature points and thereby a fingerprint match ratio is calculated (at step S111). When the fingerprint match ratio exceeds a predetermined value, it is determined that these fingerprints are the same fingerprints (at step S112). When the fingerprint match ratio is the predetermined value or less, it is determined that these fingerprints are different fingerprints (at step S113).

When feature points of the registered fingerprint and the input fingerprint are identified, the connection relations of projected feature points and ridges thereof are identified instead of the positions, types, and directions thereof. Thus, feature points can be correctly identified without an influence of expansion, shrinkage, and rotation of the skin. In addition, when a concept of projected feature points is employed, a structure of a ridge adjacent to a target feature point can be identified rather than a structure of a ridge of the target feature point.

In addition, when ridge connection relation information is represented by a distance on a ridge between a feature point and a projected feature point, a structure of a ridge adjacent to the feature point can be easily represented. Moreover, the ridge structure can be easily identified.

When ridge connection relation information of one feature point is represented by the distance on a ridge between a projected feature point corresponding to the feature point and another projected feature point corresponding to another feature point, structures of ridges in a wide range adjacent to the feature point can be easily represented rather than the structure of the ridge connecting to the feature point. In addition, the structures of the ridges in the wide range can be easily identified.

When the center coordinates of a fingerprint and the coordinates, type, and direction of each feature point are added to fingerprint information, the fingerprint can be accurately identified at high speed. In other words, the positions of the registered fingerprint and the input fingerprint are roughly aligned with the center coordinates thereof beforehand. When ridge connection relation information of two feature points is identified, if the coordinates of the feature points largely deviate from a predetermined error, regardless of the match ratio of the ridge connection relations, it is determined that these feature points are different feature points. Thus, the calculations for the match ratios of the ridge connection relations are omitted. Consequently, the identification time can be shortened. When two feature points are identified along with types and directions thereof, they can be accurately identified. In addition, when the types of feature points corresponding to projected feature points used in the ridge connection relations are added to ridge connection relation information, the feature points can be more accurately identified.

Instead of the sub distance of ridge connection relation information, the number of n-th degree projected feature points may be used. With the number of projected feature points, ridge connection relation information can be easily represented. Thus, the capacity of registered fingerprint data can be decreased.

Next, a fingerprint identifying method of the fingerprint identifying apparatus shown in FIG. 16 will be described in detail.

When two feature points are the same, each of the n-th degree main distance and sub distance of one feature point match that of the other feature point. When main distances of two feature points match and sub distances of two feature points match, an evaluation point of the match ratio of the ridge connection relation is increased. In other words, the point in the case that the main distances of two feature points match and the point in the case that the sub distances of two feature points match are increased.

On the other hand, due to a deviation of the pressure of a finger to the fingerprint sensor, types of adjacent feature points may be detected as different types of feature points. In this case, the main distance of a feature point may become a sub distance thereof. Alternatively, a sub distance of a feature point may become a main distance thereof.

Figure 23A:
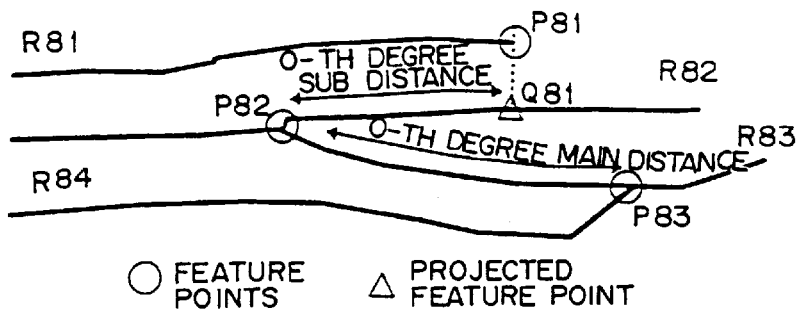
FIG. 23 is a schematic diagram for explaining a variation of a main distance and a sub distance in the case that the type of a feature point varies.
Figure 23B:
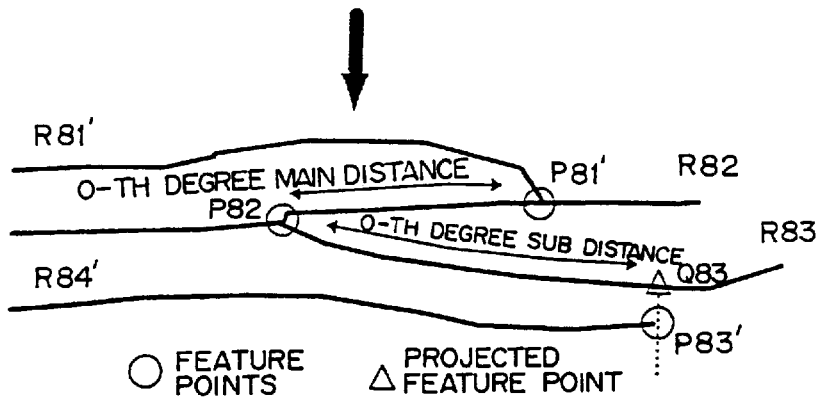

FIGS. 23A and 23B are schematic diagram for explaining a variation of a main distance and a sub distance in the case that the type of a feature point is varied.

In FIG. 23A, ridges R81 to R84 are extracted from a fingerprint image. A ridge ending P81 is present on the ridge R81. A ridge bifurcation P82 is present on the ridges R82 and R83. A ridge bifurcation P83 is present on the ridges R83 and R84. The ridge ending P81 and the ridge bifurcations P82 and P83 are feature points of a fingerprint. When the ridge ending P81 is projected, a projected feature point Q81 is generated on the ridge R82.

It is assumed that as distances on ridges with respect to the ridge bifurcation P82, a distance on a ridge from the ridge bifurcation P82 to the ridge bifurcation P83 (0-th degree main distance) and a distance on a ridge from the ridge bifurcation P82 to the projected feature point Q81 (0-th degree sub distance) have been registered.

In addition, it is assumed that a fingerprint image shown in FIG. 23B has been obtained due to a deviation of the pressure of a finger whose fingerprint has been registered.

In FIG. 23B, the ridge R81 is deformed to a ridge R81'. The ridge R81' adheres to the ridge R82. Thus, the ridge ending P81 is deformed to a ridge bifurcation P81'. In addition, the ridge R84 is deformed to a ridge R84'. The ridge R84' separates from the ridge R83. Thus, the ridge bifurcation P83 is deformed to a ridge ending P83'. A projected feature point Q83 of which the ridge ending P83' is projected is generated on the ridge R83.

Thus, as distances on ridges with respect to the ridge bifurcation P82, a distance from the ridge bifurcation P82 to the projected feature point Q83 (0-th degree sub distance) and a distance on a ridge from the ridge bifurcation P82 to the ridge bifurcation P81' (0-th degree main distance) are calculated.

Thus, when the type of an adjacent feature point is detected as a different type of a feature point, the main distance of the feature point may become a sub distance thereof. Alternatively, the sub distance of the feature point becomes the main distance thereof. Thus, even if the main distance matches the sub distance, the evaluation point of the match ratio of the ridge connection relation is increased. However, this evaluation point is lower than an evaluation point designated in the case that the main distances match or an evaluation point designated in the case that the sub distances match. Thus, even if the type of an adjacent feature point is detected as a different type due to a deviation of the pressure of the finger to the fingerprint sensor, the fingerprint can be accurately identified.

Figure 24:
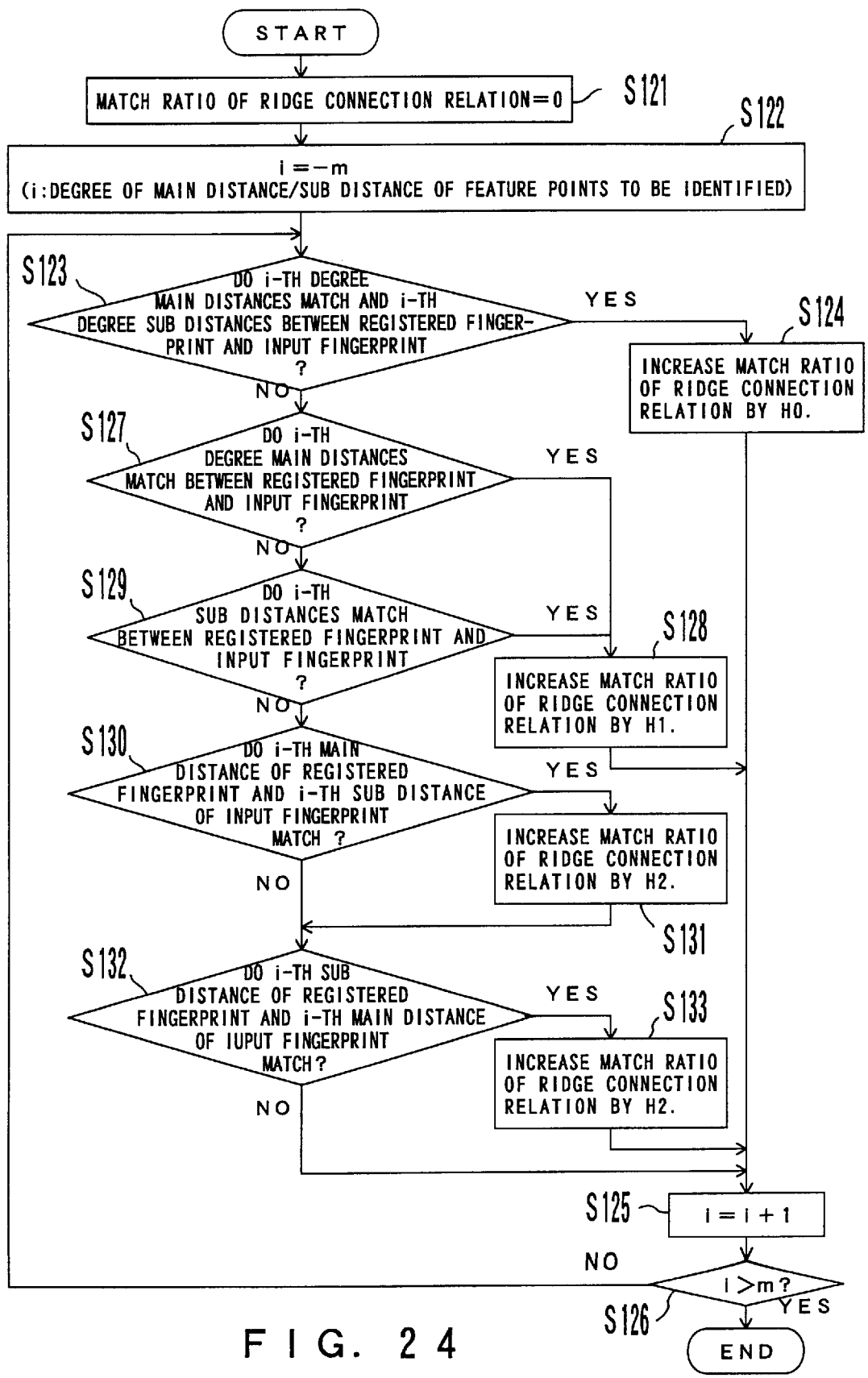
FIG. 24 is a flowchart showing a fingerprint identifying process in consideration of an incorrect detection of the type of a destination feature point.

FIG. 24 is a flowchart showing an example of a fingerprint identifying process in consideration of an incorrect detection of the type of a destination feature point. In FIG. 24, H0, H1, and H2 are evaluation points of match ratios of ridge connection relations and have the relation of H0>H1>H2.

In FIG. 24, the match ratio of the ridge connection relation is designated to 0 (at step S121). The degree i of the main distance and sub distance of feature points to be identified is designated to −m (at step S122).

Next, when the i-th degree main distances match and the i-th degree sub distances match between the registered fingerprint and the input fingerprint (at step S123), the match ratio of the ridge connection relation is increased by the point H0 (at step S124). Thereafter, the flow advances to step S125.

Next, when the i-th degree main distances match but the i-th degree sub distances do not match between the registered fingerprint and the input fingerprint (at step S127), the match ratio of the ridge connection relation is increased by the point H1 (at step S128). Thereafter, the flow advances to step S125.

Next, when the i-th degree sub distances match but the i-th degree main distances do not match between the registered fingerprint and the input fingerprint (at step S129), the match ratio of the ridge connection relation is increased by the point H1 (at step S128). Thereafter, the flow advances to step S125.

Next, when the i-th degree main distances of the registered fingerprint and the i-th degree sub distance of the input fingerprint match (at step S130), the match ratio of the ridge connection relation is increased by the point H2 (at step S131). Thereafter, the flow advances to step S132.

Next, when the i-th degree sub distance of the registered fingerprint and the i-th degree main distance of the input fingerprint match (at step S132), the match ratio of the ridge connection relation is increased by the point H2 (at step S133). Thereafter, the flow advances to step S125.

Next, the degree i of each of the main distance and sub distance of feature points to be identified is increased by 1 (at step S125). The above-described process is repeated until the degree i of each of the main distance and sub distance of feature points to be identified exceeds m (at step S126).

Thus, when the ridge connection relation information of feature points is identified, the distance on a ridge of feature points and the distance on a ridge of a feature point and a projected feature point are compared between the registered fingerprint and the input fingerprint. Consequently, even if the types of a destination feature point and a projected feature point of ridge connection relation information are varied, ridge structured can be accurately identified.

In addition, in the case that ridge connection relation information of feature points is identified, when the distance on a ridge of a source projected feature point (distance-on-ridge measurement start point) and a feature point and the distance on a ridge of a source projected feature point (distance-on-ridge measurement start point) and a projected feature point are compared between the registered fingerprint and the input fingerprint, even if the types of a destination feature point and a projected feature point of the ridge connection relation information are varied, ridge structures can be accurately identified.

In addition to the case that the type of an adjacent feature point is detected as a different type thereof, the type of a target feature point may be detected as a different type thereof. In this case, the degree of each of the main distance and sub distance of each feature point is varied between the registered fingerprint and the input fingerprint.

FIG. 25 is a schematic diagram for explaining a variation of a degree in the case that a ridge ending is mistakenly detected as a ridge bifurcation.

Figure 25A:
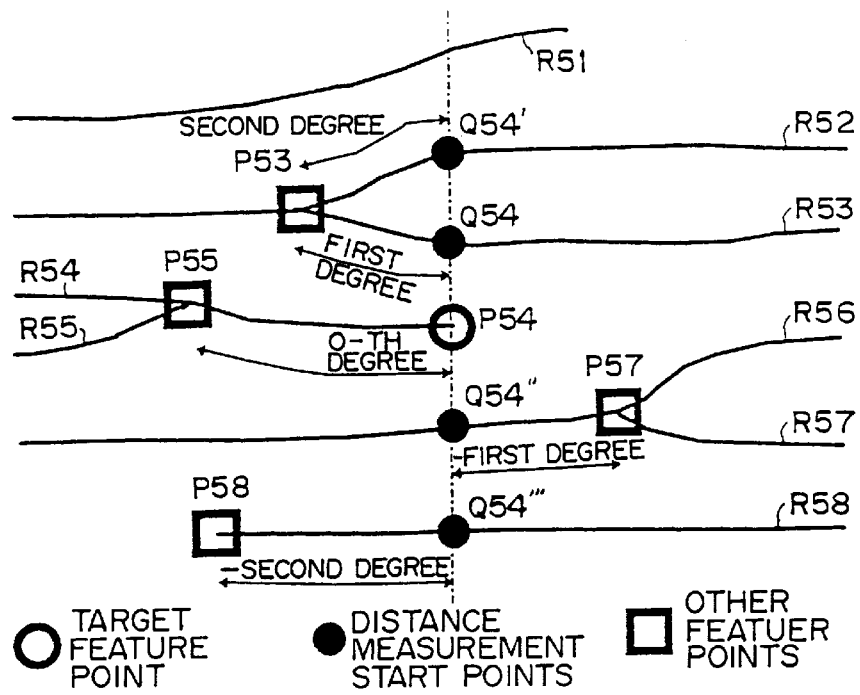
FIG. 25 is a schematic diagram for explaining the variation of a degree number in the case that a ridge ending is mistakenly detected as a ridge bifurcation.

In FIG. 25A, ridges R51 to R58 are extracted from a fingerprint image. A ridge bifurcation P53 is present on the ridges R52 and R53. A ridge ending P54 is present on the ridge R54. A ridge bifurcation P55 is present on the ridges R54 and R55. A ridge bifurcation P57 is present on the ridges R56 and R57. A ridge ending P58 is present on the ridge R58. The ridge endings P54 and P58 and the ridge bifurcations P53, P55, and P57 are feature points of a fingerprint.

When the ridge ending P54 is projected, a projected feature point Q54 is generated on the ridge R53. A projected feature point Q54' is generated on the ridge R52. A projected feature point Q54" is generated on the ridge R56. A projected feature point Q54'" is generated on the ridge R58.

It is assumed that as distances on ridges with respect to the ridge ending P54, a distance on a ridge from the ridge ending P54 to the ridge bifurcation P55 (0-th degree main distance), a distance on a ridge from the projected feature point Q54 to the ridge bifurcation P53 (first degree main distance), a distance on a ridge from the projected feature point Q54' to the ridge bifurcation P53 (second degree main distance), a distance on a ridge from the projected feature point Q54" to the ridge bifurcation P57 (−first degree main distance), and a distance on a ridge from the projected feature point Q54'" to the ridge ending P58 (−second degree main distance) have been registered.

Figure 25B:
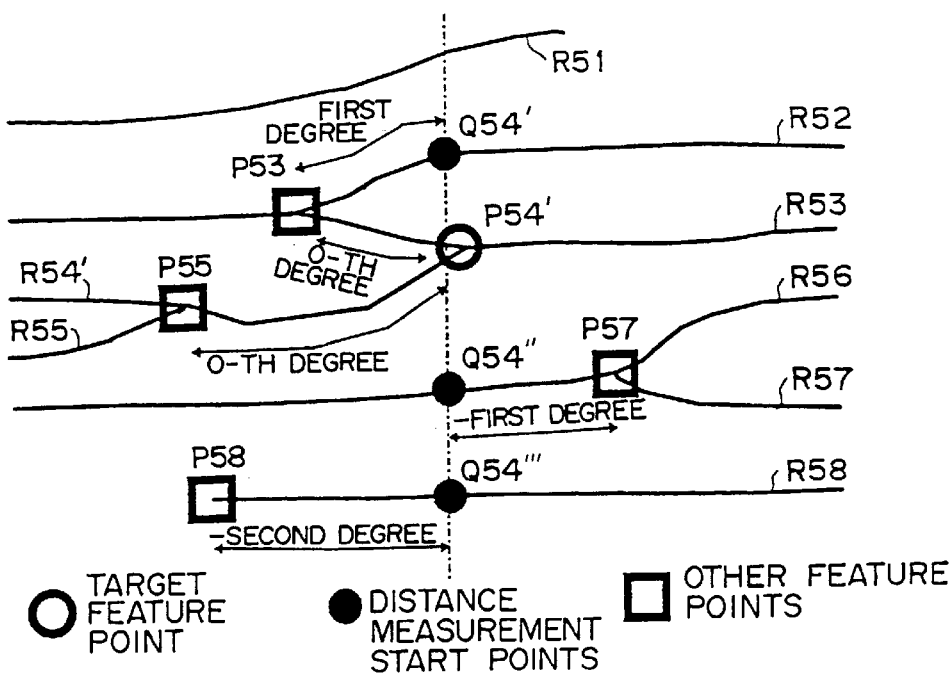

It is assumed that due to a deviation of the pressure of a finger whose fingerprint has been registered, a fingerprint image shown in FIG. 25B has been obtained.

In FIG. 25B, the ridge R54 is deformed to a ridge R54'. The ridge R54' adheres to the ridge R53. Thus, the ridge ending P54 is deformed to a ridge bifurcation P54'.

Thus, as distances on ridges with respect to the ridge bifurcation P54', a distance on a ridge from the ridge bifurcation P54' to the ridge bifurcation P53 (0-th degree main distance), a distance on a ridge from the ridge bifurcation P54' to the ridge bifurcation P55 (0-th degree main distance), a distance on a ridge from the projected feature point Q54' to the ridge bifurcation P53 (first degree main distance), a distance on a ridge from the projected feature point Q54" to the ridge bifurcation P57 (−first degree main distance), and a distance on a ridge from the projected feature point Q54'" to the ridge ending P58 (−second degree main distance) are calculated.

When feature points are identified, if a ridge ending adheres to an adjacent ridge and thereby a ridge bifurcation takes place, the types of these feature points are forcedly treated as the same types. In this condition, the match ratio of the ridge connection relations is obtained.

Now, consider the case that a ridge ending adheres to a ridge on the plus first degree side. In this case, the plus degrees of the main distance and sub distance of the ridge connection relation information decrease by 1.

Thus, the plus degrees of main distance and sub distance on the ridge ending side are decreased by 1. In the same manner as the case that the types of feature points are the same, the match ratio of the ridge connection relations is obtained.

Next, consider the case that a ridge ending adheres to a ridge on the minus first degree side. In this case, the minus degrees of main distance and sub distance on the ridge ending side increase by 1. Thus, the minus degrees of main distance and sub distance on the ridge ending side are increased by 1. In this condition, the match ratio of the ridge connection relations is obtained. The higher one of the match ratios of the ridge connection relations is treated as a final match ratio of ridge connection relations.

Figure 26:
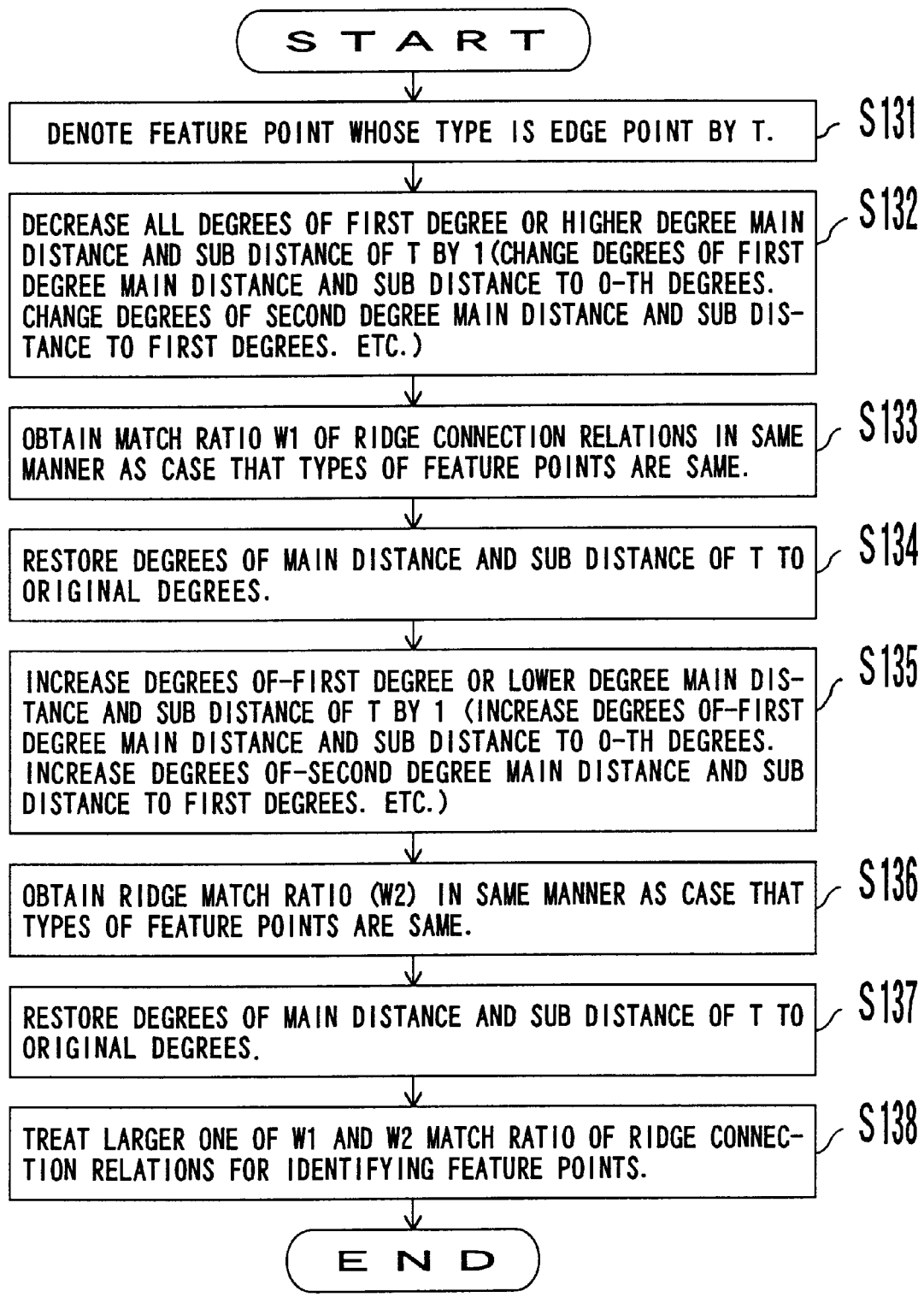
FIG. 26 is a flowchart showing a fingerprint identifying process in consideration of an incorrect detection of the type of a source feature point.

FIG. 26 is a flowchart showing a fingerprint identifying process in consideration of an incorrect detection of a type of a source feature point.

In FIG. 26, a feature point whose type is a ridge ending is denoted by T (at step S131).

Next, all degrees of first degree or higher degree main distances and sub distances of the feature point T are decreased by 1 (at step S132). For example, the degrees of the first degree main distance and sub distance are decreased to 0-th degrees. The degrees of the second degree main distance and sub distance are decreased to first degrees.

Thereafter, in the same manner as the case that the types of feature points are the same, the match ratio W1 of ridge connection relations is obtained (at step S133). The degrees of the main distance and sub distance of the feature point T are restored to the original degrees (at step S134).

Next, the degrees of −first degree or lower degree main distances and sub distances of the feature point T are increased by 1 (at step S135). For example, the degrees of −first degree main distance and sub distance are increased to 0-th degrees. The degrees of −second degree main distance and sub distance are increased to −first degrees.

Thereafter, in the same manner as the case that the types of feature points are the same, the match ratio W2 of ridge connection relations is obtained (at step S136). The degrees of main distances and sub distances of the feature point T are restored to the original degrees (at step S137).

Next, a larger one of the match ratio W1 of ridge connection relations and match ratio W2 of ridge connection relations is treated as a match ratio of ridge connection relations for identifying feature points (at step S138).

Thus, when ridge connection relation information is identified, the number of ridges present between a target feature point and a projected feature point corresponding thereto is incremented by ±1. Thus, even if the types of feature points are different between the registered fingerprint and the input fingerprint, ridge structures can be accurately identified.

Next, a fingerprint identifying apparatus according to a fifth embodiment of the present invention will be described.

In the fifth embodiment, when a fingerprint is registered, the following fingerprint information is recorded.
1) the n-th degree main distance of each feature point (n=−m, −1, 0, 1, . . . , m) and direction information from a target feature point/measurement start point to another feature point. where at least one main distance is recorded for one ridge sectioned by a feature point.
2) the n-th degree sub distance of each feature point (n=−m, . . . , −1, 0, 1, m) and direction information from a target feature point/measurement start point to a projected feature point. where at least one sub distance is recorded for one ridge sectioned by a feature point.

By comparing the n-th degree main distance, the n-th degree sub distance, and the direction information of each feature point, fingerprints are identified.

Figure 27:
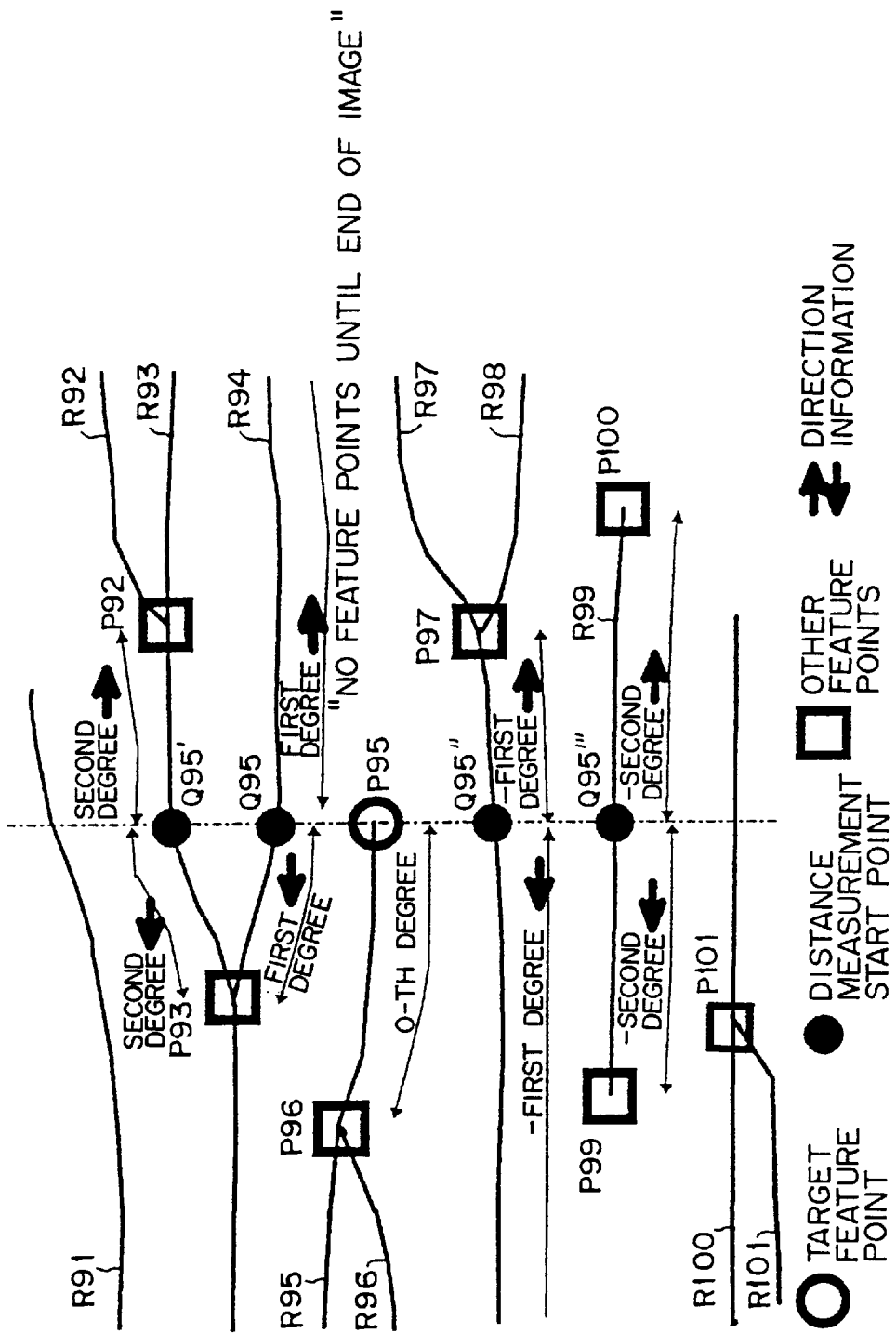
FIG. 27 is a schematic diagram for explaining the case that direction information is added to a main distance.

FIG. 27 is a schematic diagram for explaining an example of which direction information is added to a main distance.

In FIG. 27, ridges R91 to R101 are extracted from a fingerprint image. A ridge bifurcation P92 is present on the ridges R92 and R93. A ridge bifurcation P93 is present on the ridges R93 and R94. A ridge ending P95 is present on the ridge R95. A ridge bifurcation P96 is present on the ridges R95 and R96. A ridge bifurcation P97 is present on the ridges R97 and R98. Ridge endings P99 and P100 are present on the ridge R99. A ridge bifurcation P101 is present on the ridges R100 and R101. The ridge endings P95, P99, and P100 and the ridge bifurcations P92, P93, P96, P97, and P101 are feature points of a fingerprint.

When the ridge ending P95 is projected, a projected feature point Q95 is generated on the ridge R94. A projected feature point Q95' is generated on the ridge R93. A projected feature point Q95" is generated on the ridge R97. A projected feature point Q95'" is generated on the ridge R99.

As a main distance with respect to the ridge ending P95, a distance on a ridge from the ridge ending P95 to the ridge bifurcation P96 (0-th degree main distance) is calculated.

When the projected feature point Q95 is designated to a measurement start point, as a left side distance on a ridge, a distance on a ridge from the projected feature point Q95 to the ridge bifurcation P93 (first degree main distance) is calculated. The direction information is added to the distance-on-ridge information. Since there are no feature points on the right side until the end of the image, information that represents that there are no feature points on the right side until the end of the image is added to the distance-on-ridge information.

When the projected feature point Q95' is designated to a measurement start point, as a distance on a ridge on the left side, a distance on a ridge from the projected feature point Q95' to the ridge bifurcation P93 (second degree main distance) is calculated. The direction information is added to the distance-on-ridge information. In addition, as a distance on a ridge on the right side, a distance on a ridge from the projected feature point Q95' to the ridge bifurcation P92 (second degree main distance) is calculated. The direction information is added to the distance-on-ridge information.

When the projected feature point Q95" is designated to a measurement start point, since there are no feature points on the left side until the end of the image, information that represents that there are no feature points on the left side until the end of the image is added to the distance-on-ridge information. In addition, as a distance on a ridge on the right side, a distance on a ridge from the projected feature point Q95" to the ridge bifurcation P97 (−first degree main distance) is calculated. The direction information is added to the distance-on-ridge information.

When the projected feature point Q95''' is designated to a measurement start point, as a distance on a ridge on the left side, a distance on a ridge from the projected feature point Q95''' to the ridge ending P99 (−second degree main distance) is calculated. The direction information is added to the distance-on-ridge information. In addition, as a distance on a ridge on the right side, a distance from the projected feature point Q95''' to the ridge ending P100 (−second degree main distance) is calculated. The direction information is added to the distance-on-ridge information.

Depending on a ridge structure, a main distance cannot be obtained because of:

(1) there are no feature points from a target feature point/measurement start point to an end of the fingerprint image, and (2) since a ridge structure has not been correctly obtained, a main distance cannot be correctly obtained. This situation takes place when many cracks are present on a ridge or ridges adhere in a mesh shape.

When a main distance cannot be obtained due to such reasons, the reasons are contained in the ridge connection relation information.

Figure 28:
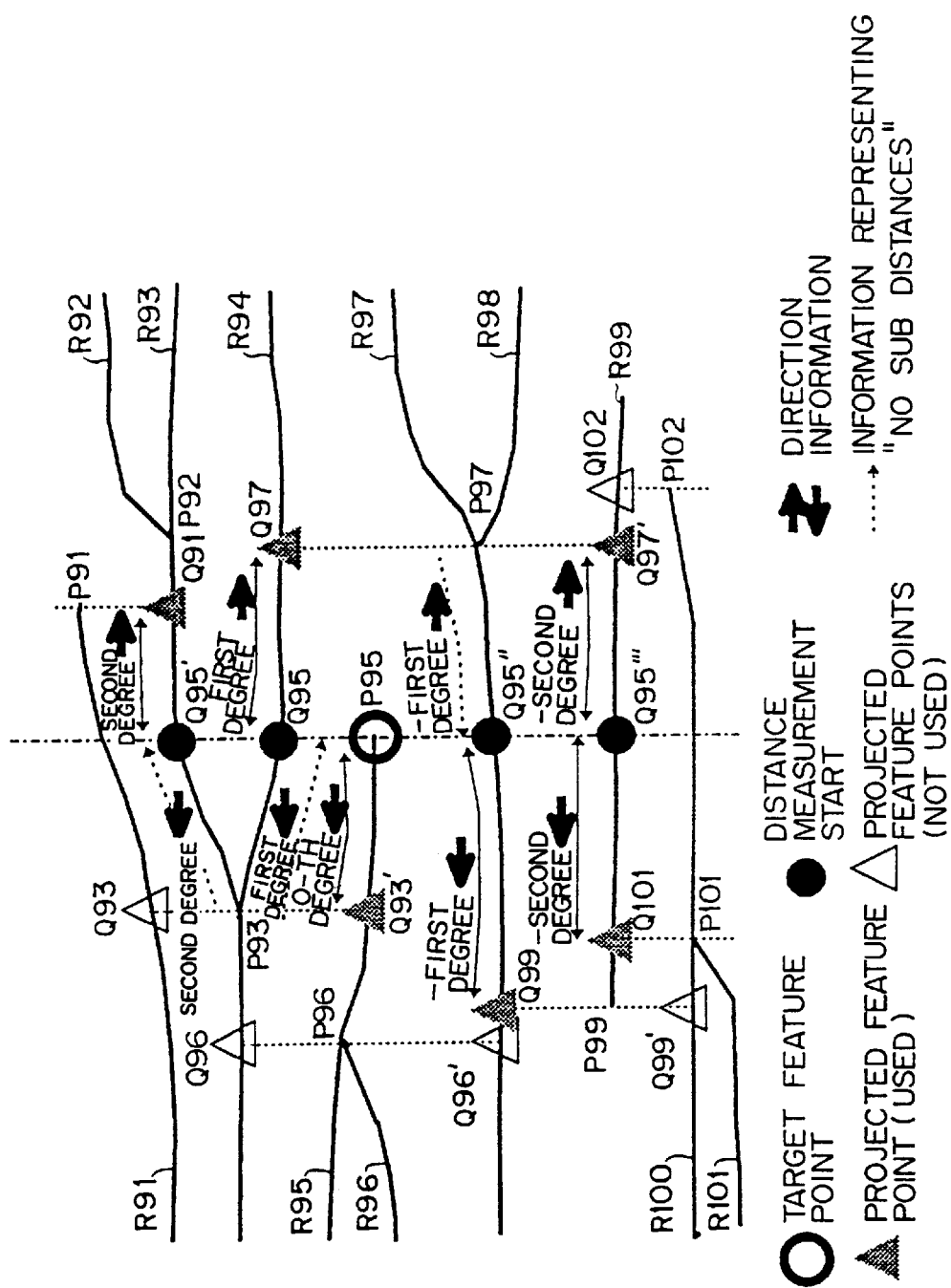
FIG. 28 is a schematic diagram for explaining the case that direction information is added to a sub distance.

FIG. 28 is a schematic diagram for explaining an example of which direction information is added to a sub distance.

In FIG. 28, ridges R91 to R101 are extracted from a fingerprint image. A ridge ending P91 is present on the ridge R91. A ridge bifurcation P92 is present on the ridges R92 and R93. A ridge bifurcation P93 is present on the ridges R93 and R94. A ridge ending P95 is present on the ridge R95. A ridge bifurcation P96 is present on the ridges R95 and R96. A ridge bifurcation P97 is present on the ridges R97 and R98. A ridge ending P99 is present on the ridge R99. A ridge bifurcation P101 is present on the ridges R100 and R101. A ridge ending P102 is present on the ridge R100. The ridge endings P91, P95, P99, and P102 and the ridge bifurcations P92, P93, P96, P97, and P101 are feature points of a fingerprint.

When the ridge ending P95 is projected, a projected feature point Q95 is generated on the ridge R94. A projected feature point Q95' is generated on the ridge R93. A projected feature point Q95" is generated on the ridge R97. A projected feature point Q95''' is generated on the ridge R99.

When the ridge ending P91 is projected, a projected feature point Q91 is generated on the ridge R93. When the ridge bifurcation P93 is projected, a projected feature point Q93 is generated on the ridge R91. In addition, a projected feature point Q93' is generated on the ridge R95. When the ridge bifurcation P96 is projected, a projected feature point Q96 is generated on the ridge R93. In addition, a projected feature point Q96' is generated on the ridge R97. When the ridge bifurcation P97 is projected, a projected feature point Q97 is generated on the ridge R94. In addition, a projected feature point Q97' is generated on the ridge R99. When the ridge ending P99 is projected, a projected feature point Q99 is generated on the ridge R97. In addition, a projected feature point Q99' is generated on the ridge R100. When the ridge ending P102 is projected, a projected feature point Q102 is generated on the ridge R99.

As a sub distance with respect to the ridge ending P95, a distance on a ridge from the ridge ending P95 to the projected feature point Q93' (0-th degree sub distance) is calculated. As the 0-th sub distance, the ridge R95 is traced from the ridge ending P95 as a start point on the left side and thereby a distance on a ridge from the ridge ending P95 to the projected feature point Q93' that is detected at first is calculated.

When the projected feature point Q95 is designated to a measurement start point, since there are no projected feature points between the projected feature point Q95 and the ridge bifurcation P93 on the left side, information that represents that there are no sub distances on the left side is added to the distance-on-ridge information. When the ridge bifurcation P93 is detected, the further searching process is canceled because the tracing direction is unknown due to a plurality of the searching directions from the ridge bifurcation P93. Alternatively, with a predetermined searching direction from the ridge bifurcation P93, a further searching process may be performed for a projected feature point. In addition, as a distance on a ridge on the right side, a distance on a ridge from the projected feature point Q95 to the projected feature point Q97 (first degree sub distance) is calculated. The direction information is added to the distance-on-ridge information.

When the projected feature point Q95' is designated to a measurement start point, since there are no projected feature points between the feature point Q95' and the ridge bifurcation P93 on the left side, information that represents that there are no sub distances on the left side is added to the distance-on-ridge information. As a distance on a ridge on the right side, a distance on a ridge from the projected feature point Q95' to the projected feature point Q91 (second degree sub distance) is calculated. The direction information is added to the distance-on-ridge information.

When the projected feature point Q95" is designated to a measurement start point, as a distance on a ridge on the left side, a distance on a ridge from the projected feature point Q95" to the projected feature point Q99 (−first degree sub distance) is calculated. The direction information is added to the distance-on-ridge information. As the −first degree sub distance, the ridge R97 is traced from the projected feature point Q95" on the left side so as to search the ridge R97 and a distance on a ridge from the projected feature point Q95" to the projected feature point Q99 that is detected at first is calculated. In addition, since there are no projected feature points between the feature point Q95" and the ridge bifurcation P97 on the right side, information that represents there are no sub distances on the right side is added to the distance-on-ridge information.

When the projected feature point Q95''' is designated to a measurement start point, as a distance on a ridge on the left side, a distance on a ridge from the projected feature point Q95''' to the projected feature point Q101 (−second degree sub distance) is calculated. The direction information is added to the distance-on-ridge information. In addition, as a distance on a ridge on the right side, a distance on a ridge from the projected feature point Q95''' to the projected feature point Q97' (−second degree sub distance) is calculated. The direction information is added to the distance-on-ridge information.

When direction information is added to distance-on-ridge information, a ridge with the same order can have information of a plurality of distances on ridges.

Depending on a ridge structure, a sub distance may not be obtained because of:

(1) there are no projected feature points in a distance on a ridge from a target feature point/measurement start point to another feature point, and (2) since a ridge structure has not been correctly obtained, a sub distance cannot be correctly obtained. This situation takes place when there are many crack on a ridge or ridges adhere in a mesh shape.

When a sub distance cannot be obtained in such reasons, the reasons are included in the ridge connection relation information.

When a fingerprint is registered, the ridge connection relation information is extracted and recorded as fingerprint registration data.

When direction information of main distances/sub distances is used as ridge connection relation information, it is determined whether the direction information matches between ridges to be identified. When the direction information matches, a point is allotted. When a main distance and a sub distance cannot be obtained due to any reason, if the reasons thereof match, a point may be allotted. In such a manner, it is determined whether or not n-th degree main distance and sub distance match between ridges to be identified so as to obtain the match ratio of ridge connection relations.

Next, a fingerprint registering method according to the fifth embodiment will be described.

In FIG. 16, fingerprint image data is sampled by the fingerprint sensor 61 or the like. Next, the image binarizing unit 63 binarizes the sampled fingerprint image and obtains a fingerprint binarized image. The thin line image generating unit 64 generates thin lines with the fingerprint binarized image and obtains a thin line image of a fingerprint. Next, the feature point extracting unit 65 extracts the positions of feature points of the fingerprint with the thin line image of a fingerprint. The extracted fingerprint feature points generally contain incorrect feature points. Thus, the incorrect feature point removing unit 67 removes the incorrect feature points from the obtained fingerprint feature points. Since the incorrect feature point portion takes place due to an error of the thin line image of a fingerprint (crack and adhesion of a ridge), the fingerprint thin line image correcting unit 68 corrects the thin line image of a fingerprint.

Next, the projected feature point generating unit 69 generates projected feature points corresponding to all-feature points extracted by the feature point extracting unit 65. Next, the main distance and sub distance information extracting unit 70 measures the n-th degree main distance and n-th degree sub distance (n=−m, . . . , −1, 0, 1, . . . , m) for each feature point. The main distance and sub distance information extracting unit 70 calculates a plurality of main distances and a plurality of sub distance for each degree of each feature point. For example, as shown in FIG. 27, one or two main distances and one or two sub distances are calculated for each degree of each feature point. Each of main distance information and sub distance information has direction information from a distance measurement start point to a destination feature point/projected feature point. The main distance information, sub distance information, and direction information are stored as fingerprint information in the registered fingerprint information storing unit 72.

Next, a fingerprint identifying method according to the fifth embodiment will be described. In the fifth embodiment, a plurality of main distances and a plurality of sub distances are identified for each degree.

In FIG. 16, fingerprint image data is sampled by the fingerprint sensor 61 or the like. Next, the image binarizing unit 63 binarizes the sampled fingerprint image and obtains a fingerprint binarized image. Next, the thin line image generating unit 64 generates thin lines with the fingerprint binarized image and obtains a thin line image of a fingerprint. Thereafter, the feature point extracting unit 65 extracts the positions of feature points of the fingerprint with the thin line image of a fingerprint. Since the extracted fingerprint feature points generally contain incorrect feature points, the incorrect feature point removing unit 67 removes the incorrect feature points from the obtained fingerprint feature points. Since the incorrect feature point portion takes place due to an error of the thin line image of a fingerprint (crack and adhesion of a ridge), the fingerprint thin line image correcting unit 68 corrects the thin line image of a fingerprint. Next, the projected feature point generating unit 69 generates projected feature points corresponding to all the feature points extracted by the feature point extracting unit 65. Thereafter, the main distance and sub distance information extracting unit 70 measures the n-th degree main distance, the n-th degree sub distance (n=−m, . . . , −1, 0, 1, . . . , m), and the direction for each feature point.

Next, the main distance information, the sub distance information, and the direction information are read from the registered fingerprint information storing unit 72. In combinations of all feature points of the registered fingerprint and the input fingerprint, match ratios of ridge connection relations are calculated. The number of combinations whose match ratios of ridge connection relations exceed a predetermined value is counted. A match ratio of ridge connection relations is calculated for main distances and sub distances that have the same direction information. Alternatively, match ratios of ridge connection relations may be calculated assuming that types (ridge endings and ridge bifurcations) of individual feature points of the registered fingerprint are different from those of the input fingerprint.

Next, the number of all feature points of the registered fingerprint and the input fingerprint are counted. The number of the same feature points is normalized with the number of all feature points and thereby a fingerprint match ratio is calculated. When the fingerprint match ratio exceeds a predetermined value, it is determined that these fingerprints are the same fingerprints. When the fingerprint match ratio is the predetermined value or less, it is determined that these fingerprints are different fingerprints.

Thus, when direction information from a source feature point/source projected feature point to a destination projected feature point is added to the ridge connection relation information, information of a plurality of destination projected feature points can be obtained. Thus, feature points can be accurately identified in a wide range.

Alternatively, the center coordinates of the fingerprints and the coordinates, type, and direction of each feature point may be added to fingerprint information so as to increase the speed and accuracy of the fingerprint identifying process. In other words, the positions of the registered fingerprint and the input fingerprint are roughly aligned with the center coordinates thereof beforehand. When the ridge connection relation information of two feature points is identified, if the coordinates of the feature points largely deviate from a predetermined error, regardless of the match ratio of ridge connection relations, it is determined that these feature points are different feature points. In this case, the calculations of the match ratios of ridge connection relations are omitted. Thus, the identification time can be shortened. In addition, when two feature points are identified along with the types and directions thereof, these feature points can be accurately identified. Instead of the sub distance of the ridge connection relation information, the number of n-th projected feature points may be used. With the number of projected feature points, the capacity of the registered fingerprint data can be reduced.

Next, a fingerprint identifying apparatus according to a sixth embodiment of the present invention will be described.

In the sixth embodiment, when a fingerprint is registered, the following fingerprint information is recorded.

1) the n-th degree main distance for each feature point (n=−m, . . . , −1, 0, 1, m) where one main distance is recorded for each ridge sectioned by a feature point,
2) ridge connection relation information of a destination feature point used for the n-th degree main distance of each feature point,
3) the n-th degree sub distance for each feature point (n=−m, . . . , −1, 0, 1, m) where one sub distance is recorded for each ridge sectioned by a feature point, and
4) ridge connection relation information of a source projected feature point corresponding to a destination projected feature point used for the n-th degree sub distance of each feature point.

By comparing the n-th degree main distance and the n-th degree sub distance of each feature point, ridge connection relation information of a destination feature point, and ridge connection relation information of a source projected feature point, fingerprints can be identified.

Next, a fingerprint registering method according to the sixth embodiment will be described.

In FIG. 16, fingerprint image data is sampled by the fingerprint sensor 61 or the like. The image binarizing unit 63 binarizes the sampled fingerprint image and obtains a fingerprint binarized image. Next, the thin line image generating unit 64 generates thin lines with the fingerprint binarized image and obtains a thin line image of a fingerprint. Thereafter, the feature point extracting unit 65 extracts the positions of feature points of the fingerprint from the thin line image of a fingerprint. Since the extracted fingerprint feature points generally contain incorrect feature points, the incorrect feature point removing unit 67 removes the incorrect feature points from the obtained fingerprint feature points. The incorrect feature point portion takes place due to an error of thin line image of a fingerprint (crack and adhesion of a ridge), the fingerprint thin line image correcting unit 68 corrects the thin line image of a fingerprint.

Next, the projected feature point generating unit 69 generates projected feature points corresponding to all the feature points extracted by the feature point extracting unit 65. Next, the main distance and sub distance information extracting unit 70 measures the n-th degree main distance and n-th degree sub distance (n=−m, . . . , −1, 0, 1, . . . , m) for each feature point. The main distance and sub distance information extracting unit 70 calculates the n-th degree main distance and the n-th degree sub distance for each feature point. In addition, the main distance and sub distance information extracting unit 70 calculates ridge connection relations of a destination feature point and a projected feature point for each main distance and each sub distance. The main distance information, sub distance information, and ridge connection relations of a destination feature point and a projected feature point of each main distance and each sub distance are stored as fingerprint information in the registered fingerprint information storing unit 72.

Next, a fingerprint identifying method according to the sixth embodiment will be described. In the sixth embodiment, ridge connection relation information is identified in two stages. In the first stage, ridge connection relations of a source feature point and a projected feature point are identified. In the second stage, ridge connection relations of a destination feature point and a projected feature point are identified.

In FIG. 16, fingerprint image data is sampled by the fingerprint sensor 61 or the like. Next, the image binarizing unit 63 binarizes the sampled fingerprint image and obtains a fingerprint binarized image. Thereafter, the thin line image generating unit 64 generates thin lines with the fingerprint binarized image and obtains a thin line image of a fingerprint. Next, the feature point extracting unit 65 extracts the positions of feature points of the fingerprint from the thin line image of a fingerprint. The extracted fingerprint feature points generally contain incorrect feature points. Thus, the incorrect feature point removing unit 67 removes the incorrect feature points from the obtained feature points of the fingerprint. Since the incorrect feature point portion takes place due to an error of the thin line image of a fingerprint (crack and adhesion of a ridge), the fingerprint thin line image correcting unit 68 corrects the thin line image of a fingerprint. Next, the projected feature point generating unit 69 generates projected feature points corresponding to all the feature points extracted by the feature point extracting unit 65. Next, the main distance and sub distance information extracting unit 70 measures the n-th degree main distance, the n-th degree sub distance for each feature point (n=−m, . . . , −1, 0, 1, . . . , m), and ridge connection relations of a destination feature point and a projected feature point for each main distance and each sub distance.

Next, the main distance information, the sub distance information, and ridge connection relations of a destination feature point and a projected feature point for each main distance and each sub distance are read from the registered fingerprint information storing unit 72. In combinations of all feature points of the registered fingerprint and the input fingerprint, match ratios of ridge connection relations are calculated. The number of combinations whose match ratios of ridge connection relations exceed a predetermined value is counted. In addition to the ridge connection relation information of the source feature point and projected feature point, when the ridge connection relation information of the destination feature point and the projected feature point matches, a larger value of the match ratio of the ridge connection relations is designated than the case that only the ridge connection relation information of the source feature point and the projected feature point matches. Alternatively, a match ratio of ridge connection relations may be calculated assuming that the types (ridge endings and ridge bifurcations) of the individual feature points of the registered fingerprint are different from those of the input fingerprint.

Next, the number of all feature points of the registered fingerprint and the input fingerprint is counted. The number of the same feature points is normalized with the number of all the feature points and thereby a fingerprint match ratio is calculated. When the fingerprint match ratio exceeds a predetermined value, it is determined that the fingerprints are the same fingerprints. When the fingerprint match ratio is the predetermined value or less, it is determined that these fingerprints are different fingerprints.

Thus, when the ridge connection relations of a destination feature point projected feature point for each main distance and each sub distance are added as identifying objects, with one set of feature points, ridge structures can be identified in a wide range. In addition, by adding the ridge connection relation information of the source projected feature point corresponding to the destination projected feature point to the ridge connection relation information of the source feature point, ridge structures can be easily identified in a wide range.

In addition, by adding the center coordinates of fingerprints and the coordinates, type, and direction of each feature point to the fingerprint information, the speed and accuracy of the identifying process can be increased. The registered fingerprint and the input fingerprint are roughly aligned with the center coordinates thereof. When the ridge connection relation information of two feature points is identified, if the coordinates of the feature points largely deviate from a predetermined value, regardless of the match ratio of ridge connection relations, it is determined that these feature points are different feature points. Calculations of match ratios of ridge connection relations are omitted. Thus, the identification time can be shortened. In addition, when two feature points are identified along with the types and directions thereof, the accuracy of the identifying process can be improved.

Instead of a sub distance of the ridge connection relation information, the number of n-th degree projected feature points may be used. With the number of projected feature points, the capacity of the registered fingerprint data can be decreased.

Figure 29:
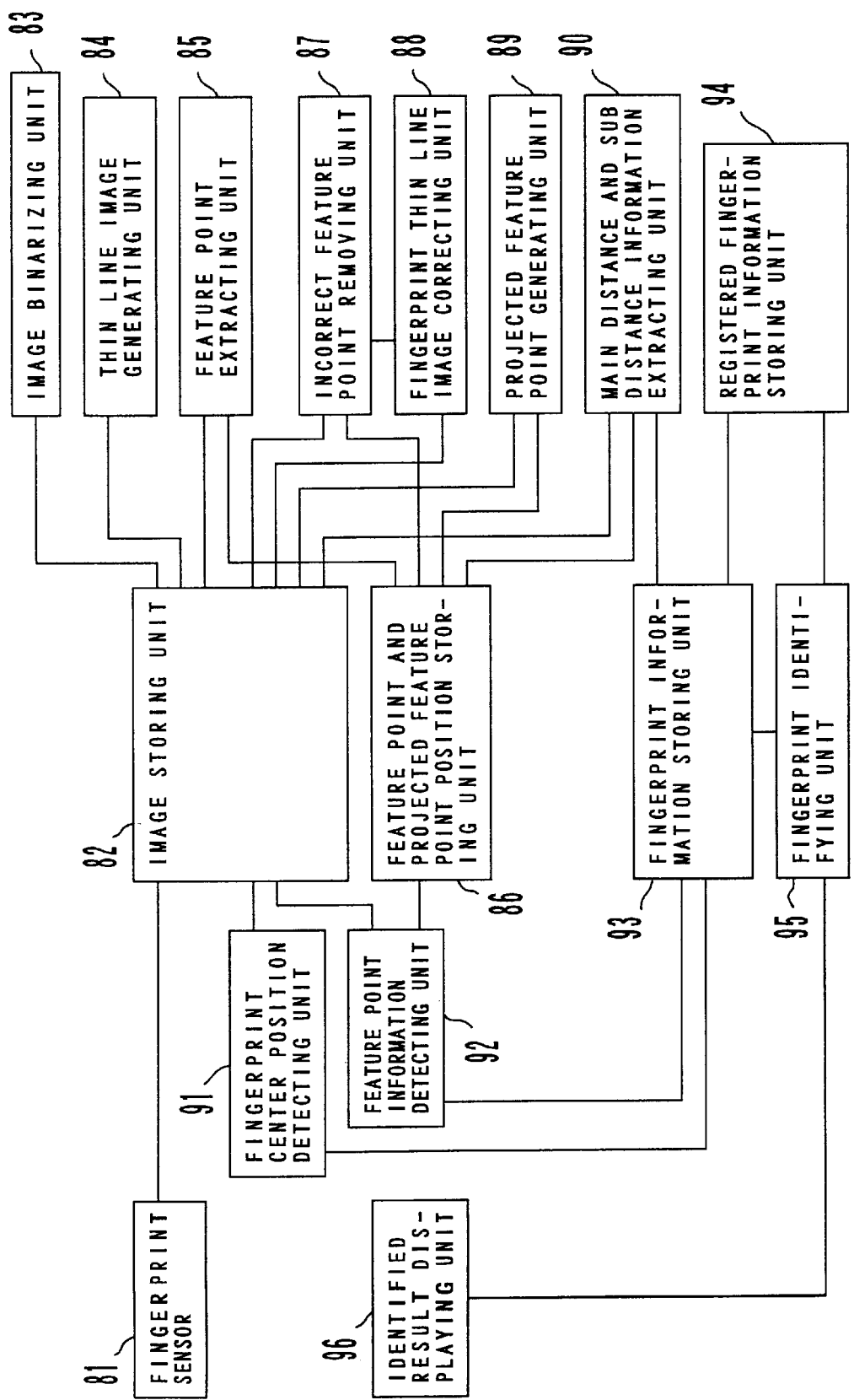
FIG. 29 is a block diagram showing the structure of a fingerprint identifying apparatus according to a seventh embodiment of the present invention.

FIG. 29 is a block diagram showing the structure of a fingerprint identifying apparatus according to a seventh embodiment of the present invention.

In the seventh embodiment, when a fingerprint is registered, the following fingerprint information is recorded:

1) center coordinates of the fingerprint,
2) the type of each feature point,
3) the coordinates of each feature point,
4) the direction of each feature point,
5) the n-th degree main distance for each feature point (n=-m, ..., -1, 0, 1, ..., m) where one main distance is recorded for each ridge sectioned by a feature point, and
6) the n-th degree sub distance for each feature point (n=-m, ..., -1, 0, 1, ..., m) where one sub distance is recorded for each ridge sectioned by a feature point.

In FIG. 29, a fingerprint sensor 81 samples fingerprint image data from a finger of a human being or an animal. An image storing unit 82 stores the fingerprint image data sampled by the fingerprint sensor 81. Alternatively, the image storing unit 82 stores image data that has been processed. An image binarizing unit 83 converts a multi-value image stored in the image storing unit 82 into a binary image. A thin line image generating unit 84 generates thin lines with the binary image binarized by the image binarizing unit 83 and generates thin line image data of ridges of the fingerprint. A feature point extracting unit 85 detects the positions of feature points from the thin line image of a fingerprint and stores the result to a feature point and projected feature point position storing unit 86. The feature point and projected feature point position storing unit 86 stores the positions of the feature points extracted by the feature point extracting unit 85. In addition, the feature point and projected feature point position storing unit 86 stores position information of projected feature points generated by a projected feature point generating unit 89. An incorrect feature point removing unit 87 detects incorrect feature points from the feature points extracted from the thin line image of a fingerprint and removes incorrect feature point information from the feature point and projected feature point position storing unit 86. In addition, the incorrect feature point removing unit 87 sends incorrect feature point information to the fingerprint thin line image correcting unit 88. The fingerprint thin line image correcting unit 88 corrects the thin line image of a fingerprint corresponding to the incorrect feature point information received from the incorrect feature point removing unit 87.

The projected feature point generating unit 89 generates projected feature points corresponding to all the feature points corresponding to the corrected thin line image of a fingerprint from which the incorrect feature points have been removed and the positions of the feature points. A main distance and sub distance information extracting unit 90 obtains ridge connection relation information (fingerprint information) of each feature point corresponding to the thin'line image of a fingerprint stored in the image storing unit 82 and the positions of the feature points and projected feature points stored in the feature point and projected feature point position storing unit 86 and outputs the result to a fingerprint information storing unit 93.

A fingerprint center position detecting unit 91 detects the center position of the fingerprint from the fingerprint image. A feature point information detecting unit 92 detects feature point information of coordinates, type, and direction of each feature point.

A fingerprint information storing unit 93 stores feature point information of coordinates, type, and direction of each feature point in addition to the ridge connection relation information of each feature point and each projected feature point extracted by the main distance and sub distance information extracting unit 90. A registered fingerprint information storing unit 94 stores fingerprint information registered in the fingerprint identifying apparatus. A fingerprint identifying unit 95 identifies fingerprint information obtained from the input fingerprint and fingerprint information of the registered fingerprint stored in the registered fingerprint information storing unit 94 and sends the result to an identified result displaying unit 96. The identified result displaying unit 96 sends the result to the user of the fingerprint identifying apparatus through a display and a speaker.

Figure 30A:
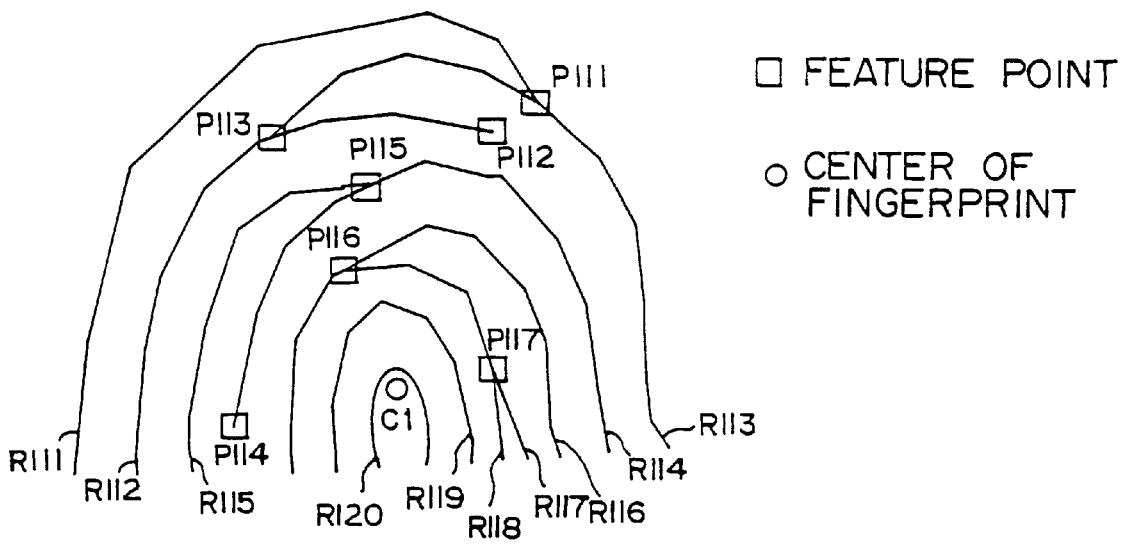
FIG. 30A is a schematic diagram showing a registered fingerprint image.

FIG. 30A is a schematic diagram showing a fingerprint image to be registered.

In FIG. 30A, a fingerprint to be registered has ridges R111 to R120. The ridge R111 is connected to the ridge R113 at a ridge bifurcation P111. The ridge R112 is connected to the ridge R113 at a ridge bifurcation P113. The ridge R112 breaks at a ridge ending P112. The ridge R114 is connected to the ridge R115 at a ridge bifurcation P115. The ridge R114 breaks at a ridge ending P114. The ridge R116 is connected to the ridge R117 at a ridge bifurcation P116. The ridge R117 is connected to the ridge R118 at a ridge bifurcation P117. The ridge bifurcations P111, P113, P115, P116, and P117 and the ridge endings P112 and P114 are extracted from the fingerprint image. The positions and directions of the extracted ridge bifurcations and ridge endings are registered corresponding to the center C1 of the fingerprint along with the types of the feature points.

In addition, the ridge connection relations of the ridge bifurcations P111, P113, P115, P116, and P117, and the ridge endings P112 and P114 and the ridge connection relations of the feature points and projected feature points thereof are registered.

Figure 30B:
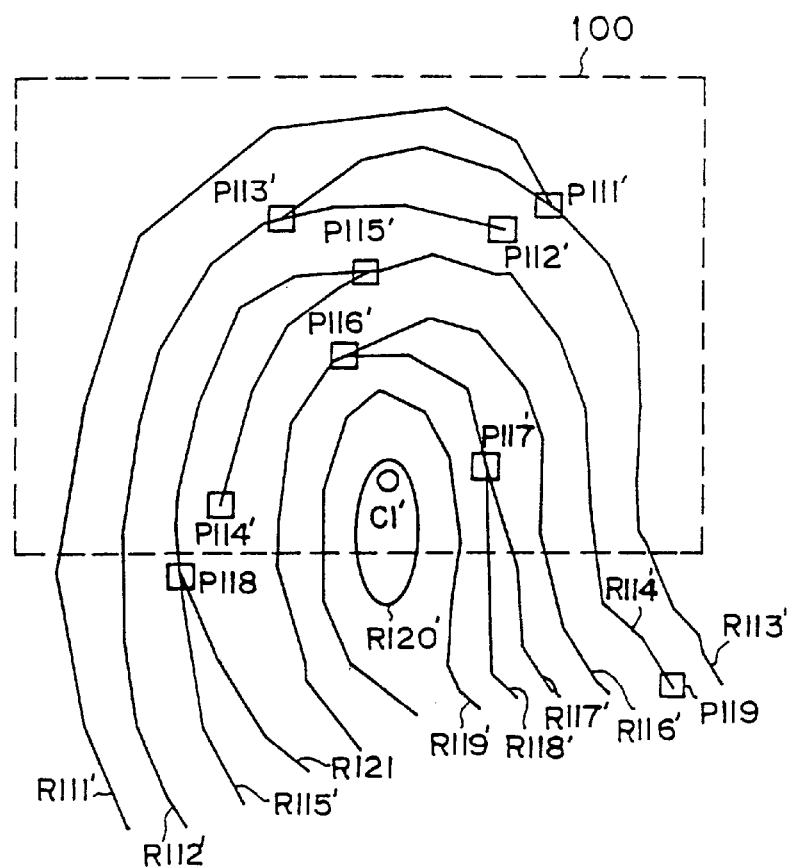
FIG. 30B is a schematic diagram showing an input fingerprint image.

FIG. 30B is a schematic diagram showing an input fingerprint image.

In FIG. 30B, a fingerprint to be identified has ridges R111' to R120'. The ridge R111' is connected to the ridge R113' at a ridge bifurcation P111'. The ridge R112' is connected to the ridge R113' at a ridge bifurcation P113'. The ridge R112' breaks at a ridge ending P112'. The ridge R114' is connected to the ridge R115' at a ridge bifurcation P115'. The ridge R114' breaks at a ridge ending P114'. The ridge R116' is connected to the ridge R117' at a ridge bifurcation P116'. The ridge R117' is connected to the ridge R118' at a ridge bifurcation P117'.

Thus, since the region of the registered fingerprint image is different from the region of the input fingerprint image, a common region 100 of the registered fingerprint image and the input fingerprint image is extracted. For the common region 100, the fingerprints are identified.

In other words, in the common region 100, the ridge bifurcations P111', P113', and P115', the ridge bifurcations P116' and P117', and the ridge endings P112' and P114' are extracted from the input fingerprint image. The positions and directions of these feature points extracted from the input fingerprint image are calculated corresponding to the center C1' of the fingerprint.

In addition, the ridge connection relations of the ridge bifurcations P111', P113', P115', P116', and P117', and the ridge endings P112' and P114' and the ridge connection relations of these feature points and projected feature points thereof are calculated.

By determining whether or not the types, positions, directions, and ridge connection relations of the ridge bifurcations P111, P113, P115, P116, and P117, and the ridge endings P112 and P114 match those of the ridge bifurcations P111', P113', P115', P116', and P117' and the ridge endings P112' and P114', the registered fingerprint image shown in FIG. 30A and the input fingerprint image shown in FIG. 30B are identified.

Next, a fingerprint registering process according to the seventh embodiment will be described.

Figure 31:
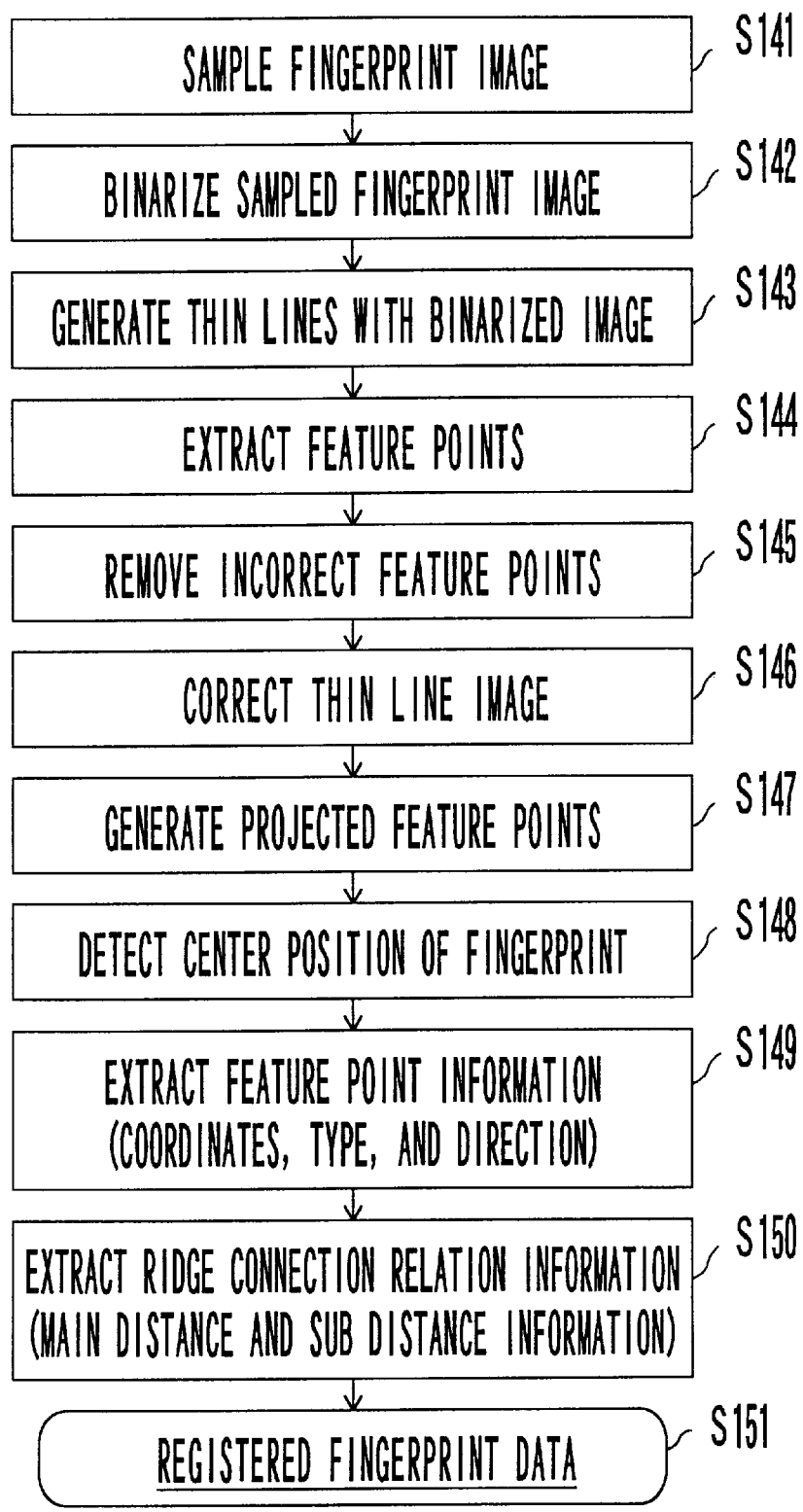
FIG. 31 is a flowchart showing a fingerprint registering process of the fingerprint identifying apparatus shown in FIG. 29.

FIG. 31 is a flowchart showing a fingerprint registering process of the fingerprint identifying apparatus shown in FIG. 29.

In FIG. 31, fingerprint image data is sampled by the fingerprint sensor 81 or the like (at step S141). Next, the image binarizing unit 83 binarizes the sampled fingerprint image and obtains a fingerprint binarized image (at step S142). Thereafter, the thin line image generating unit 84 generates thin lines with the fingerprint binarized image and obtains a thin line image of a fingerprint (at step S143). Next, the feature point extracting unit 85 extracts the positions of feature points of the fingerprint from the thin line image of a fingerprint (at step S144). The extracted fingerprint feature points generally contain incorrect feature points. Thus, the incorrect feature point removing unit 87 removes the incorrect feature points from the fingerprint feature points (at step S145). Since the incorrect feature point portion takes place due to an error of the thin line image of a fingerprint (crack and adhesion of a ridge), the fingerprint thin line image correcting unit 88 corrects the thin line image of a fingerprint (at step S146).

Next, the projected feature point generating unit 89 generates projected feature points corresponding to all the feature points extracted by the feature point extracting unit 85 (at step S147). Next, the fingerprint center position detecting unit 91 detects the center position of the fingerprint (at step S148). Thereafter, the feature point information detecting unit 92 detects feature point information (coordinates, type, and direction) of each feature point (at step S149). Next, the main distance and sub distance information extracting unit 90 measures the n-th degree main distance and the n-th degree sub distance for each feature point ($n = -m, \ldots, -1, 0, 1, \ldots, m$) (at step S150). In other words, the fingerprint information contains the fingerprint center position information, the feature point information for each feature point, the n-th degree main distance for each feature point, and the n-th degree sub distance information of each feature point. The fingerprint information is stored in the registered fingerprint information storing unit 94 (at step S151).

Next, a fingerprint identifying method according to the seventh embodiment will be described.

Figure 33:
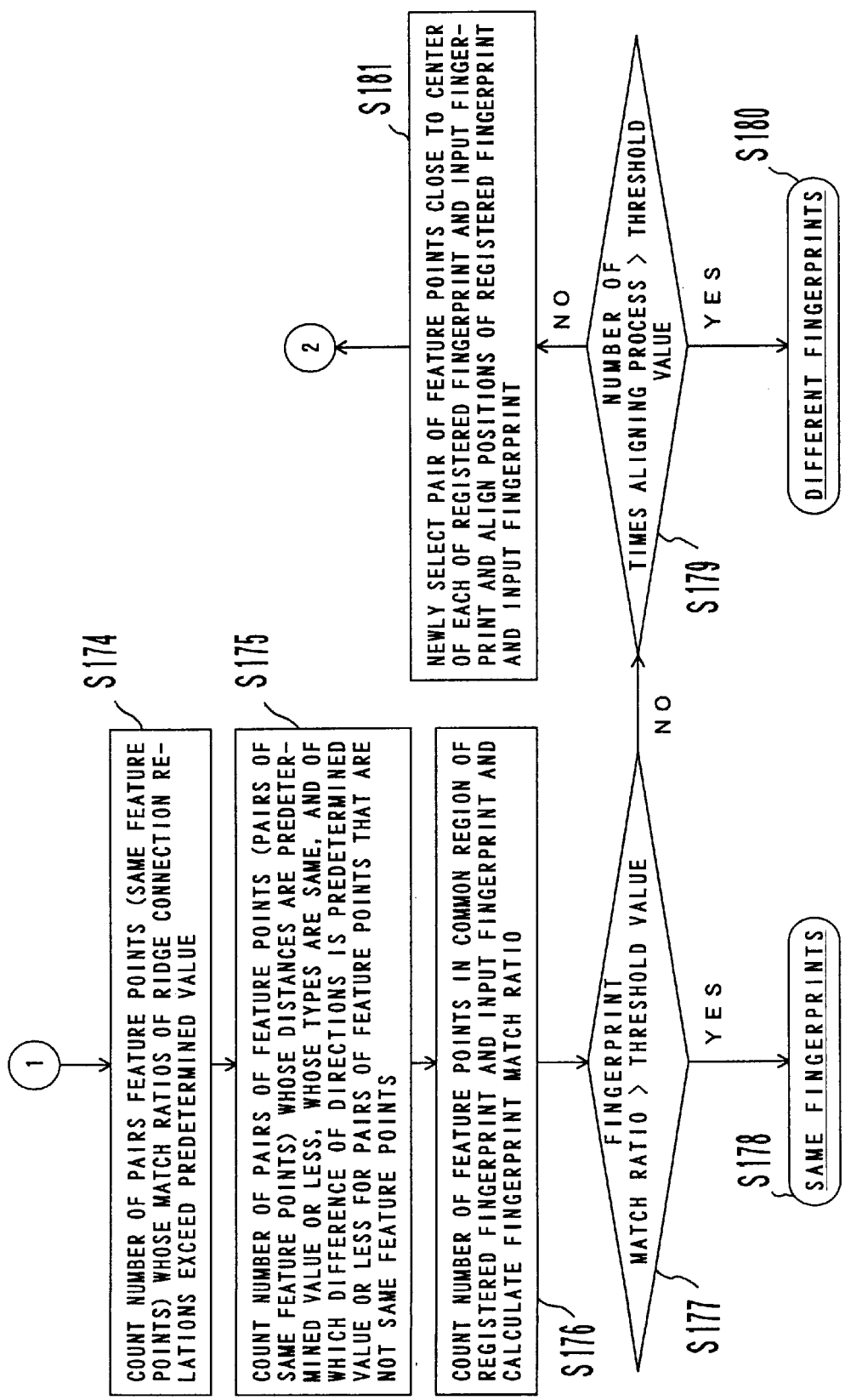
FIG. 33 is a second flowchart of FIG. 32.

FIGS. 32 and 33 are flowcharts showing a fingerprint identifying process of the fingerprint identifying apparatus shown in FIG. 29.

In FIG. 32, fingerprint image data is sampled by the fingerprint sensor 81 or the like (at step S161). Next, the image binarizing unit 83 binarizes the sampled fingerprint image and obtains a fingerprint binarized image (at step S162). Thereafter, the thin line image generating unit 84 generates thin lines with the fingerprint binarized image and obtains a thin line image of a fingerprint (at step S163). Next, the feature point extracting unit 85 extracts the positions of feature points of the fingerprint from the thin line image of a fingerprint (at step S164). The extracted fingerprint feature points generally contain incorrect feature points. Thus, the incorrect feature point removing unit 87 removes the incorrect feature points from the obtained feature points (at step S165). Since the incorrect feature point portion takes place due to an error of the thin line image of a fingerprint (crack and adhesion of a ridge), the fingerprint thin line image correcting unit 88 corrects the thin line image of a fingerprint (at step S166). Next, the projected feature point generating unit 89 generates projected feature points corresponding to all the feature points extracted by the feature point extracting unit 85 (at step S167).

Next, the fingerprint center position detecting unit 91 detects the center position of the fingerprint (at step S168). Thereafter, the feature point information detecting unit 92 detects the feature point information (coordinates, type, and direction) of each feature point (at step S169). Next, the main distance and sub distance information extracting unit 90 calculates the n-th degree main distance and the n-th degree sub distance for each feature point ($n = -m, \ldots, -1, 0, 1, \ldots, m$) (at step S170).

Next, the fingerprint information is read from the registered fingerprint information storing unit 94 (at step S171). One feature point that is close to the center of each of the registered fingerprint and the input fingerprint is selected. With the positions of the selected feature points of the registered fingerprint and the input fingerprint, these fingerprints are aligned (at step S172). Since the center positions of the fingerprints deviate for each measurement, the feature points are used for aligning the positions of the fingerprints.

Next, in combinations of all feature points of the registered fingerprint and the input fingerprint, feature points whose distances are within a predetermined value are selected. For all the combinations of the selected feature points, match ratios of ridge connection relations are calculated (at step S173).

Next, in FIG. 33, the number of pairs of feature points whose match ratios of ridge connection relations exceed a predetermined value is counted (at step S174). Next, the pairs of feature points whose match ratios of ridge connection relations do not exceed the predetermined value are counted, the number of pairs of feature points whose distances are a predetermined value or less (smaller than the predetermined value used to decrease calculation objects for match ratios of ridge connection relations by the distances of the feature points), whose types are the same, and of which the difference of directions is a predetermined value or less (at step S175). Next, the number of all feature points in the common region of the registered fingerprint and the input fingerprint is counted. With the number of the same feature points and the number of all feature points in the common region, the fingerprint match ratio of the registered fingerprint and the input fingerprint is calculated (at step S176).

When the fingerprint match ratio exceeds a predetermined value (at step S177), it is determined that the registered fingerprint is the same as the input fingerprint (at step S178). When the fingerprint match ratio does not exceed the predetermined value, it is determined whether or not the number of times of the alignment readjustment exceeds a predetermined value (at step S179). When the number of times of the aligning readjustment exceeds the predetermined value, it is determined that the registered fingerprint is different from the input fingerprint (at step S180).

When the number of times of the aligning readjustment is the predetermined value or less, a new pair of feature points that are close to the center of each of the registered fingerprint and the input fingerprint are selected. Thus, the pairs of feature points used for aligning the positions of the fingerprints are changed (at step S181). Thereafter, the flow returns to step S173. At step S173, the fingerprint match ratio is calculated once again.

Instead of a sub distance of ridge connection relation information, the number of n-th degree projected feature points may be used. With the number of projected feature points, the capacity of the registered fingerprint data can be reduced.

It should be noted that the present invention is not limited to the above-described embodiments. In other words, the present invention can be modified in various manners in the spirit and scope thereof. In the above-described embodiments, identification of fingerprints was explained. However, the present invention can be applied to identification of vein distribution, character recognition, and so forth.

In addition, as examples of feature points, ridge endings and ridge bifurcations were described. However, bent points of which ridges are bent may be extracted as feature points.

Moreover, in the above-described embodiments, distances along ridges were used as feature point information.

In the above-described embodiments, a distance along a ridge was used as feature point information. However, a distance along a ridge may be substituted with a straight distance. Thus, since the measurement of the distance along a ridge becomes the measurement of the straight distance, ridge connection relation information can be easily generated.

In the above-described embodiments, the case of which one main distance or sub distance is recorded for one region on a ridge sectioned by a feature point was described. Alternatively, a plurality of main distances or sub distances may be recorded for one region on a ridge sectioned by a feature point.

As described above, according to the present invention, fingerprints are identified corresponding to the placement state of a feature point against a ridge. Thus, even if a fingerprint distorts due to partial expansion, shrinkage, and rotation of the skin of a finger, fingerprints can be accurately and stably identified.

In addition, according to an aspect of the present invention, fingerprints are identified corresponding to fingerprint information of a virtual feature point disposed on a ridge. Thus, information that is a key for identifying a fingerprint can be increased without need to vary a ridge structure of the fingerprint that has been sampled. Thus, fingerprints can be accurately and stably identified.

In addition, according to an aspect of the present invention, when a feature point on a ridge is projected to another ridge, a two-dimensional ridge structure can be one-dimensionally represented on a ridge. By one-dimensionally tracing a ridge, the feature of a two-dimensional ridge structure can be obtained. Thus, fingerprints can be accurately identified at high speed.

In addition, according to an aspect of the present invention, fingerprints are identified corresponding to the length of a ridge sectioned at the position of a feature point or a virtual feature point. Thus, even if a fingerprint distorts, the features of the original fingerprint can be stored. Consequently, fingerprints can be accurately and stably identified.

In addition, according to an aspect of the present invention, fingerprints are identified corresponding to the distance on a ridge between feature points or virtual feature points. Thus, the measurement of the distance along a ridge becomes the measurement of the straight distance. Consequently, calculations for generating fingerprint information can be simplified.

In addition, according to an aspect of the present invention, fingerprints are identified corresponding to the connection direction to a feature point or a virtual feature point on a ridge. Thus, in consideration of the connection state in a plurality of directions corresponding to a feature point or a virtual feature point, fingerprints can be identified. Consequently, fingerprints can be accurately identified.

In addition, according to an aspect of the present invention, fingerprints are identified corresponding to the number of feature points or virtual feature points on a ridge. Thus, fingerprints can be stably identified at high speed.

In addition, according to an aspect of the present invention, fingerprints are identified corresponding to types of feature points on a ridge. Thus, fingerprints can be stably identified. Moreover, in comparison with the case that fingerprints are identified corresponding to the number of feature points and virtual feature points, the accuracy of the identification of fingerprints can be further improved.

In addition, according to an aspect of the present invention, the type of a source projected feature point corresponding to a destination projected feature point on a ridge is used as type information of the projected feature point. Thus, fingerprints can be identified in consideration of type information of a virtual feature point.

In addition, according to an aspect of the present invention, fingerprints are identified corresponding to the order of feature points and virtual feature points on a ridge. Thus, the accuracy of the identification of fingerprints can be further improved.

In addition, according to an aspect of the present invention, the type of a feature point on a ridge is virtually changed. Thus, even if the type of a feature point is unstably detected, fingerprints can be accurately identified.

In addition, according to an aspect of the present invention, a ridge bifurcation is generated by integrating a ridge ending of a ridge and a projected point. Thus, even if a ridge bifurcation is mistakenly detected as a ridge ending, fingerprints can be identified in consideration of the original ridge structure. Consequently, fingerprints can be stably identified.

In addition, according to an aspect of the present invention, the distance on a ridge between feature points and the distance on a ridge between a feature point and a virtual feature point are compared. Thus, even if the type of a destination feature point or the type of a virtual feature point is mistakenly detected, the distances on ridges can be compared. Consequently, fingerprints can be stably identified.

In addition, according to an aspect of the present invention, a ridge is separated at a ridge bifurcation into a ridge ending and a projected point. Thus, even if a ridge ending is mistakenly detected as a ridge bifurcation, fingerprints can be identified in consideration of the original ridge structure. Consequently, fingerprints can be stably identified.

In addition, according to an aspect of the present invention, the distance on a ridge between a virtual feature point and a feature point and the distance on a ridge between a virtual feature point and another virtual feature point are compared. Thus, even if the type of a designation feature point or the type of a virtual feature point is mistakenly detected, distances on ridges can be compared. Consequently, fingerprints can be stably identified.

In addition, according to an aspect of the present invention, fingerprint information of feature points on different ridges is compared. Thus, even if the type of a feature point that is a distance-on-ridge start point is mistakenly detected, fingerprint information can be compared. Consequently, fingerprints can be accurately identified.

In addition, according to an aspect of the present invention, the distances on the same ridges are compared so as to determine whether or not feature points match. Thus, even if a fingerprint distorts, feature points can be stably identified. In addition, according to an aspect of the present invention, distance-on-ridge information of different ridges is added to fingerprint information. Thus, one feature point of each of fingerprints can be identified in consideration of ridge structures that have not been connected. Consequently, feature points can be accurately identified.

In addition, according to an aspect of the present invention, when one feature point of each of fingerprints is identified, ridge structures can be obtained in a wide range by considering fingerprint information of another feature point or a source projected feature point. Consequently, feature points can be accurately identified.

In addition, according to an aspect of the present invention, the reason why a ridge connection state of a feature point cannot be obtained is contained in the ridge connection state. Thus, when the ridge connection state is obtained in a later identifying process, feature points can be identified in consideration of the validity of the ridge connection state.

In addition, according to an aspect of the present invention, a plurality of evaluation criteria are provided. Thus, identification difficulty due to expansion, shrinkage, and rotation of the skin and identification difficulty due to crack and adhesion of a ridge can be handled.

In addition, according to an aspect of the present invention, by inverting the top portion and the bottom portion of a ridge, the positions of a ridge ending and a ridge bifurcation can be inverted. For example, only with an image processing function for ridge endings, ridge bifurcations can be processed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A fingerprint registering apparatus, comprising:
   a fingerprint data inputting unit inputting fingerprint data;
   a ridge extractor extracting a ridge of a fingerprint based on the fingerprint data;
   a feature point extractor extracting a plurality of feature points on the ridge based on the fingerprint data;
   a placement state detector starting trace of the ridge from a feature point and detecting the placement state between the feature point and another feature point detected in the trace of the ridge; and
   a register registering the placement state as personal information.

2. The fingerprint registering apparatus as set forth in claim 1,
   wherein the placement state is one or any combination of data that represents the number of feature points on the ridge, the types of the feature points on the ridge, the arrangement order of the feature points on the ridge, a straight distance or a distance along the ridge from a start point designated on the ridge to each of the feature points, and the connection direction from the start point to each of the feature points.

3. The fingerprint registering apparatus as set forth in claim 2,
   wherein the types of the feature points are ridge endings or ridge bifurcations.

4. A fingerprint registering apparatus, comprising:
   a fingerprint data inputting unit inputting fingerprint data;
   a feature point extractor extracting a plurality of feature points of a fingerprint based on the fingerprint data;
   a virtual feature point designating unit designating a virtual feature point on a ridge corresponding to the feature point extracted by said feature point extractor;
   a fingerprint information calculator calculating fingerprint information of the
   a register registering the fingerprint information calculated by said fingerprint information calculator as personal information;
   wherein the virtual feature point is a projected point of a feature point really existing on said ridge projected onto another ridge.

5. The fingerprint registering apparatus as set forth in claim 4,
   wherein the fingerprint information is one or any combination of data that represents the number of feature points on the ridge, the number of virtual feature points on the ridge, the types of the feature points on the ridge, the arrangement order of the feature points on the ridge, the arrangement order of the virtual feature points on the ridge, a straight distance or a distance along the ridge from a start point designated on the ridge to each of the feature points or to each of the virtual feature points, and the connection direction from the start point to each of the feature points or to each of the virtual feature points.

6. A fingerprint identifying apparatus, comprising:
   a fingerprint data inputting unit for inputting fingerprint data;
   a ridge extractor extracting a ridge of a fingerprint based on the fingerprint data;
   a feature point extractor extracting a plurality of feature points on the ridge based on the fingerprint data;
   a placement state detector starting trace of the ridge from a feature point and detecting the placement state between the feature point and another feature point detected in the trace of the ridge; and a fingerprint identifying unit identifying the fingerprint based on the placement state.

7. The fingerprint identifying apparatus as set forth in claim 6, wherein the placement state is one or any combination of data that represents the number of feature points on the ridge, the types of the feature points on the ridge, the arrangement order of the feature points on the ridge, a straight distance or a distance along the ridge from a start point designated on the ridge to each of the feature points, and the connection direction from the start point to each of the feature points.

8. The fingerprint identifying apparatus as set forth in claim 7, wherein the types of the feature points are ridge endings or ridge bifurcations.

9. A fingerprint identifying apparatus, comprising:

a fingerprint data inputting unit inputting fingerprint data;

a virtual feature point designating unit designating a virtual feature point on the ridge by projecting the feature points existing on another ridge onto a ridge based on the fingerprint data;

a fingerprint information calculator calculating fingerprint information of the virtual feature point designated by said virtual feature point designating unit; and a fingerprint identifying unit identifying the fingerprint based on the fingerprint information.

10. A fingerprint identifying apparatus, comprising:

a fingerprint data inputting unit inputting fingerprint data;

a virtual feature point designating unit designating a virtual feature point on the ridge based on the fingerprint data;

a fingerprint information calculator calculating fingerprint information of the virtual feature point designated by said virtual feature point designating unit; and a fingerprint identifying unit identifying the fingerprint based on the fingerprint information, wherein said virtual feature point designating unit has:

a projected point generator generating a projected point of a feature point really existing on said ridge projected onto another ridge.

11. The fingerprint identifying apparatus as set forth in claim 10, wherein said virtual feature point designating unit has:

a virtual ridge bifurcation generator integrating a ridge ending of the ridge and a projected point corresponding to the ridge ending so as to generate a virtual ridge bifurcation on the ridge.

12. The fingerprint identifying apparatus as set forth in claim 10, wherein said virtual feature point designating unit has:

a virtual ridge ending generator separating the ridge at a ridge bifurcation so as to generate a virtual ridge ending and a projected point corresponding thereto.

13. The fingerprint identifying apparatus as set forth in claim 9, wherein said identifying unit has:

a first comparator comparing fingerprint information of feature points on different ridges.

14. A fingerprint identifying apparatus, comprising:

a fingerprint data inputting unit inputting fingerprint data;

a virtual feature point designating unit designating a virtual feature point on a ridge based on the fingerprint data;

a fingerprint information calculator calculating fingerprint information of the virtual feature point designated by said virtual feature point designating unit; and a fingerprint identifying unit identifying the fingerprint based on the fingerprint information, wherein said identifying unit has:

a second comparator comparing a distance on said ridge from a particular feature point to another feature point and a distance from the particular feature point to a virtual feature point.

15. A fingerprint identifying apparatus, comprising:

a fingerprint data inputting unit inputting fingerprint data;

a virtual feature point designating unit designating a virtual feature point on a ridge based on the fingerprint data;

a fingerprint information calculator calculating fingerprint information of the virtual feature point designated by said virtual feature point designating unit; and a fingerprint identifying unit identifying the fingerprint based on the fingerprint information, wherein said identifying unit has:

a third comparator comparing a distance on a ridge from a particular virtual feature point to another feature point and a distance on said ridge from the particular virtual feature point to another virtual feature point.

16. A fingerprint identifying apparatus, comprising:

a fingerprint data inputting unit inputting fingerprint data;

a first feature point extractor extracting a first feature point based on the fingerprint data;

a second feature point extractor extracting a second feature point based on the fingerprint data;

a connection state detector detecting the connection state of the first feature point and the second feature point via a ridge, the connection state comprising at least one of a straight distance or a distance along the ridge from the first feature point on the ridge to the second feature point on the ridge, the number of feature points and the number of projected feature points between the first feature point and the second feature point, the type of the feature points on the ridge, the arrangement order of the feature points on the ridge, the arrangement order of projected feature points between the first feature point and the second feature point, and the connection direction from the first feature point to the second feature point; and an identifying unit identifying a fingerprint based on the connection state.

17. A fingerprint identifying apparatus, comprising:

a fingerprint data unit for inputting fingerprint data;

a first feature point extractor extracting a first feature point based on the fingerprint data;

a second feature point extractor extracting a second feature point based on the fingerprint data;

a virtual feature point generator generating a virtual feature point corresponding to the first feature point;

a connection state detector detecting the connection state of the second feature point and the virtual feature point via a ridge; and an identifying unit identifying a fingerprint based on the connection state.

18. A fingerprint identifying apparatus, comprising:

a fingerprint data inputting unit inputting fingerprint data;

a first feature point extractor extracting a first feature point based on the fingerprint data;

a second feature point extractor extracting a second feature point based on the fingerprint data;

a first virtual feature point generator generating a first virtual feature point corresponding to the first feature point;

a second virtual feature point generator generating a second virtual feature point corresponding to the second feature point;

a connection state detector detecting the connection state of the first virtual feature point and the second virtual feature point via a ridge; and an identifying unit identifying a fingerprint based on the connection state.

19. A fingerprint identifying apparatus, comprising:

a fingerprint image inputting unit inputting a fingerprint image;

a binarizing unit binarizing the fingerprint image;

a thin line image generator generating thin lines with the binarized fingerprint image;

a ridge extractor extracting a ridge from the thin line fingerprint image;

a feature point extractor extracting a plurality of feature points on the ridge;

a feature point connection information extractor extracting the connection state of the feature point on the ridge, the connection state comprising at least one of a straight distance or a distance along the ridge from a first feature point which is selected from the plurality of feature points on the ridge to a second feature point which is selected from the plurality of feature points on the ridge, the number of feature points and the number of projected feature points between the first feature point and the second feature point, the type of the feature points on the ridge, the arrangement order of the feature points on the ridge, the arrangement order of projected feature points between the first feature point and the second feature point, and the connection direction from the first feature point to the second feature point; and an identifying unit identifying the fingerprint image based on the connection state of the feature point on the ridge.

20. A fingerprint identifying apparatus, comprising:

a fingerprint image inputting unit inputting a fingerprint image;

a binarizing unit binarizing the fingerprint image;

a thin line image generator generating thin lines with the binarized fingerprint image;

a ridge extractor extracting a ridge from the thin line fingerprint image;

a feature point extractor extracting a feature point on the ridge;

a feature point connection information extractor extracting the connection state of the feature point on the ridge; and an identifying unit identifying the fingerprint image based on the connection state of the feature point on the ridge, wherein said feature point connection information extractor has:

a first calculator calculating a distance along the ridge or a straight distance between the feature points, and wherein said identifying unit has:

a first determining unit determining that ridge structures of fingerprints match when the distance between the feature points on the ridge or the straight distance thereof of each of fingerprints match within a predetermined error.

21. The fingerprint identifying apparatus as set forth in claim 19, further comprising:

a projected feature point generator generating a projected feature point of the feature point projected onto an adjacent ridge.

22. A fingerprint identifying apparatus, comprising:

a fingerprint image inputting unit inputting a fingerprint image;

a binarizing unit binarizing the fingerprint image;

a thin line image generator generating thin lines with the binarized fingerprint image;

a ridge extractor extracting a ridge from the thin line fingerprint image;

a feature point extractor extracting a feature point on the ridge;

a feature point connection information extractor extracting the connection state of the feature point on the ridge; and an identifying unit identifying the fingerprint image based on the connection state of the feature point on the ridge; and a projected feature point generator generating a projected feature point of the feature point projected onto an adjacent ridge, wherein said feature point connection information extractor has:

a second calculator calculating a distance on the ridge between the feature point and the virtual feature point or a straight distance thereof, and wherein said identifying unit has:

a second determining unit determining that ridge structures of fingerprints match when the distance between the feature point and the projected feature point on the ridge or the straight distance thereof and that of another fingerprint image match within a predetermined error.

23. A fingerprint identifying apparatus, comprising:

a fingerprint image inputting unit inputting a fingerprint image;

a binarizing unit binarizing the fingerprint image;

a thin line image generator generating thin lines with the binarized fingerprint image;

a ridge extractor extracting a ridge from the thin line fingerprint image;

a feature point extractor extracting a feature point on the ridge;

a feature point connection information extractor extracting the connection state of the feature point on the ridge; and an identifying unit identifying the fingerprint image based on the connection state of the feature point on the ridge; and a projected feature point generator generating a projected feature point of the feature point projected onto an adjacent ridge, wherein said feature point connection information extractor has:

a measurement start point designating unit designating a projected feature point of the feature point projected onto an adjacent ridge to a measurement start point; and a third calculator calculating a distance on a ridge or a straight distance thereof from the measurement start point to another feature point or to another projected feature point on the ridge which connects to the measurement start point, and wherein said identifying unit has:

a third determining unit determining that ridge structures of fingerprints match when the distance from the measurement start point to another feature point or to another projected feature point on the ridge which connects to the measurement start point match within a predetermined error.

24. The fingerprint identifying apparatus as set forth in claim 21, wherein said feature point connection information extractor has:

a fourth calculator calculating the number of feature points and projected feature points on the ridge, and wherein said identifying unit has:

a fourth determining unit determining that ridge structures of fingerprints match when the number of feature points and/or projected feature points on the ridge matches within a predetermined error.

25. A fingerprint identifying apparatus, comprising:

a fingerprint image inputting unit inputting a fingerprint image;

a binarizing unit binarizing the fingerprint image;

a thin line image generator generating thin lines with the binarized fingerprint image;

a ridge extractor extracting a ridge from the thin line fingerprint image;

a feature point extractor extracting a feature point on the ridge;

a feature point connection information extractor extracting the connection state of the feature point on the ridge; and an identifying unit identifying the fingerprint image based on the connection state of the feature point on the ridge; and a projected feature point generator generating a projected feature point of the feature point projected onto an adjacent ridge, wherein said feature point connection information extractor has:

a fingerprint information extractor extracting fingerprint information about another feature point in association with the feature point or a projected feature point, and wherein said identifying unit has:

a fifth determining unit determining whether or not ridge structures of fingerprints match based on the fingerprint information.

26. A fingerprint identifying apparatus, comprising:

a fingerprint image inputting unit inputting a fingerprint image;

a binarizing unit binarizing the fingerprint image;

a thin line image generator generating thin lines with the binarized fingerprint image;

a ridge extractor extracting a ridge from the thin line fingerprint image;

a feature point extractor extracting a feature point on the ridge;

a feature point connection information extractor extracting the connection state of the feature point on the ridge; and an identifying unit identifying the fingerprint image based on the connection state of the feature point on the ridge, wherein said feature point connection information extractor has:

a reason extractor extracting a reason of which a ridge connection state of a feature point cannot be obtained, and wherein said identifying unit has:

a sixth determining unit determining whether or not ridge structures of fingerprints match based on the reason extracted by said reason extractor.

27. The fingerprint identifying apparatus as set forth in claim 19, wherein said feature point connection information extractor has:

a first type information extractor extracting type information of a destination feature point on the ridge.

28. A fingerprint identifying apparatus, comprising:

a fingerprint image inputting unit inputting a fingerprint image;

a binarizing unit binarizing the fingerprint image;

a thin line image generator generating thin lines with the binarized fingerprint image;

a ridge extractor extracting a ridge from the thin line fingerprint image;

a feature point extractor extracting a feature point on the ridge;

a feature point connection information extractor extracting the connection state of the feature point on the ridge; and an identifying unit identifying the fingerprint image based on the connection state of the feature point on the ridge; and a projected feature point generator generating a projected feature point of the feature point projected onto an adjacent ridge, wherein said feature point connection information extractor has:

a second type information extractor extracting type information of a projection source feature point corresponding to a destination projected feature point on the ridge.

29. A fingerprint identifying apparatus, comprising:

a fingerprint image inputting unit inputting a fingerprint image;

a binarizing unit binarizing the fingerprint image;

a thin line image generator generating thin lines with the binarized fingerprint image;

a ridge extractor extracting a ridge from the thin line fingerprint image;

a feature point extractor extracting a feature point on the ridge;

a feature point connection information extractor extracting the connection state of the feature point on the ridge; and an identifying unit identifying the fingerprint image based on the connection state of the feature point on the ridge; and a projected feature point generator generating a projected feature point of the feature point projected onto an adjacent ridge, wherein said feature point connection information extractor has:

a direction information extractor extracting direction information from a connection source feature point or a connection source projected feature point to a destination feature point or a destination projected feature point.

30. A fingerprint identifying apparatus, comprising:
a fingerprint image inputting unit inputting a fingerprint image;
a binarizing unit binarizing the fingerprint image;
a thin line image generator generating thin lines with the binarized fingerprint image;
a ridge extractor extracting a ridge from the thin line fingerprint image;
a feature point extractor extracting a feature point on the ridge;
a feature point connection information extractor extracting the connection state of the feature point on the ridge;
an identifying unit identifying the fingerprint image based on the connection state of the feature point on the ridge; and
a feature point virtual changing unit virtually changing the type of a feature point on the ridge.

31. A fingerprint identifying apparatus, comprising:
a fingerprint image inputting unit inputting a fingerprint image;
a binarizing unit binarizing the fingerprint image;
a thin line image generator generating thin lines with the binarized fingerprint image;
a ridge extractor extracting a ridge from the thin line fingerprint image;
a feature point extractor extracting a feature point on the ridge;
a feature point connection information extractor extracting the connection state of the feature point on the ridge; and
an identifying unit identifying the fingerprint image based on the connection state of the feature point on the ridge; and
a projected feature point generator generating a projected feature point of the feature point projected onto an adjacent ridge,
wherein said identifying unit has:
    a ridge increasing/decreasing unit increasing/decreasing the number of ridges present between a feature point to be identified and a projected feature point which was generated by projection of the feature point; and
    a seventh determining unit determining whether or not ridge structures of the ridges increased/decreased by said ridge increasing/decreasing unit match between fingerprints.

32. A fingerprint identifying apparatus, comprising:
a fingerprint image inputting unit inputting a fingerprint image;
a binarizing unit binarizing the fingerprint image;
a thin line image generator generating thin lines with the binarized fingerprint image;
a ridge extractor extracting a ridge from the thin line fingerprint image;
a feature point extractor extracting a feature point on the ridge;
a feature point connection information extractor extracting the connection state of the feature point on the ridge; and
an identifying unit identifying the fingerprint image based on the connection state of the feature point on the ridge; and
a projected feature point generator generating a projected feature point of the feature point projected onto an adjacent ridge,
wherein said identifying unit has:
    a first comparing unit comparing a distance on a ridge from a particular feature point to another feature point and a distance on a ridge from the particular feature point to a projected feature point.

33. A fingerprint identifying apparatus, comprising:
a fingerprint image inputting unit inputting a fingerprint image;
a binarizing unit binarizing the fingerprint image;
a thin line image generator generating thin lines with the binarized fingerprint image;
a ridge extractor extracting a ridge from the thin line fingerprint image;
a feature point extractor extracting a feature point on the ridge;
a feature point connection information extractor extracting the connection state of the feature point on the ridge; and
an identifying unit identifying the fingerprint image based on the connection state of the feature point on the ridge; and
a projected feature point generator generating a projected feature point of the feature point projected onto an adjacent ridge,
wherein said identifying unit has:
    a second comparing comparing a distance on a ridge from a particular projected feature point to another feature point and a distance on a ridge from the particular projected feature point to another projected feature point.

34. A fingerprint identifying apparatus, comprising:
a fingerprint image inputting unit inputting a fingerprint image;
a binarizing unit binarizing the fingerprint image;
a thin line image generator generating thin lines with the binarized fingerprint image;
a ridge extractor extracting a ridge from the thin line fingerprint image;
a feature point extractor extracting a feature point on the ridge;
a feature point connection information extractor extracting the connection state of the feature point on the ridge; and
an identifying unit identifying the fingerprint image based on the connection state of the feature point on the ridge,
wherein said identifying unit has:
    a weighting unit for weighting each fingerprint information; and
    an evaluation criterion switching unit for switching an evaluation system between an evaluation system which gives priority to comparison to connection states of the feature points and an evaluation system which gives priority to comparison to positions, types, or directions of the feature points.

35. A fingerprint identifying apparatus, comprising:
a fingerprint image inputting unit inputting a fingerprint image;
a binarizing unit binarizing the fingerprint image;
a thin line image generator generating thin lines with the binarized fingerprint image;

a ridge extractor extracting a ridge from the thin line fingerprint image;

a feature point extractor extracting a feature point on the ridge;

a feature point connection information extractor extracting the connection state of the feature point on the ridge; and an identifying unit identifying the fingerprint image based on the connection state of the feature point on the ridge, wherein a bottom portion and a top portion of a ridge of the fingerprint image are inverted.

36. A pattern identifying apparatus, comprising:

a feature point extractor extracting a plurality of feature points from an input pattern;

a virtual feature point designating unit designating a virtual feature point to the input pattern by projecting the feature points existing on another ridge onto a ridge corresponding to the feature point extracted by said feature point extracting means; and a pattern identifying unit identifying the input pattern based on feature information of the virtual feature point.

37. A pattern identifying apparatus, comprising:

a feature point extractor extracting a feature point from an input pattern;

a virtual feature point designating unit designating a virtual feature point to the input pattern corresponding to the feature point extracted by said feature point extracting means; and a pattern identifying unit identifying the input pattern based on feature information of the virtual feature point, wherein the feature information is a distance on a ridge from the feature point to the virtual feature point along the input pattern.

38. A fingerprint identifying method, comprising the steps of:

inputting fingerprint data;

extracting a ridge structure of a fingerprint from the fingerprint data;

mapping the ridge structure to a particular ridge; and comparing mapped results so as to identifying the fingerprint.

39. A fingerprint registering apparatus, comprising:

fingerprint data inputting means for inputting fingerprint data;

ridge extracting means for extracting a ridge of a fingerprint based on the fingerprint data;

feature point extracting means for extracting a plurality of feature points on a ridge based on the fingerprint data;

placement state detecting means for starting trace of the ridge from a feature point and detecting the placement state between the feature point and another feature point detected in the trace of the ridge; and register means for registering the placement state as personal information.

40. A fingerprint registering apparatus, comprising:

fingerprint data inputting means for inputting fingerprint data;

feature point extracting means for extracting a plurality of feature points of an extractor fingerprint based on the fingerprint data;

virtual feature point designating means for designating a virtual feature point on a ridge by projecting the feature points existing on another ridge onto the ridge corresponding to the feature point extracted by said feature point extracting means;

fingerprint information calculating means for calculating fingerprint information of the virtual feature point; and register means for registering the fingerprint information calculated by said fingerprint information calculation means as personal information.

41. A fingerprint identifying apparatus, comprising:

fingerprint data inputting means for inputting fingerprint data;

ridge extracting means for extracting a ridge of a fingerprint based an the fingerprint data;

feature point extracting means for extracting a plurality of feature points on the ridge extractor based on the fingerprint data;

placement state detecting means for starting trace of the ridge from a feature point and detecting the placement state between the feature point and another feature point detected in the trace of the ridge; and fingerprint identifying means for identifying the fingerprint based on the placement state.

42. A fingerprint identifying apparatus, comprising:

a fingerprint data inputting unit inputting fingerprint data;

a virtual feature point designating unit designating a virtual feature point on the ridge by projecting the feature points existing on another ridge onto a ridge based on the fingerprint data;

a fingerprint information calculator calculating fingerprint information of the virtual feature point designated by said virtual feature point designating means; and a fingerprint identifying unit identifying the fingerprint based on the fingerprint information.

43. A fingerprint identifying apparatus, comprising:

fingerprint data inputting means for inputting fingerprint data;

first feature point extracting means for extracting a first feature point based on the fingerprint data;

second feature point extracting means for extracting a second feature point based on the fingerprint data;

connection state detecting means for detecting a connection state of the first feature point and the second feature point via a ridge, the connection state comprising at least one of a straight distance or a distance along the ridge from the first feature point on the ridge to the second feature point on the ridge, the number of feature points and the number of projected feature points between the first feature point on the ridge and the second feature point on the ridge, the type of the feature points on the ridge, the arrangement order of the feature points on the ridge, the arrangement order of projected feature points between the first feature point on the ridge and the second feature point on the ridge and the connection direction from the first feature point to the second feature point; and identifying means for identifying a fingerprint based on the connection state.

44. A fingerprint identifying apparatus, comprising:

fingerprint image inputting means for inputting a fingerprint image;

binarizing means for binarizing the fingerprint image;

thin line image generating means for generating thin lines with the binarized fingerprint image;

ridge extracting means for extracting a ridge from the thin line fingerprint image;

feature point extracting means for extracting a plurality of feature points on the ridge extractor;

feature point connection information extracting means for extracting the connection state of the feature point on the ridge, the connection state comprising at least one of a straight distance or a distance along the ridge from a feature point which is selected from the plurality of feature points on the ridge to a second feature point which is selected from the plurality of feature points on the ridge, the number of feature points and the number of projected feature points between the feature point on the ridge and the second feature point on the ridge, the type of the feature points on the ridge, the arrangement order of the feature pointson the ridge, the arrangement order of projected feature points between the feature point on the ridge and the second feature point on the ridge, and the connected direction from the feature point to the second feature point; and identifying means for identifying the fingerprint image based on the connection state of the feature point on the ridge.

45. A pattern identifying apparatus, comprising:

a feature point extractor extracting a plurality of feature points on a ridge from an input pattern;

a virtual feature point designating unit designating a virtual feature point to the input pattern by projecting the feature points existing on another ridge onto a ridge corresponding to the feature point extracted by said feature point extracting unit; and a pattern identifying unit identifying the input pattern based on feature information of the virtual feature point.

46. A fingerprint identifying method, comprising the steps of:

inputting fingerprint data;

extracting a ridge of a fingerprint based on the fingerprint data;

extracting a plurality of feature points on the ridge based on the fingerprint data;

calculating the connection state of the feature point via the ridge, the connection state comprising at least one of a straight distance or a distance along the ridge from a feature point which is selected from the plurality of feature points on the ridge to a second feature point which is selected from the plurality of feature points on the ridge, the number of feature points and the number of projected feature points between the feature point on the ridge and the second feature point on the ridge, the type of the feature points on the ridge, the arrangement order of the feature pointson the ridge, the arrangement order of projected feature points between the feature point on the ridge and the second feature point on the ridge, and the connected direction from the feature point to the second feature point; and identifying fingerprint based on the connection state of the feature point.

47. A fingerprint identifying method, comprising the steps of:

inputting fingerprint data;

extracting a ridge of a fingerprint based on the fingerprint data;

extracting a plurality of feature points on the ridge based on the fingerprint data;

calculating the connection state of the ridge, the connection state comprising at least one of a straight distance or a distance along the ridge from a first feature point which is set up from the plurality of feature points on the ridge as a connection point, the number of feature points and the number of projected feature points between the first feature point on the ridge and the second feature point on the ridge, the type of the feature points on the ridge, the arrangement order of the feature points on the ridge, the arrangement order of projected feature points between the first feature point on the ridge and the second feature point on the ridge and the connection direction from the first feature point to the second feature point; and identifying the fingerprint based on the connection state of the ridge.

48. A storage medium having:

a data structure describing a plurality of feature points extracted from a fingerprint; and a data structure describing the connection state of the feature point via a ridge, the connection state comprising at least one of a straight distance or a distance along the ridge from a feature point which is selected from the plurality of feature points on the ridge to a second feature point which is selected from the plurality of feature points on the ridge, the number of feature points and the number of projected feature points between the feature point on the ridge and the second feature point on the ridge, the type of the feature points on the ridge, the arrangement order of the feature pointson the ridge, the arrangement order of projected feature points between the feature point on the ridge and the second feature point on the ridge, and the connected direction from the feature point to the second feature point.

49. A storage medium, having:

a data structure describing fingerprint information of a feature point extracted from a fingerprint, the fingerprint information of the feature point comprising at least one of the position, type and direction of the feature point on the ridge, information of other feature points connected to the feature point on the ridge, and information of other feature points on adjacent ridges of the feature point; and a data structure describing fingerprint information of a virtual feature point virtually designated on a ridge corresponding to the feature point, the fingerprint information of the virtual feature point comprising at least one of the position, type and direction of the virtual feture point on the ridge, information of other feature points connected to the virtual feature point on the ridge, information of other feature points on adjacent ridges of the virtual feture point and the distance from the virtual feature point to a source projected feature point.

50. A storage medium from which a computer reads a program that causes the computer to perform the functions of:

inputting fingerprint data;

extracting a ridge of a fingerprint based on the fingerprint data;

extracting a plurality of featurepoints on the ridge based on the fingerprint data;

starting trace of the ridge from a feature point;

detecting the placement state between the feature point and another feature point detected in tracing of the ridge; and identifying the fingerprint based on the placement state.

51. A storage medium from which a computer reads a program that causes the computer to perform the functions of:

inputting fingerprint data;

designating a virtual feature point on a ridge by projecting the feature points existing on another ridge onto the ridge based on the fingerprint data;

calculating fingerprint information of the virtual feature point; and identifying a fingerprint based on the fingerprint information.

* * * * *